US010587366B2

(12) United States Patent
Chervyakov et al.

(10) Patent No.: US 10,587,366 B2
(45) Date of Patent: Mar. 10, 2020

(54) V2X PERFORMANCE ENHANCEMENTS IN HIGH SPEED ENVIRONMENTS

(71) Applicant: Intel Corporation, Santa Clara, CA (US)

(72) Inventors: Andrey Chervyakov, Nizhny Novgorod (RU); Alexey Khoryaev, Nizhny Novgorod (RU); Dmitry Belov, Nizhny Novgorod (RU); Mikhail Shilov, Nizhny Novgorod (RU); Sergey Sosnin, Zavolzhie (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/754,260

(22) PCT Filed: Dec. 23, 2015

(86) PCT No.: PCT/US2015/000242
§ 371 (c)(1),
(2) Date: Feb. 21, 2018

(87) PCT Pub. No.: WO2017/052489
PCT Pub. Date: Mar. 30, 2017

(65) Prior Publication Data
US 2018/0241508 A1    Aug. 23, 2018

Related U.S. Application Data

(60) Provisional application No. 62/232,388, filed on Sep. 24, 2015.

(51) Int. Cl.
*H04W 4/00*      (2018.01)
*H04L 1/00*      (2006.01)
(Continued)

(52) U.S. Cl.
CPC .......... *H04L 1/0069* (2013.01); *H04L 5/0048* (2013.01); *H04L 5/0051* (2013.01);
(Continued)

(58) Field of Classification Search
USPC .................................................. 370/328, 330
See application file for complete search history.

(56) References Cited

U.S. PATENT DOCUMENTS

2010/0067512 A1\* 3/2010 Nam ...................... H04B 7/068
                                                                370/342
2013/0114756 A1\* 5/2013 Jia ........................... H04J 11/00
                                                                375/295
(Continued)

FOREIGN PATENT DOCUMENTS

EP          2975890 A1   1/2016
WO     2014/142576 A1   9/2014

OTHER PUBLICATIONS

International Search Report and Written Opinion dated Aug. 9, 2016 from International Application No. PCT/US2015/000242, 23 pages.
(Continued)

*Primary Examiner* — Phuongchau Ba Nguyen
(74) *Attorney, Agent, or Firm* — Fish & Richardson P.C.

(57) ABSTRACT

Implementations of this disclosure generally may relate to the field of wireless communications. More specifically, implementations described in this disclosure relate to different 3GPP LTE and LTE-A system enhancements to address the issue and support reliable V2X operation in the high mobility environments. Several solutions to improve the V2X system performance in the high mobility vehicular channel propagation conditions are described. Some aspects relate to the suggestion of a new DMRS patterns within individual subframes that promote more accurate CFO estimation. Moreover, another aspect provides DMRS mapping or puncturing patterns to transmit individual DMRS in a
(Continued)

periodic pattern on respective OFDM/SC-FDMA symbols so that they do not occupy all REs of the OFDM/SC-FDMA symbols, respectively.

14 Claims, 38 Drawing Sheets

(51) Int. Cl.
    *H04L 27/26*     (2006.01)
    *H04L 5/00*     (2006.01)
    *H04W 4/40*     (2018.01)
    *H04L 25/02*     (2006.01)
    *H04B 7/0413*     (2017.01)

(52) U.S. Cl.
    CPC ...... *H04L 25/0224* (2013.01); *H04L 27/2675* (2013.01); *H04W 4/40* (2018.02); *H04B 7/0413* (2013.01)

(56) References Cited

U.S. PATENT DOCUMENTS

| | | |
|---|---|---|
| 2014/0269882 A1 | 9/2014 | Thompson et al. |
| 2015/0230211 A1 | 8/2015 | You et al. |
| 2016/0192385 A1* | 6/2016 | Tooher .................. H04L 5/0051 370/336 |

OTHER PUBLICATIONS

Huawei et al., "DMRS enhancement for V2V," 3GPP TSG RAN WG1 Meeting #82, R1-153801, Agenda Item: 7.2.8.2, Aug. 24-28, 2015, Beijing, China, 4 pages.

J.J. Van De Beek, et al.; "ML Estimation of Time and Frequency Offset in OFDM Systems," in IEEE Transactions on Signal Processing, vol. 45, No. 7, pp. 1800-1805, Jul. 1997; 7 pages.

Paul H. Moose; "A Technique for Orthogonal Frequency Division Multiplexing Frequency Offset Correction," IEEE Transactions on Communications, vol. 42, No. 10, pp. 2908-2914, Oct. 1994; 7 pages.

LG Electronics, et al.; "New SI proposal: Feasibility Study on LTE-based V2X Services," 3GPP TSG RAN Meeting #68, RP-151109, Agenda Item: 13.1.1; Malmö, Sweden, Jun. 15-18, 2015; 7 pages.

3GPP TS 36.101 V11.5.0 (Jul. 2013); "Technical Specification Group Radio Access Network; Evolved Universal Terrestrial Radio Access (E-UTRA); User Equipment (UE) radio transmission and reception (Release 11)," 446 pages.

Praween Kumar Nishad, et al.; "Carrier Frequency Offset Estimation in OFDM Systems," Proceedings of 2013 IEEE Conference on Information and Communication Technologies (ICT 2013), pp. 885-889, Apr. 2013; 5 pages.

* cited by examiner

V2X PERFORMANCE ENHANCEMENTS IN HIGH SPEED ENVIRONMENTS

RELATED APPLICATION

The present application is a national phase entry under 35 U.S.C. § 371 of International Application No. PCT/US2015/000242, filed Dec. 23, 2015, entitled "V2X PERFORMANCE ENHANCEMENTS IN HIGH SPEED ENVIRONMENTS," which designates the United States of America, which claims the benefit of priority under 35 U.S.C. § 119(e) of U.S. Provisional Application Ser. No. U.S. 62/232,388, filed Sep. 24, 2015, entitled "V2V/V2X PERFORMANCE IN HIGH SPEED ENVIRONMENTS". The entire specifications of which are hereby incorporated by reference in their entireties for all purposes.

BACKGROUND

Implementations of this disclosure generally may relate to the field of wireless communications. More specifically, implementations described in this disclosure relate to different 3rd Generation Partnership Project (3GPP) Long Term Evolution (LTE) and Long Term Evolution—Advanced (LTE-A) system enhancements to address the issue and support reliable V2X operation in the high mobility environments. Several solutions to improve the V2X system performance in the high mobility vehicular channel propagation conditions are described.

BRIEF DESCRIPTION OF THE FIGURES

The following detailed description refers to the accompanying drawings. The same reference numbers may be used in different drawings to identify the same or similar elements.

DETAILED DESCRIPTION

Figure 1:
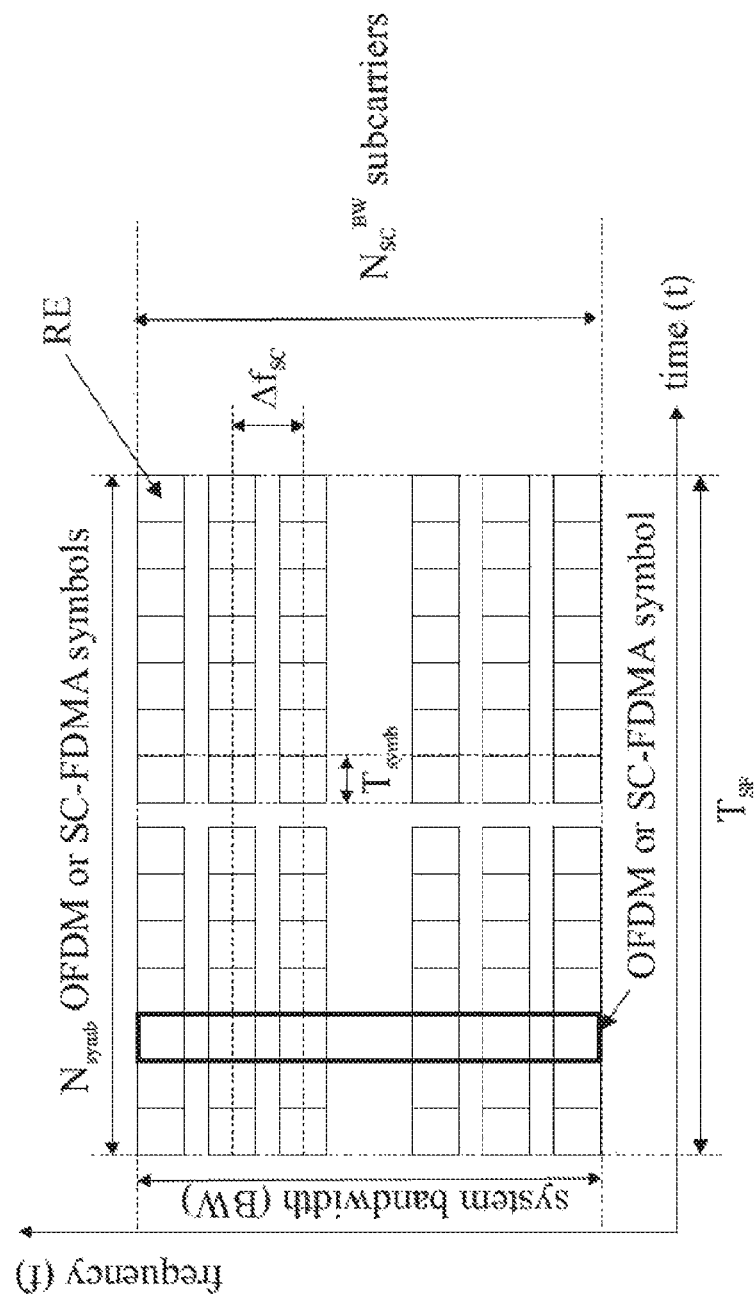
FIG. 1 shows an exemplary subframe structure of the first aspect of this disclosure.

In the following description, for purposes of explanation and not limitation, specific details are set forth such as particular structures, architectures, interfaces, techniques, etc. in order to provide a thorough understanding of the various aspects of the disclosure. However, it will be apparent to those skilled in the art having the benefit of the present disclosure that the various aspects thereof may be practiced in other examples that depart from these specific details. In certain instances, descriptions of well-known devices, circuits, and methods are omitted so as not to obscure the description of the present invention with unnecessary detail.

3GPP LTE and LTE-A (collectively referred to as "legacy LTE" herein below) is one of the main candidate technologies to enable the "connected cars" concept and provide the vehicles with wireless connections among each other and to the Internet. To address the strong interest of the vehicle manufacturers and cellular network operators in the "connected cars" concept, the LTE Release 13 study on LTE-based V2X (vehicle-to-X) Services has been initiated with the objective is to introduce new functionalities and potential enhancements needed to operate LTE-based V2X services, including vehicle-to-vehicle (V2V), vehicle-to-infrastructure/network (V2I/N), and vehicle-to-pedestrian (V2P). The LTE-based V2X services are expected to operate up to the 6 GHz carrier frequency. Furthermore, in accordance to the requirements the V2X operation needs to be supported for the high speed scenarios (e.g. up to 280 km/h relative vehicles speed). Therefore, the physical layer design for V2X should be robust enough and provide reliable performance in the high speed scenarios.

The enhanced PC5 transport channels (i.e. Sidelink or D2D physical channels) are considered to be used to enable direct V2V/V2P operation. At the same time, the LTE-A sidelink (SL) physical channels are designed with the assumption of lower maximum Doppler spread and potential carrier frequency offsets. Therefore, enhancements to the SL physical layer design need to be introduced to efficiently support V2V services. For the V2I/N operation cellular DL/UL physical channels may be used and potential enhancements to improve robustness in the high speed environments might be needed as well.

One of the aspects of the V2V/V2X system design is synchronization and, in particular, frequency synchronization on the radio interface between the network elements. In general, the legacy LTE infrastructure can be used to establish the synchronization (i.e. eNode B (eNB)-based synchronization when a user equipment (UE) derives the frequency synchronization during the Primary Synchronization Signal (PSS)/Secondary Synchronization Signal (SSS) acquisition and via Common Reference Symbol (CRS) tracking). Alternatively, a Global Navigation Satellite System (GNSS) can be used to derive the frequency synchronization.

For the case of eNB-based synchronization there are multiple factors which may affect frequency errors which would be observed at the UE receivers. The UE is expected to derive its Uplink (UL)/Sidelink (SL) transmission (TX) frequency based on the Downlink (DL) acquisition and the transmit frequency error relative to absolute carrier frequency (i.e. DL frequency offset synchronization errors). The transmit frequency error relative to absolute carrier frequency can for example depend on 1) the eNB transmit signal frequency offset, 2) receive signal frequency offset due to Doppler shift relative to the eNB transmit frequency, and 3) residual synchronization frequency offset estimation error at the UE.

For V2V links (i.e. SL links), the receive signal frequency error can further include DL frequency synchronization errors for each UE as described above and also the receive signal frequency offset due to Doppler shift on the SL link. For the UL links, the frequency offset error at the eNB side may depend on the UE DL frequency offset synchronization errors and also receive signal frequency offset due to Doppler shift on the UL link. Depending on the conditions the maximum relative frequency error for V2V communication at 6 GHz band with 160 km/h vehicles speed may be upper bound by ~4.8 kHz frequency offset which is a very large frequency variation that might significantly affect the system performance. For the UL links the frequency offset is upper bounded by ~2.4 kHz.

Therefore, the V2V/V2X systems in the high speed environments may be characterized by high carrier frequency offsets (CFOs) which may negatively affect the performance.

As noted above, the current legacy LTE Sidelink design may not be sufficient to handle the high CFOs which can be observed in V2X communication. For example, when a signal received from an eNB is used within a moving UE (e.g. in a vehicle) for synchronization, by default, the UE of a legacy LTE system would synchronize to the "actual received frequency". In case of Line-of-Sight (LOS) propagation, this frequency would include the Doppler shift component which can be very large in the high mobility conditions and especially in the high carrier frequencies which are expected to be used for the V2X networks. Considering for example V2V communication in the 6 GHz band and assuming a speed of 160 km/h for the vehicles, depending on the conditions of the maximum relative frequency error for V2V communication, the upper bound of the frequency variation due to the Doppler shift is approx. 4.8 kHz, which is a very large frequency variation with respect to the legacy LTE subcarrier spacing of 15 kHz and might thus significantly affect the system performance.

Figure 46:
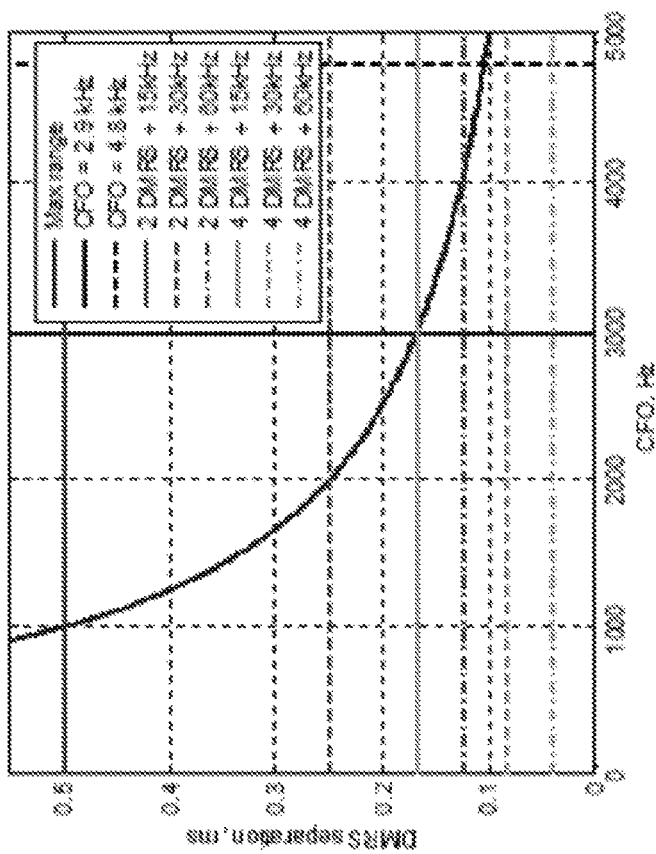
FIG. 46 shows the maximum CFO value which can be estimated and corrected in scenarios with different DMRS patterns and different subcarrier spacing options.

FIG. 46 shows the maximum CFO value which can be estimated and corrected in scenarios with different DMRS patterns and different subcarrier spacing options. One can observe in FIG. 46 that in case of using legacy LTE transmission parameters, the maximum CFO value which can be estimated is equal to 1 kHz. In case of using improvements discussed in this disclosure (for example using 4 DMRS per subframe and a subcarrier spacing of 60 kHz) the maximum CFO value can be substantially increased (frequency variation larger than 5 kHz may be handled).

In one approach of this disclosure, the following implementation to CFO handling at the UE side can be used. For the Sidelink operation, the UE may not have precise knowledge on the received signal frequency and also multiple signals in at a given time instance may have different frequencies. The CFO compensation for each received signal may be for example done upon the Fast Fourier Transform (FFT) conversion of the received signal to the frequency domain ("post-FFT compensation"). Then, the UE may estimate the residual CFO and the apply post-FFT compensation of the CFO effect (i.e. remove phase offset between different OFDM/SC-FDMA symbols of the subframe). The UE can estimate the CFO using the SL DMRS (e.g. by calculating the phase offset between the different OFDM/SC-FDMA symbols with DMRS). This approach may allow improving the reliability of the estimated CFO, since the receive signals may have different non-overlapping resource allocation or the DMRS signals may have different scrambling sequences in case of overlapping transmissions. For the legacy LTE SL, one physical resource block (PRB) pair includes 2 DMRS symbols with 0.5 ms time offset between the DMRS. Hence, the maximum CFO estimate is limited by approx. 1 kHz.

Alternatively, in another approach of this disclosure, the CFO can be estimated using a cyclic prefix (CP)-based approach that estimates the phase offset between different parts of one OFDM/SC-FDMA symbol (i.e. CP and the end of the symbol). The estimation is done before the FFT conversion, i.e. the received signal is still processed in time domain ("pre-FFT"). However, in one time instance the received signal at the UE may comprise signals from different sources each with respective different CFOs. Hence, the reliability of this approach may not be optimal.

Aspects of this disclosure thus relate to different enhancements to legacy LTE systems to support reliable V2X operation in high mobility environments. Specifically, in some aspects, solutions relate to improvements of the V2X system performance in high mobility vehicular channel propagation conditions. Furthermore, the aspects of the disclosure may allow improvement of the robustness and/or reliability of CFO estimation in high mobility vehicular channel propagation conditions.

A first aspect of this disclosure relates to physical channel design enhancements that attempt to increase robustness to high CFO caused by Doppler effects and synchronization errors. These enhancements are applicable for transmissions on SL, but can also be used for UL and DL transmissions between a UE and a network element in the radio access network (RAN), e.g. an eNB, and are especially useful when used in connection with communication scenarios with high mobility channel propagation conditions.

In accordance with this first aspect, one example implementation provides a new subframe structure (which can be also referred to as a physical signal structure or physical signal numerology) for carrying information of a physical channel designated for V2X communication. As shown in FIG. 1, a subframe according to this aspect has a predetermined number $N_{SC}^{BW}$ of subcarriers in the frequency domain, and a predetermined number $N_{symb}$ of OFDM/SC-FDMA symbols in the time domain. The subcarrier spacing $\Delta f_{SC}$ between subcarriers is $\Delta f_{SC} = n \cdot \Delta f_{legacy}$, where $n \in \{2, 3, 4, 5, 6, 7, 8, \ldots\}$ and where $\Delta f_{legacy}$ is a subcarrier spacing of a subcarriers carrying information of a physical channel not designated for V2X communication. The symbol duration $T_{symb}$ of the OFDM/SC-FDMA symbols is $T_{symb} = T_{symb_{legacy}}/n$, where $T_{symb_{legacy}}$ is the symbol duration of OFDM/SC-FDMA symbols having the indices used for transmitting subframes carrying information of the physical channel not designated for V2X communication.

Assuming for example $\Delta f_{legacy} = 15$ kHz, as for example used in legacy LTE systems, the subframe structure as shown in FIG. 1 would thus have a subcarrier spacing $\Delta f_{SC}$ of 30 kHz, 60 kHz or even higher. The subframe may for example span ($T_{SF}$) less than 1 ms in the time domain (i.e. $T_{SF} < 1$ ms). For example, assuming a subframe duration of $T_{SF_{legacy}} = 1$ ms, as for example used in legacy LTE systems and further assuming n=2, the subframe duration of the subframe in FIG. 1 would be $T_{SF} = 0.5$ ms. For n=4 the subframe duration would reduce to $T_{SF} = 0.25$ ms.

Furthermore, the parameter n may optionally be a function of carrier frequency of the frequency band in which the subframe is to be transmitted. The carrier frequency could be equal or higher than 2 GHz, preferably higher than 3 GHz (e.g. 6 GHz).

Optionally, the number $N_{SC}^{BW}$ of subcarriers within the subframe may be a function of the system bandwidth (BW) The system bandwidth could be for example one of 1.4 MHz, 3 MHz, 5 MHz, 10 MHz, 15 MHz, 20 MHz, 40 MHz, 60 MHz, 80 MHz, 100 MHz, but these examples are not considered limiting. Furthermore, the subframe may for example have $N_{symb} = 14$ or $N_{symb} = 12$ OFDM/SC-FDMA symbols.

Note that the subframe may be used in some implementations to transmit data of V2X communications within a LTE-based mobile communication system that supports V2X communications using the subframe of FIG. 1 and non-V2X communications using subframes as defined for legacy LTE systems. In these implementations it may be feasible to ensure that the sampling time of the OFDM/SC-FDMA symbols and the frequencies of the subcarriers are the same for the subframe structure of FIG. 1 for V2X communications and the subframe structure used for non-V2X communications. Hence, it would be advantageous that the sampling time $T_S = T_{S_{legacy}}$ of the OFDM/SC-FDMA symbols and sample frequency $F_S = 1/T_S = F_{S_{legacy}}$ of the subcarriers, where $T_{S_{legacy}}$ and $F_{S_{legacy}}$ are the sampling time and frequency used for transmitting subframes carrying information of the physical channel not designated for V2X communication. The sampling time may be for example defined as $T_s = 1/\Delta f_{SC} \cdot N_{FFT}$. Similarly, the sampling time in a legacy LTE system may be for example defined as $T_{S_{legacy}} = 1/\Delta f_{SC_{legacy}} \cdot N_{FFT_{legacy}}$. For example for a system bandwidth of 20 MHz, $N_{FFT_{legacy}} = 2048$ and $\Delta f_{SC_{legacy}} = 15$ kHz, resulting in $T_{S_{legacy}} = 1/(15000 \cdot 2048)$ s ≅ 32 ns and thus $T_S = T_{S_{legacy}} \cong 32$ ns.

The different OFDM/SC-FDMA symbols shown in FIG. 1 may also have a CP. Each symbol could for example either have a first cyclic prefix (normal cyclic prefix) or a second cyclic prefix (extended cyclic prefix), where the second cyclic prefix is longer than the first cyclic prefix. In one example, the first short cyclic prefix is $CP_{short} = N_{CP_{short}} \cdot T_S$ and the second long cyclic prefix is $CP_{long} = N_{CP_{long}} \cdot T_S$. For example, $N_{CP_{short}} = 144$ and $N_{CP_{long}} = 512$.

Furthermore, please note that the symbol duration $T_{Symb}$ may have the following relation with the sampling time $T_S$: $T_{Symb} = (N_{FFT} + N_{CP}) \cdot T = (N_{FFT} + N_{CP}) \cdot 1/\Delta f_{SC} \cdot N_{FFT}$. Thus, the symbol duration depends on the size of the FFT $N_{FFT}$, the cyclic prefix length $N_{CP}$ and the subcarrier spacing $\Delta f_{SC}$.

Further depending on the cyclic prefix length $N_{CP}$, the number of OFDM/SC-FDMA symbols in the subframe may vary, given a fixed subframe size (e.g. $T_S F = 0.5$ s or $T_{SF} = 0.25$ s). For exemplary purposed only, the subframe of FIG. 1 may use a normal cyclic prefix for the OFDM/SC-FDMA symbols and may include 14 symbols ($N_{symb} = 14$). Using an extended cyclic prefix, the number of symbols per subframe might be 12 ($N_{symb} = 12$). Note that for matching the slot boundaries of the subframe to $T_{SF}$, the first OFDM/SC-FDMA symbol of the 7 or 6 OFDM/SC-FDMA symbol in each of the two slots may have a slightly longer prefix.

The subframe structure as exemplified based on FIG. 1 may for example be used for vehicle-to-X (V2X) communications. Without losing generality, this disclosure uses the term "V2X communication" as a synonym for "Vehicle-to-Everything communication", and includes V2V, V2I, V2N or V2P communication. V2V (vehicle-to-vehicle) may be considered covering LTE-based communication between vehicles. V2P (vehicle-to-pedestrian) may be considered covering LTE-based communication between a vehicle and a device carried by an individual (e.g. handheld terminal carried by a pedestrian, cyclist, driver or passenger). V2I/N (vehicle-to-infrastructure/network) may be considered covering LTE-based communication between a vehicle and a roadside unit/network. A roadside unit (RSU) is a transportation infrastructure entity (e.g. an entity transmitting speed notifications) implemented in an eNB or a stationary UE.

Non-V2X communication may thus be understood as a communication between UEs or a UE and a network element, e.g. eNB or another UE, in the radio access network infrastructure as defined in legacy LTE system employing a conventional subframe structure (e.g. transmissions on a physical UL, DL or SL channel and subframe structure of a conventional 3GPP LTE- or 3GPP LTE-A-based mobile communication system, corresponding at least to 3GPP LTE Release 8, 9, 10, 11 or 12).

Figure 2:
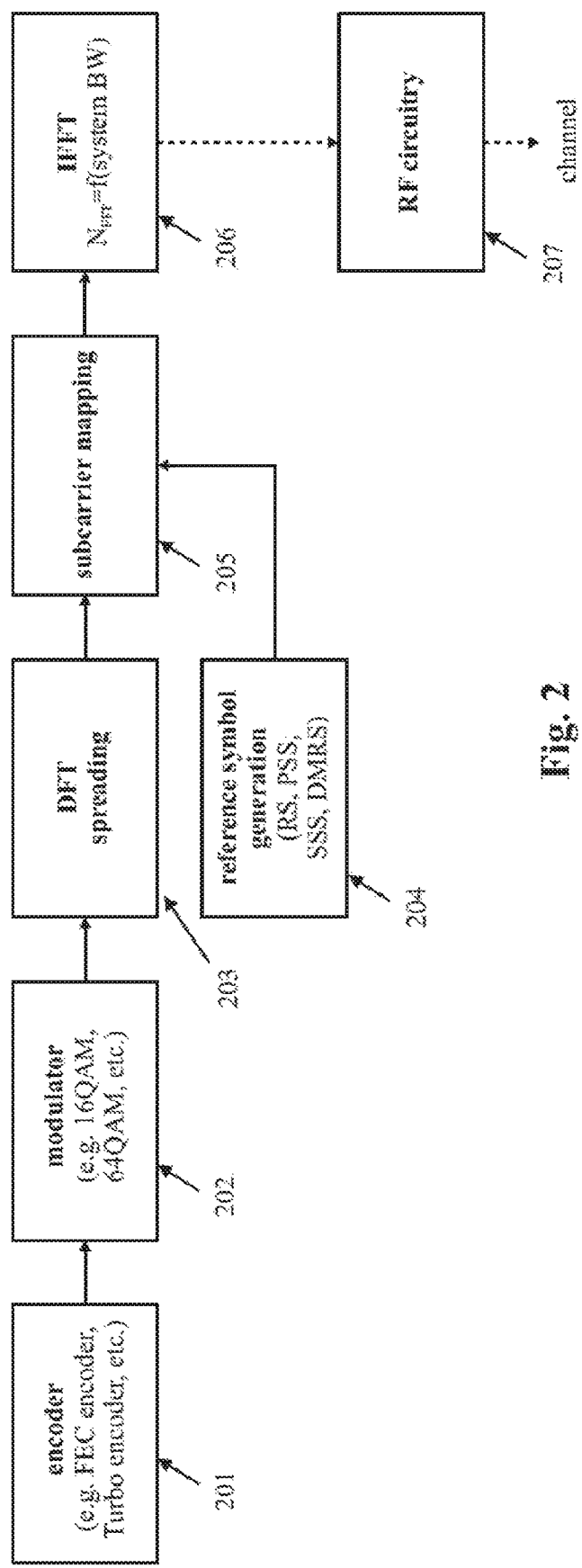
FIG. 2 shows an exemplary (simplified) transmission path for generating and transmitting a communication signal according to an example implementation of the first aspect of this disclosure.
Figure 3:
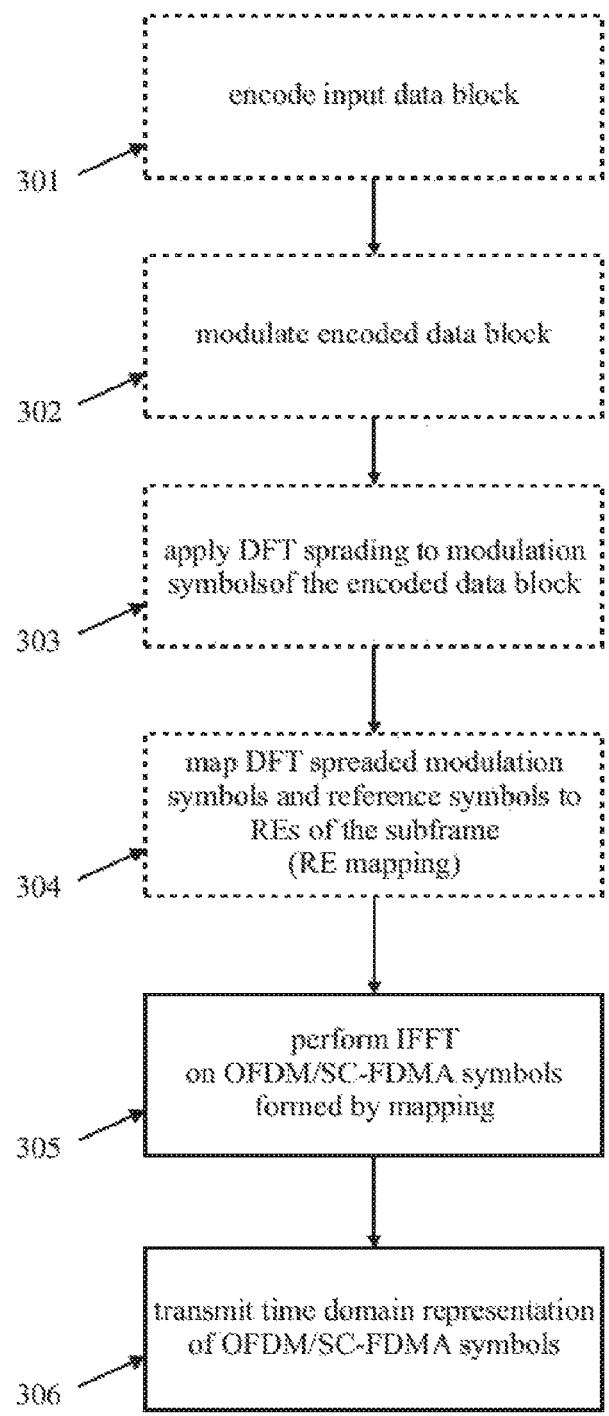
FIG. 3 shows an exemplary (simplified) flow chart for generating and transmitting a communication signal according to an example implementation of the first aspect of this disclosure.

FIG. 2 shows an exemplary (simplified) transmission path for generating and transmitting a communication signal according to an example implementation of this disclosure. The implementation of the transmission path may be included in communication device, e.g. a UE or an eNB. FIG. 3 shows an exemplary (simplified) flow chart for generating and transmitting a communication signal according to an example implementation of this disclosure. Note that the steps performed at 301-304 are not essential but are described only to better understand the transmission of a subframe formed according to the first aspect of this disclosure.

The user and/or control data from the higher layers are provided to an encoder 201 in blocks of data, and the encoder 201 encodes 301 the data block. The encoded data block is provided to a modulator 202 which modulates 302 the encoded data to obtain a time sequence of plural modulation symbols corresponding to the encoded data. Next, the time sequence of plural modulation symbols corresponding to the encoded data is subjected 303 to a transform precoding using Discrete Fourier Transform (DFT) spreading by the DFT spreading unit 203. Modulation symbols and reference symbols provided by a reference symbol generation unit 204—if any—are then mapped 304 to the resource elements (REs) of the subcarriers of given subframes in subcarrier mapping unit 205.

The mapping 304 of the modulation symbols and reference symbols—if any—to the time and frequency resource grid forming a subframe results, in one example implementation, subframe structure of FIG. 1. The subframe may have a predetermined number $N_{SC}^{BW}$ of subcarriers in the frequency domain, and a predetermined number $N_{symb}$ of OFDM/SC-FDMA symbols in the time domain. The subcarrier spacing $\Delta f_{SC}$ between subcarriers is $\Delta f_{SC} = n \cdot \Delta f_{legacy}$, where $n \in \{2, 3, 4, 5, 6, 7, 8, \ldots\}$ and where $\Delta f_{legacy}$ is a subcarrier spacing of a subcarriers of a physical channel not designated for V2X communication (subcarrier spacing of a subcarriers within a subframe designated for non-V2X communication).

After mapping in subcarrier mapping unit 205, the individual OFDM/SC-FDMA symbols of the subframe are subjected 305 to an Inverse Fourier Transform (IFFT) in the IFFT unit 206 to obtain a time domain representation of the OFDM/SC-FDMA symbols of the subframe for transmission 306 by a RF circuitry 207 of the communication device.

Note that instead of FFT/IFFT, a DFT/Inverse Discrete Fourier Transform (IDFT) or Discrete Cosine Transform (DCT)/Inverse Discrete Cosine Transform (IDCT) could be used in blocks 203/303 and 206/305. Furthermore, the simplified transmission path and the flow chart in FIGS. 2 and 3 do not consider Multiple Input Multiple Output (MIMO) for transmitting the communication channel via different antenna ports. In case MIMO is used the transmission path and flow chart of FIGS. 2 and 3 may be extended in that the modulation symbols of modulator 202 may be separated (e.g. multiplexed) into different layers (corresponding to the different antenna ports) and each layer of modulated symbols is the subjected to mapping 304 and IFFT transformation 305 and transmission 306 via the different antenna ports. Furthermore, the individual layers of modulated symbols may also be subjected to precoding prior to being passed to the subcarrier mapping unit 205. The precoding of layers may include, for example, spatial multiplexing, cyclic delay diversity (CDD) processing, space-frequency block coding (SFBC), etc. Apparently, the different and parallel processing paths for the MIMO layers may all produce a subframe structure as shown in FIG. 1 and as discussed herein above.

Assuming an exemplary solution in a LTE or LTE-A-based system, the reduction of the IFFT size $N_{FFT}$ relative to the legacy LTE FFT size $N_{FFT_{legacy}}$ implies shorter symbol durations $T_{symb}$ in the time domain. As a result, the OFDM/SC-FDMA symbol duration $T_{symb} = T_{symb_{legacy}}/n$, where $T_{symb_{legacy}}$ is the OFDM/SC-FDMA symbols duration used for transmitting subframes carrying information of the physical channel not designated for V2X communication.

Figure 4:
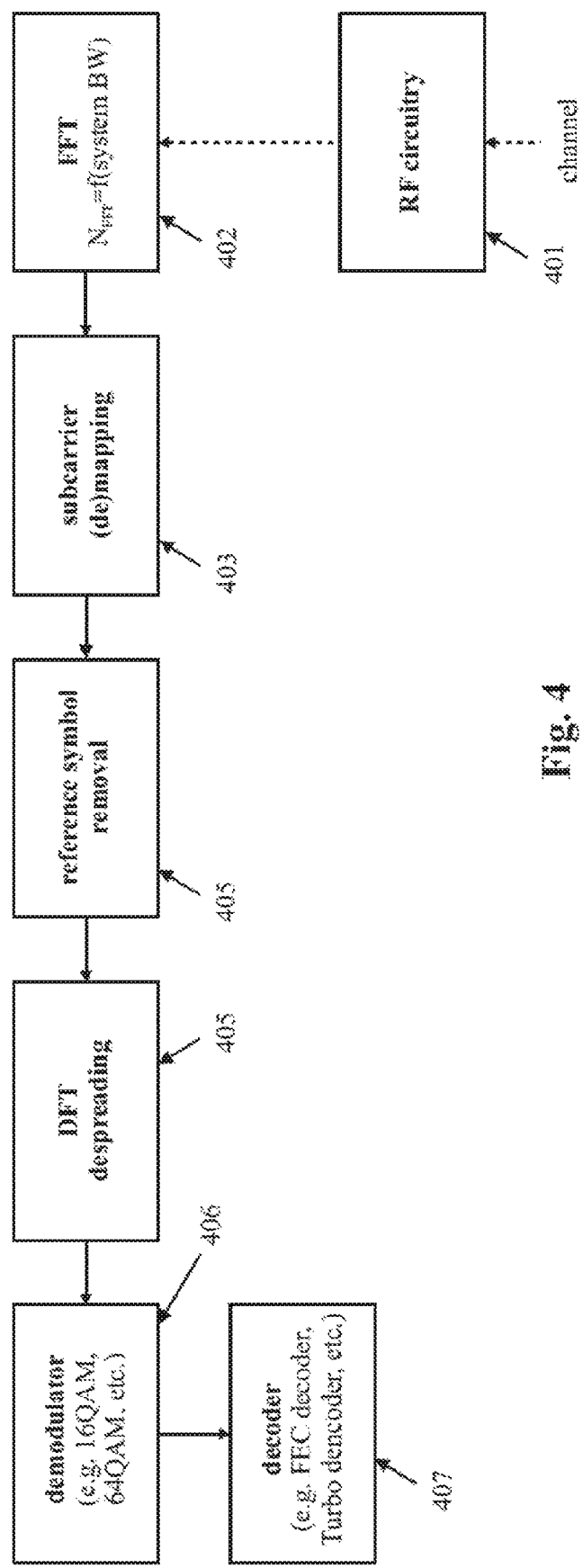
FIG. 4 shows an exemplary (simplified) reception path for receiving a communication signal corresponding to a subframe according to an example implementation of the first aspect of this disclosure.
Figure 5:
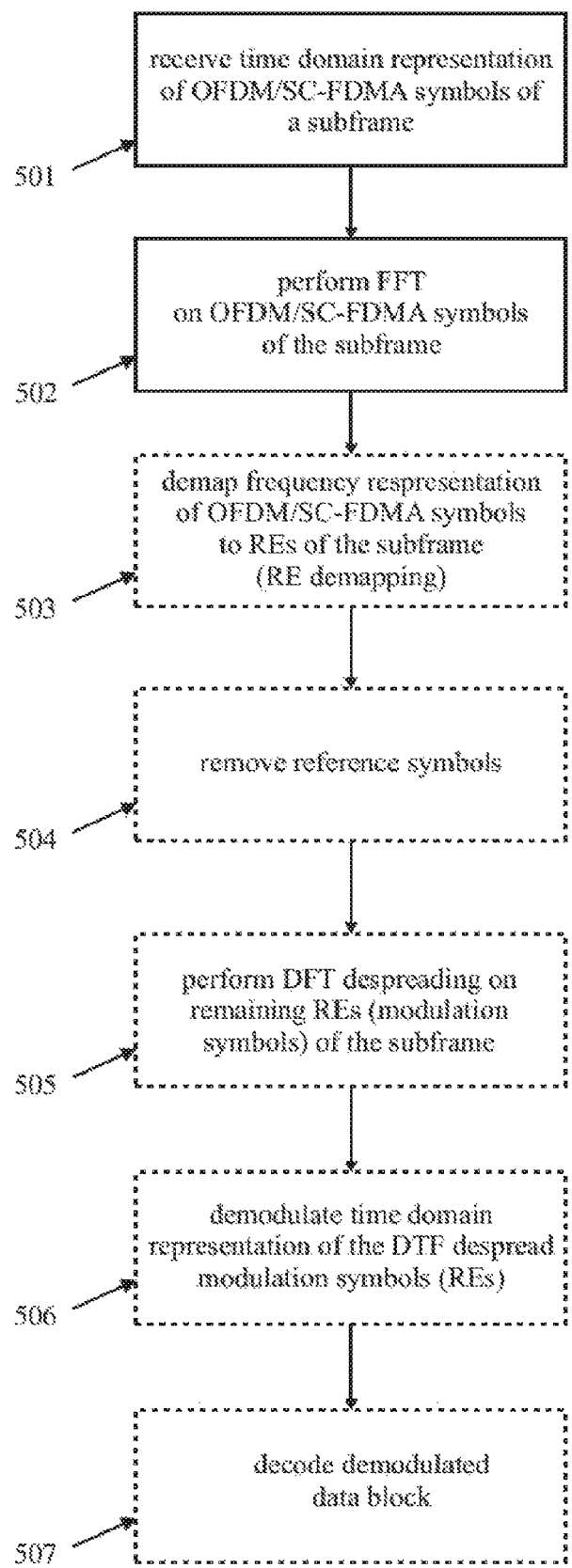
FIG. 5 shows an exemplary (simplified) flow chart for receiving a communication signal corresponding to a subframe according to an example implementation of this disclosure.

FIG. 4 shows an exemplary (simplified) reception path for receiving a communication signal corresponding to a subframe according to an example implementation of this disclosure. The implementation of the reception path may be included in communication device, e.g. a UE or an eNB. FIG. 5 shows an exemplary (simplified) flow chart for receiving a communication signal corresponding to a subframe according to an example implementation of this disclosure. Note that the steps performed at 503-507 are not essential but are described only to better understand the reception of a subframe formed according to the first aspect of this disclosure.

In line with the first aspect of this disclosure, a RF circuitry 401 of a communication device (e.g. a network element in the RAN, such as an eNB, or an UE located in a vehicle) receives 501 a communication signal. The communication signal correspond to time domain OFDM/SC-FDMA symbols of a subframe similar to the one shown in FIG. 1. The subframe may for example carry information of a physical channel designated for V2X communication. The received communication signal is passed to a FFT unit 402 which applies 502 a FFT of size $N_{FFT}$ on the received communication signal to thereby obtain the OFDM/SC-FDMA symbols of a subframe. The FFT size used by FFT unit 402 may be $N_{FFT} = N_{FFT_{legacy}}/n$, where $N_{FFT_{legacy}}$ is the size of the IFFT used for receiving subframes carrying information of the physical channel not designated for V2X communication.

Furthermore, the different FFT-transformed portions of the communication signal in the frequency domain demapped 503 in the subcarrier demapping unit 403 to obtain the OFDM/SC-FDMA symbols of a subframe, As in the previous implementation, the subframe obtained by applying 502 an FFT on the communication signal and demapping 503 may have a predetermined number $N_{SC}^{BW}$ of subcarriers in the frequency domain, and a predetermined number $N_{symb}$ of OFDM/SC-FDMA symbols in the time domain and the subcarrier spacing $\Delta f_{SC}$ between subcarriers is $\Delta f_{SC} = n \cdot \Delta f_{legacy}$, where $n \in \{2, 3, 4, 5, 6, 7, 8, \ldots\}$ and where $\Delta f_{legacy}$ is a subcarrier spacing of a subcarrier carrying information of a physical channel not designated for V2X communication. If applicable, reference symbols (RS) within the subframe are removed 504 in reference symbol removing unit 405, before the individual OFDM/SC-FDMA symbols are subjected 506 to DFT despreading using an IDFT in DFT despreading unit 405. The DFT despreading unit 405 outputs a stream of modulation symbols corresponding to the REs of the OFDM/SC-FDMA symbols to the demodulator 406. The demodulator 406 demodulates 507 the stream of modulation symbols, and passes a block of demodulated data to the decoder 407 for decoding 507.

Note that instead of FFT/IFFT, DFT/IDFT or DCT/IDCT could be used in blocks 402/502 and 405/506. Furthermore, the simplified transmission path and the flow chart in FIGS. 4 and 5 do not consider MIMO for transmitting the communication channel via different antenna ports. In case MIMO is used the reception path and flow chart of FIGS. 4 and 5 may be extended in that different communication signal corresponding to respective MIMO layers may be received via different antenna ports. The communication signal of the different layers would be processed individually according to steps 502-504. Prior to IFFT transform 506 in the IFFT unit 405, the MIMO receive signal equalization and further receive processing might be needed. Further, the modulation symbols of the different MIMO layers may after undoing the precoding may be combined (e.g. demultiplexed) into one stream of modulation symbols, which are then subjected to demodulation 506 and decoding 507.

Note that in legacy LTE-based systems—and in most implementations of this disclosure, but not all—the IFFT size on the transmitter side is identical to the FFT size on the receiver side.

Next, a more detailed and exemplary implementation of the first aspect is discussed in connection with modified SL signal numerology with increased subcarrier spacing $\Delta f_{SC}$ and reduced OFDM/SC-FDMA symbol duration $T_{Symb}$. The modified subframe structure for carrying LTE physical channels has a larger subcarrier spacing $\Delta f_{SC}$ in comparison to the legacy LTE system, where the subframe spacing $\Delta f_{SC_{legacy}} = 15$ kHz. Further, the sampling frequency $F_S$ in this improvement is identical to the sampling frequency $F_{S_{legacy}}$ and may be used for V2X operations. In the exemplary implementation the following parameters are fined:

The subcarrier spacing is defined as $\Delta f_{SC} = n \cdot f_{SC_{legacy}}$, where n is an integer number larger than 1 (e.g. multiple of 2), and $f_{SC_{legacy}} = 15$ kHz. The implementation may be applicable to all legacy LTE system BWs of 1.4 MHz, 3 MHz, 5 MHz, 10 MHz, 15 MHz and 20 MHz, but also larger system BWs can be supported, such as 40 MHz, 60 MHz, 80 MHz, 100 MHz, etc. For example, for n=2, the $\Delta f_{SC} = 30$ kHz and for n=4, the $\Delta f_{SC} = 60$ kHz.

The FFT/IFFT size $N_{FFT} = N_{FFT_{legacy}}/n$, where n is the same parameter noted above in connection with the subcarrier spacing. For example, depending on the system BW, the FFT/IFFT size may be:

$N_{FFT} = 64$ for the system BW=1.4 MHz;
$N_{FFT} = 128$ for the system BW=3 MHz;
$N_{FFT} = 256$ for the system BW=5 MHz;
$N_{FFT} = 512$ for the system BW=10 MHz;
$N_{FFT} = 768$ or 1024 for the system BW=15 MHz; and
$N_{FFT} = 1024$ for the system BW=20 MHz.

In comparison to legacy LTE, the sampling time $T_S$ remains unchanged for the (different legacy system BWs noted above):

$$T_S = 1/(\Delta f_{SC} \cdot N_{FFT}) = 1/(\Delta f_{SC_{legacy}} \cdot n \cdot N_{FFT_{legacy}}/n) = T_{S_{legacy}}$$

The OFDM/SC-FDMA symbol duration $T_{Symb}$ is reduced by the factor of n in comparison to the legacy LTE symbol $T_{Symb_{legacy}}$.

$$T_{symb_{NCP0}} = (N_{CP0} + N_{FFT}) \cdot T_S = (N_{CP0_{legacy}}/n + N_{FFT_{legacy}}/n) \cdot T_S = T_{symb_{legacy\_NCP0}}$$

for the normal CP of the 1$^{st}$ OFDM/SD-FDMA symbol of each of the two slots of the subframe (CP0);

$$T_{symb_{NCP1}} = (N_{CP1} + N_{FFT}) \cdot T_S = (N_{CP1_{legacy}}/n + N_{FFT_{legacy}}/n) \cdot T_S = T_{symb_{legacy\_NCP1}}$$

for the normal CP of the 2$^{nd}$ to 6$^{th}$ OFDM/SD-FDMA symbol of each of the two slots of the subframe (CP1);

$$T_{symb_{ECP}} = (N_{ECP} + N_{FFT}) \cdot T_S = (N_{ECP_{legacy}}/n + N_{FFT_{legacy}}/n) \cdot T_S = T_{symb_{legacy\_ECP}}$$

for the extended CP (ECP) for the OFDM/SD-FDMA symbols of the subframe;

The subframe duration $T_{SF}$ is reduced by the factor n: $T_{SF} = T_{SF_{legacy}}/n$. For example, for n=2, the subframe duration $T_{SF} = 0.50$ ms, and for n=4, the subframe duration $T_{SF} = 0.25$ ms. The slot duration of the two slots of the subframe is reduced accordingly. Each slot comprises 7 OFDM/SD-FDMA symbols for normal CP, and 6 OFDM/SD-FDMA symbols for extended CP.

The following table summarizes the various parameters above for different system BWs ("Bandwidth") and different subcarrier spacing ($\Delta f_{SC}$). Note that the parameter "nPRB" refers to the PRBs available for use under the given setting of system BWs ("Bandwidth") and different subcarrier spacing ($\Delta f_{SC}$).

TABLE 1

| Bandwith (BW) | $\Delta f_{SC} = 15$ kHz | $\Delta f_{SC} = 30$ kHz | $\Delta f_{SC} = 60$ kHz |
|---|---|---|---|
| 1.4 MHz | $N_{FFT} = 128$<br>Ts = 520.8 ns<br>$T_{symb\_NCP0} = 72$ μs<br>$T_{symb\_NCP1} = 71.5$ μs<br>$T_{symb\_ECP} = 83.5$ μs<br>nPRBs = 6 | $N_{FFT} = 64$<br>Ts = 520.8 ns<br>$T_{symb\_NCP0} = 36$ μs<br>$T_{symb\_NCP1} = 35.7$ μs<br>$T_{symb\_ECP} = 41.7$ μs<br>nPRBs = 3 | $N_{FFT} = 32$<br>Ts = 520.8 ns<br>$T_{symb\_NCP0} = 18$ μs<br>$T_{symb\_NCP1} = 17.9$ μs<br>$T_{symb\_ECP} = 20.9$ μs<br>nPRBs = 1 |
| 3 MHz | $N_{FFT} = 256$<br>Ts = 260.4 ns<br>$T_{symb\_NCP0} = 72$ μs<br>$T_{symb\_NCP1} = 71.5$ μs<br>$T_{symb\_ECP} = 83.5$ μs<br>nPRBs = 15 | $N_{FFT} = 128$<br>Ts = 260.4 ns<br>$T_{symb\_NCP0} = 36$ μs<br>$T_{symb\_NCP1} = 35.7$ μs<br>$T_{symb\_ECP} = 41.7$ μs<br>nPRBs = 7 | $N_{FFT} = 64$<br>Ts = 260.4 ns<br>$T_{symb\_NCP0} = 18$ μs<br>$T_{symb\_NCP1} = 17.9$ μs<br>$T_{symb\_ECP} = 20.9$ μs<br>nPRBs = 3 |
| 5 MHz | $N_{FFT} = 512$<br>Ts = 130.2 ns<br>$T_{symb\_NCP0} = 72$ μs<br>$T_{symb\_NCP1} = 71.5$ μs<br>$T_{symb\_ECP} = 83.5$ μs<br>nPRBs = 25 | $N_{FFT} = 256$<br>Ts = 130.2 ns<br>$T_{symb\_NCP0} = 36$ μs<br>$T_{symb\_NCP1} = 35.7$ μs<br>$T_{symb\_ECP} = 41.7$ μs<br>nPRBs = 12 | $N_{FFT} = 128$<br>Ts = 130.2 ns<br>$T_{symb\_NCP0} = 18$ μs<br>$T_{symb\_NCP1} = 17.9$ μs<br>$T_{symb\_ECP} = 20.9$ μs<br>nPRBs = 6 |
| 10 MHz | $N_{FFT} = 1024$<br>Ts = 65.1 ns<br>$T_{symb\_NCP0} = 72$ μs<br>$T_{symb\_NCP1} = 71.5$ μs<br>$T_{symb\_ECP} = 83.5$ μs<br>nPRBs = 50 | $N_{FFT} = 512$<br>Ts = 65.1 ns<br>$T_{symb\_NCP0} = 36$ μs<br>$T_{symb\_NCP1} = 35.7$ μs<br>$T_{symb\_ECP} = 41.7$ μs<br>nPRBs = 25 | $N_{FFT} = 256$<br>Ts = 65.1 ns<br>$T_{symb\_NCP0} = 18$ μs<br>$T_{symb\_NCP1} = 17.9$ μs<br>$T_{symb\_ECP} = 20.9$ μs<br>nPRBs = 12 |
| 15 MHz | $N_{FFT} = 1536$ or 2048<br>Ts = 32.6 ns<br>$T_{symb\_NCP0} = 72$ μs<br>$T_{symb\_NCP1} = 71.5$ μs<br>$T_{symb\_ECP} = 83.5$ μs<br>nPRBs = 75 | $N_{FFT} = 768$ or 1024<br>Ts = 32.6 ns<br>$T_{symb\_NCP0} = 36$ μs<br>$T_{symb\_NCP1} = 35.7$ μs<br>$T_{symb\_ECP} = 41.7$ μs<br>nPRBs = 37 | $N_{FFT} = 384$ or 512<br>Ts = 32.6 ns<br>$T_{symb\_NCP0} = 18$ μs<br>$T_{symb\_NCP1} = 17.9$ μs<br>$T_{symb\_ECP} = 20.9$ μs<br>nPRBs = 18 |

TABLE 1-continued

| Bandwith (BW) | $\Delta f_{SC}$ = 15 kHz | $\Delta f_{SC}$ = 30 kHz | $\Delta f_{SC}$ = 60 kHz |
|---|---|---|---|
| 20 MHz | $N_{FFT}$ = 2048<br>Ts = 32.6 ns<br>$T_{symb\_NCP0}$ = 72 µs<br>$T_{symb\_NCP1}$ = 71.5 µs<br>$T_{symb\_ECP}$ = 83.5 µs<br>nPRBs = 100 | $N_{FFT}$ = 1024<br>Ts = 32.6 ns<br>$T_{symb\_NCP0}$ = 36 µs<br>$T_{symb\_NCP1}$ = 35.7 µs<br>$T_{symb\_ECP}$ = 41.7 µs<br>nPRBs = 50 | $N_{FFT}$ = 512<br>Ts = 32.6 ns<br>$T_{symb\_NCP0}$ = 18 µs<br>$T_{symb\_NCP1}$ = 17.9 µs<br>$T_{symb\_ECP}$ = 20.9 µs<br>nPRBs = 25 |
| 30 MHz | $N_{FFT}$ = 3072 or 4096<br>Ts = 16.3 ns<br>$T_{symb\_NCP0}$ = 72 µs<br>$T_{symb\_NCP1}$ = 71.5 µs<br>$T_{symb\_ECP}$ = 83.5 µs<br>nPRBs = 150 | $N_{FFT}$ = 1536 or 2048<br>Ts = 16.3 ns<br>$T_{symb\_NCP0}$ = 36 µs<br>$T_{symb\_NCP1}$ = 35.7 µs<br>$T_{symb\_ECP}$ = 41.7 µs<br>nPRBs = 75 | $N_{FFT}$ = 768 or 1024<br>Ts = 16.3 ns<br>$T_{symb\_NCP0}$ = 18 µs<br>$T_{symb\_NCP1}$ = 17.9 µs<br>$T_{symb\_ECP}$ = 20.9 µs<br>nPRBs = 37 |
| 40 MHz | $N_{FFT}$ = 4096<br>Ts = 16.3 ns<br>$T_{symb\_NCP0}$ = 72 µs<br>$T_{symb\_NCP1}$ = 71.5 µs<br>$T_{symb\_ECP}$ = 83.5 µs<br>nPRBs = 200 | $N_{FFT}$ = 2048<br>Ts = 16.3 ns<br>$T_{symb\_NCP0}$ = 36 µs<br>$T_{symb\_NCP1}$ = 35.7 µs<br>$T_{symb\_ECP}$ = 41.7 µs<br>nPRBs = 100 | $N_{FFT}$ = 1024<br>Ts = 16.3 ns<br>$T_{symb\_NCP0}$ = 18 µs<br>$T_{symb\_NCP1}$ = 17.9 µs<br>$T_{symb\_ECP}$ = 20.9 µs<br>nPRBs = 50 |

A second aspect of this disclosure relates to enhanced Demodulation Reference Signal (DMRS) patterns. The DMRS pattern suggested in some implementations of this disclosure may have a reduced time separation between the reference signals (RS) to facilitate more accurate CFO estimation and/or channel estimation for different data and control SL physical channels (e.g. PSSCH, PSCCH, PSDCH, etc.). When used on (legacy or non-legacy LTE) UL and DL physical channels (e.g. PDSCH, PDCCH, PDDCH, PUSCH, PUCCH, etc.), the improvements to the DMRS pattern suggested in this disclosure may also facilitate more accurate CFO estimation and/or channel estimation on these channels. According to the second aspect, the number OFDM/SC-FDMA symbols per subframe carrying DMRS may be increased (e.g. to four DMRS per subframe) and/or the distance(s) between adjacent OFDM/SC-FDMA symbols carrying DMRS within a subframe is/are optimized to improve CFO estimation and/or channel estimation accuracy. For instance, the reduced time separation between the DMRS symbols results in the increased maximum CFO which can be estimated at the UE, and can hence be handled at the UE. The modifications on the number of the DMRS symbols and their positions can also affect the channel estimation accuracy as they may enable better channel interpolation filter accuracy.

Following the legacy LTE design, the DMRS for OFDM/SC-FDMA based systems may have a frequency contiguous transmission pattern and occupies all REs in a PRB pair in the allocated symbol (e.g. 12 contiguous REs in one symbol). However, as will become more apparent from the following, DMRS may be also designed for a non-frequency contiguous transmission pattern so that they do not occupy all REs in a PRB pair of the OFDM/SC-FDMA symbol. In the latter case, the REs carrying the DMRS symbols may have a periodic pattern (e.g. every mth RE in the PRB pair of a OFDM/SC-FDMA symbol carries a DMRS symbol). Note that the term "DMRS symbol" is used herein to refer to the time domain OFDM/SC-FDMA symbol carrying a portion of the DMRS REs.

Optionally, the first and second aspect of this disclosure can be combined by using the subframe structure of the first aspect (e.g. as shown in FIG. 1) on the radio interface and employing a DMRS pattern in accordance with the second aspect in this subframe structure. Furthermore, it should be noted that the second aspects and implementations therefore are suitable for use in V2X communications environments, but are not limited thereto.

Figure 6:
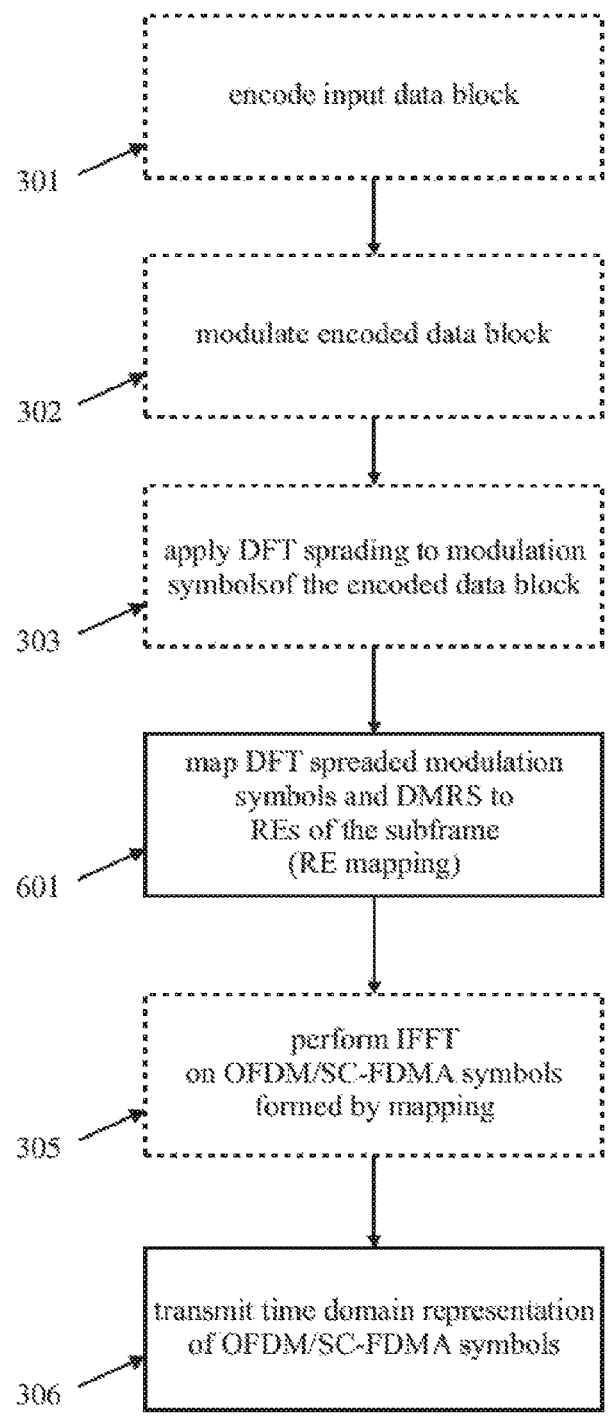
FIG. 6 shows an exemplary (simplified) flow chart for mapping DMRS to a subframe and transmitting the subframe according to an example implementation of a second aspect of this disclosure.
Figure 7:
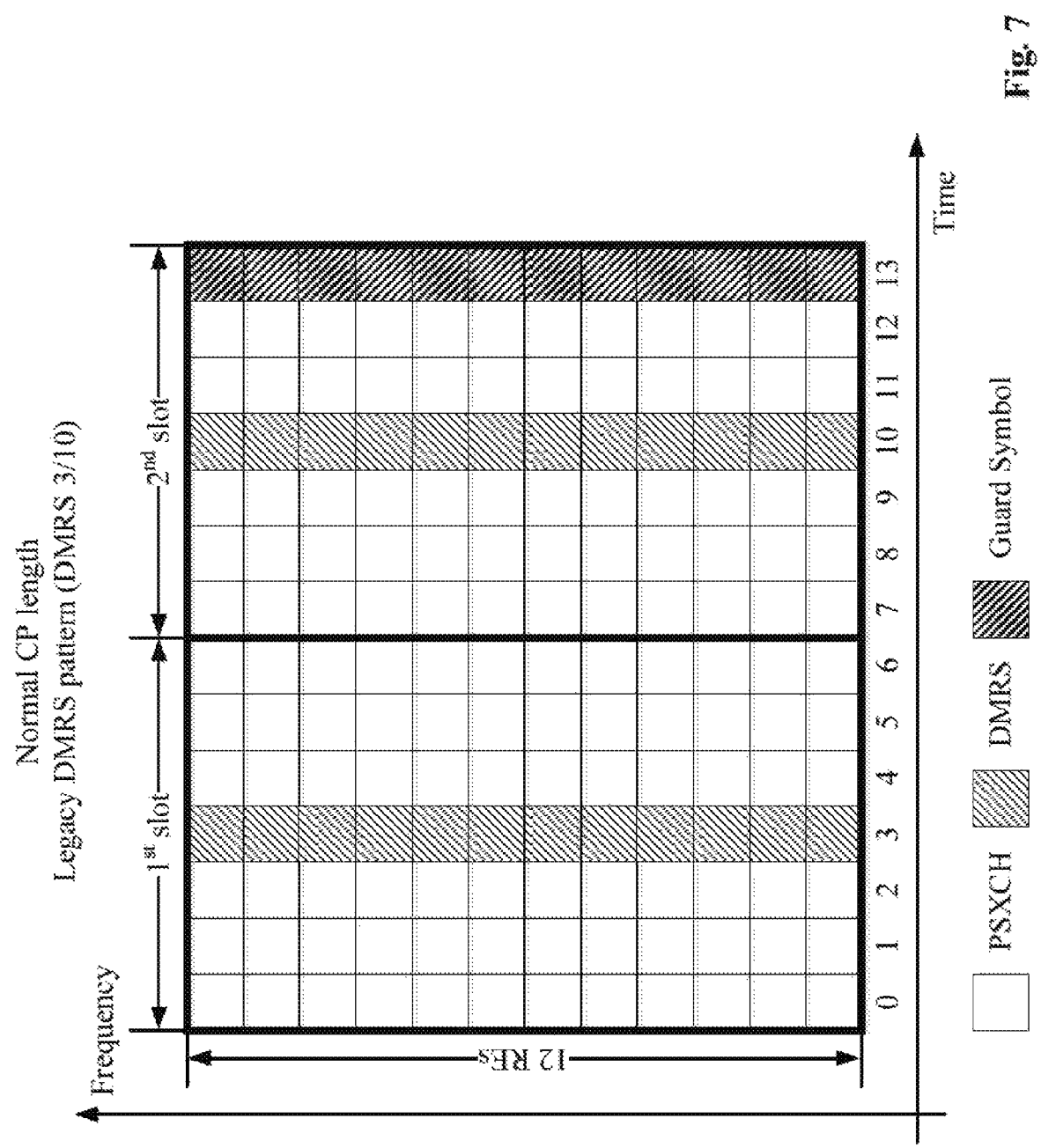
FIGS. 7-13 show an exemplarily structure of OFDM/SC-FDMA symbols with normal CP in a subframe for SL with different DMRS mapping patterns according to an exemplary implementation of the second aspect of this disclosure.
Figure 8:
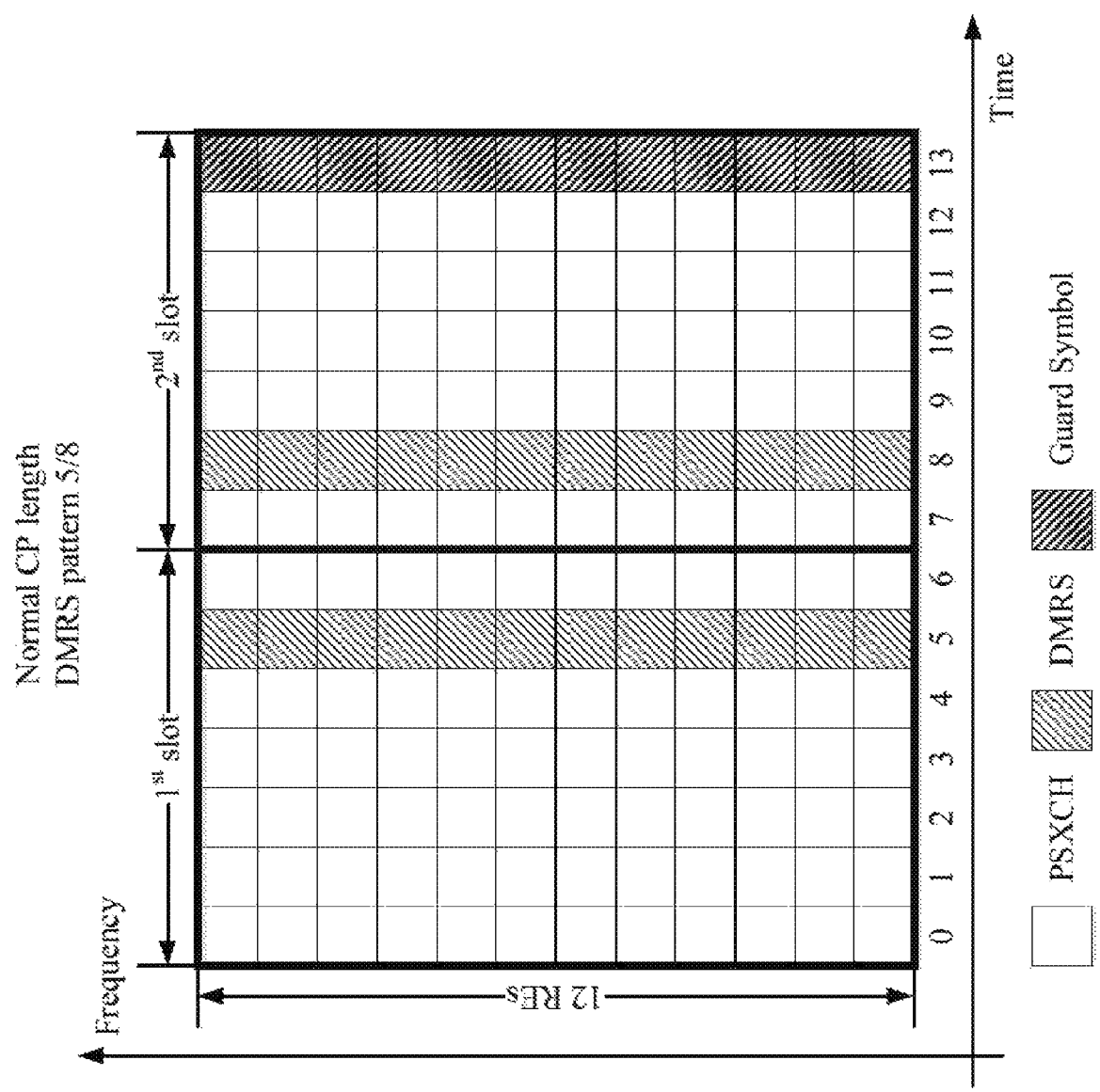
Figure 9:
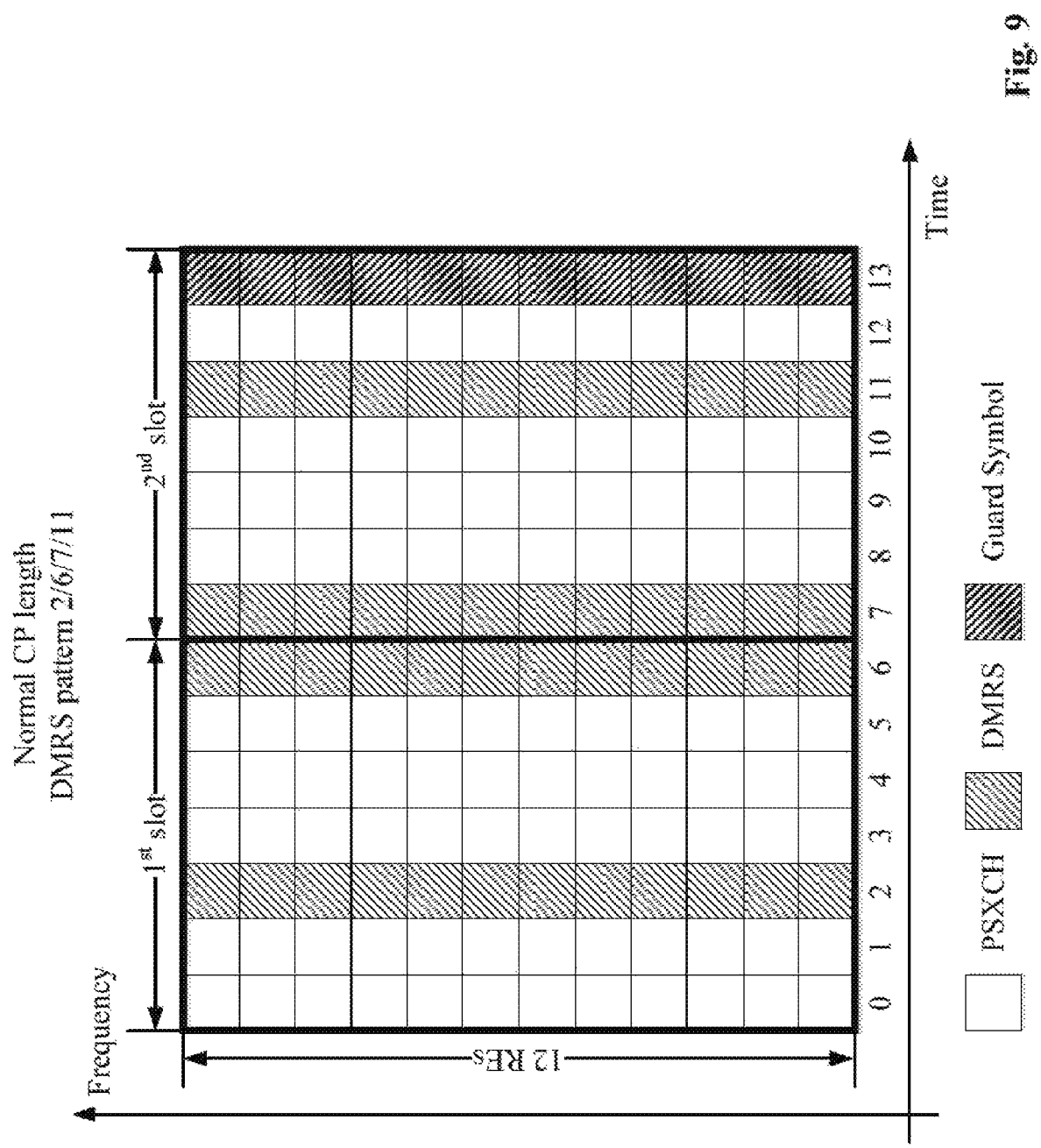
Figure 10:
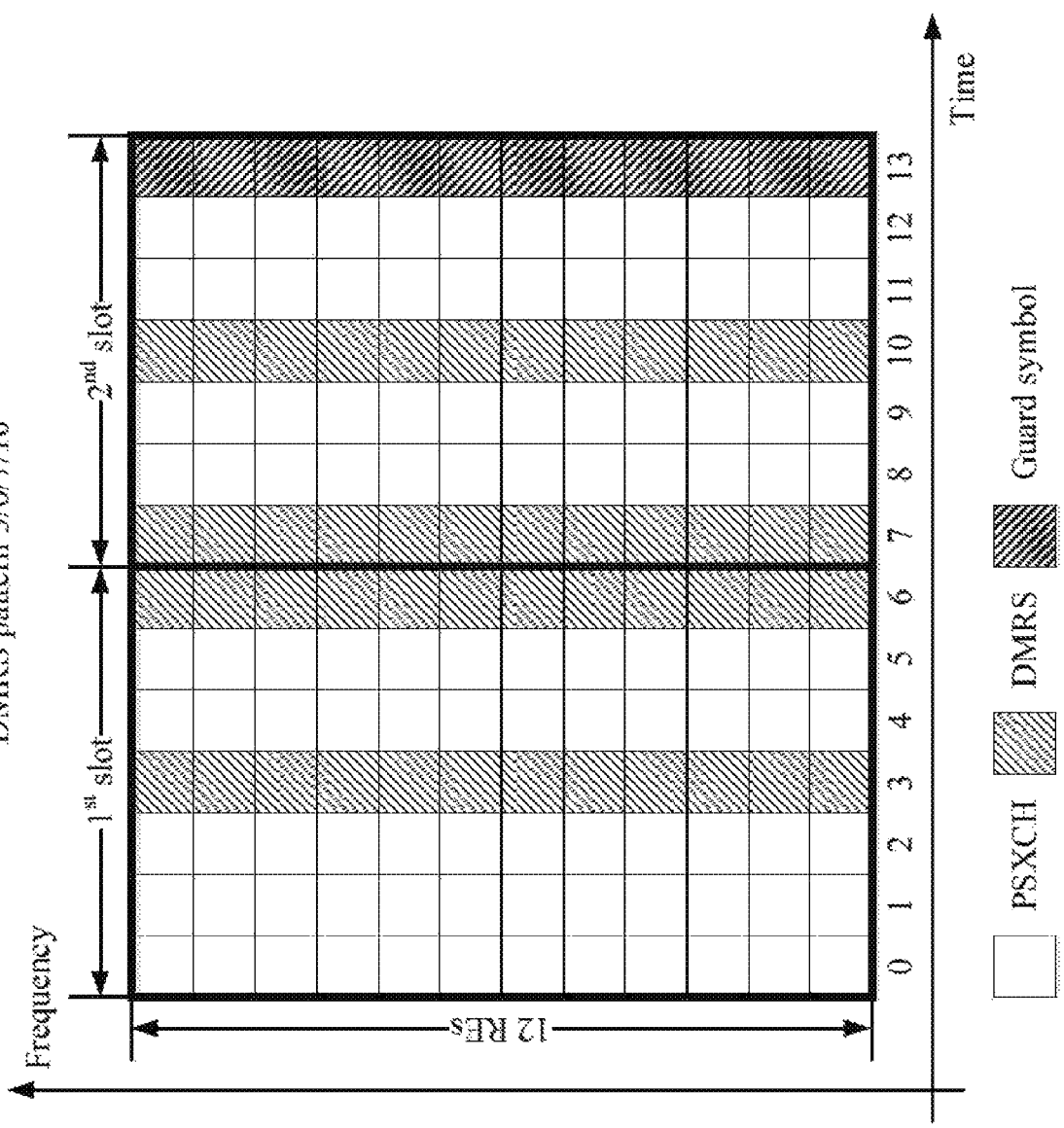
Figure 11:
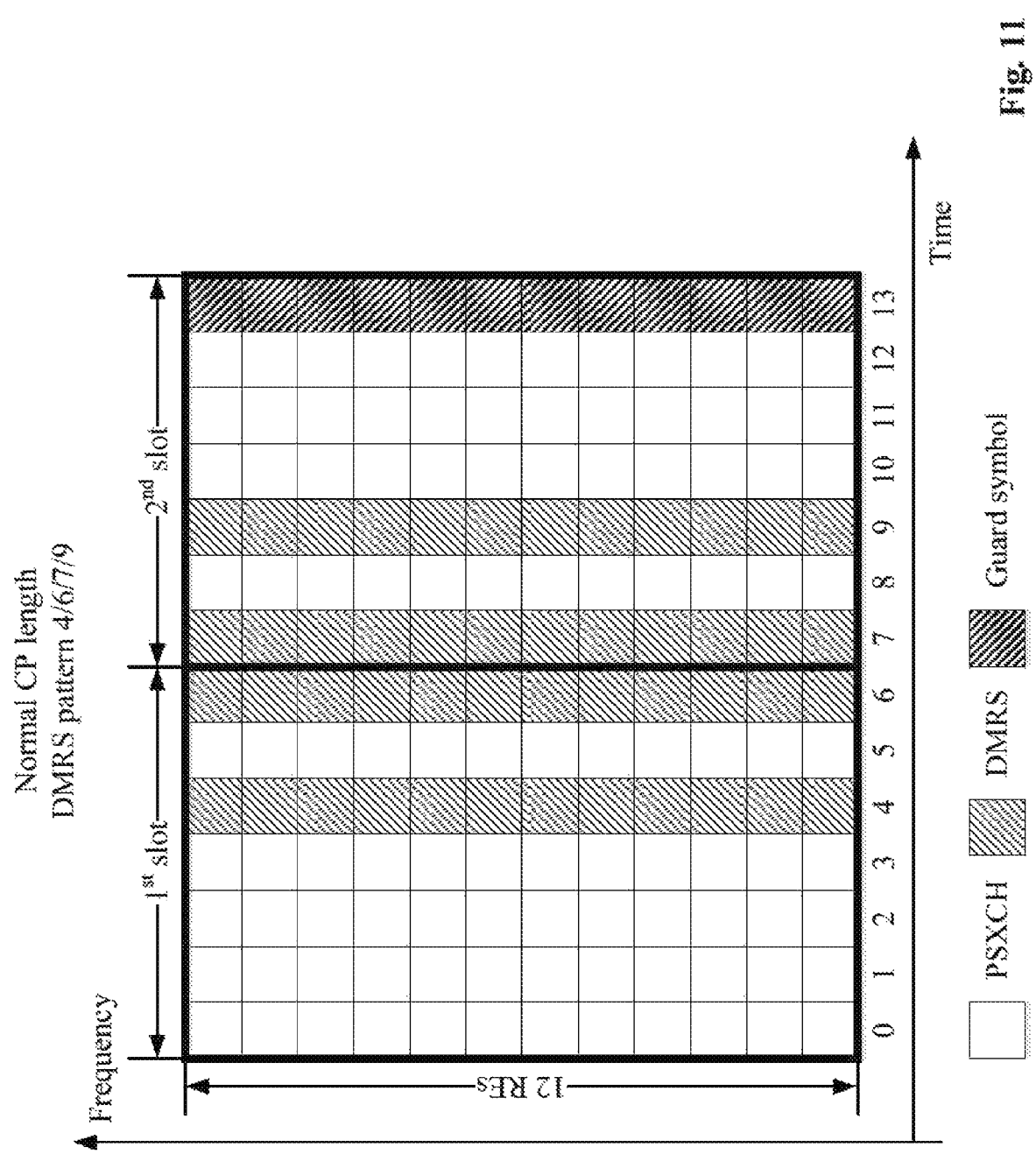
Figure 12:
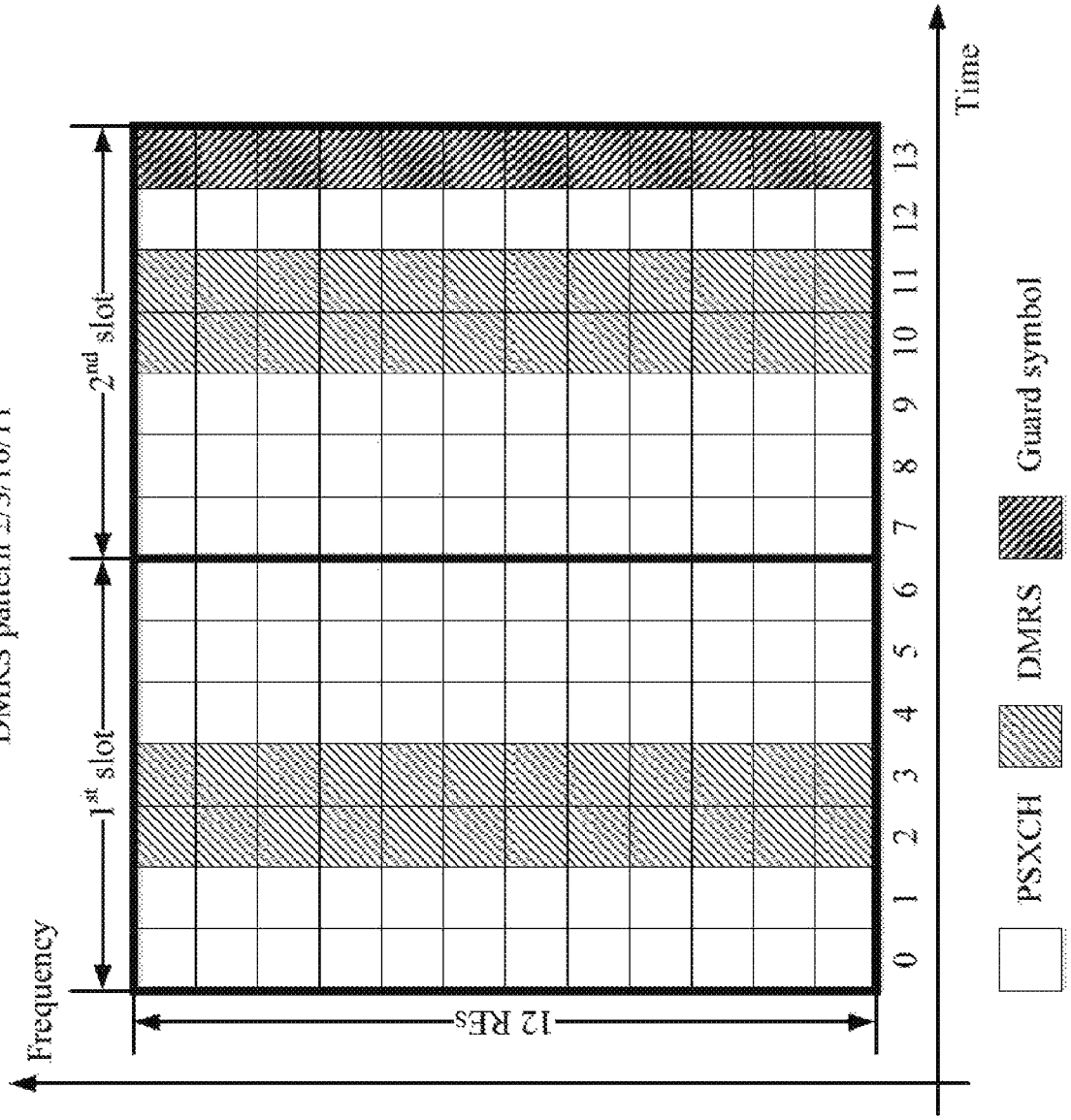
Figure 13:
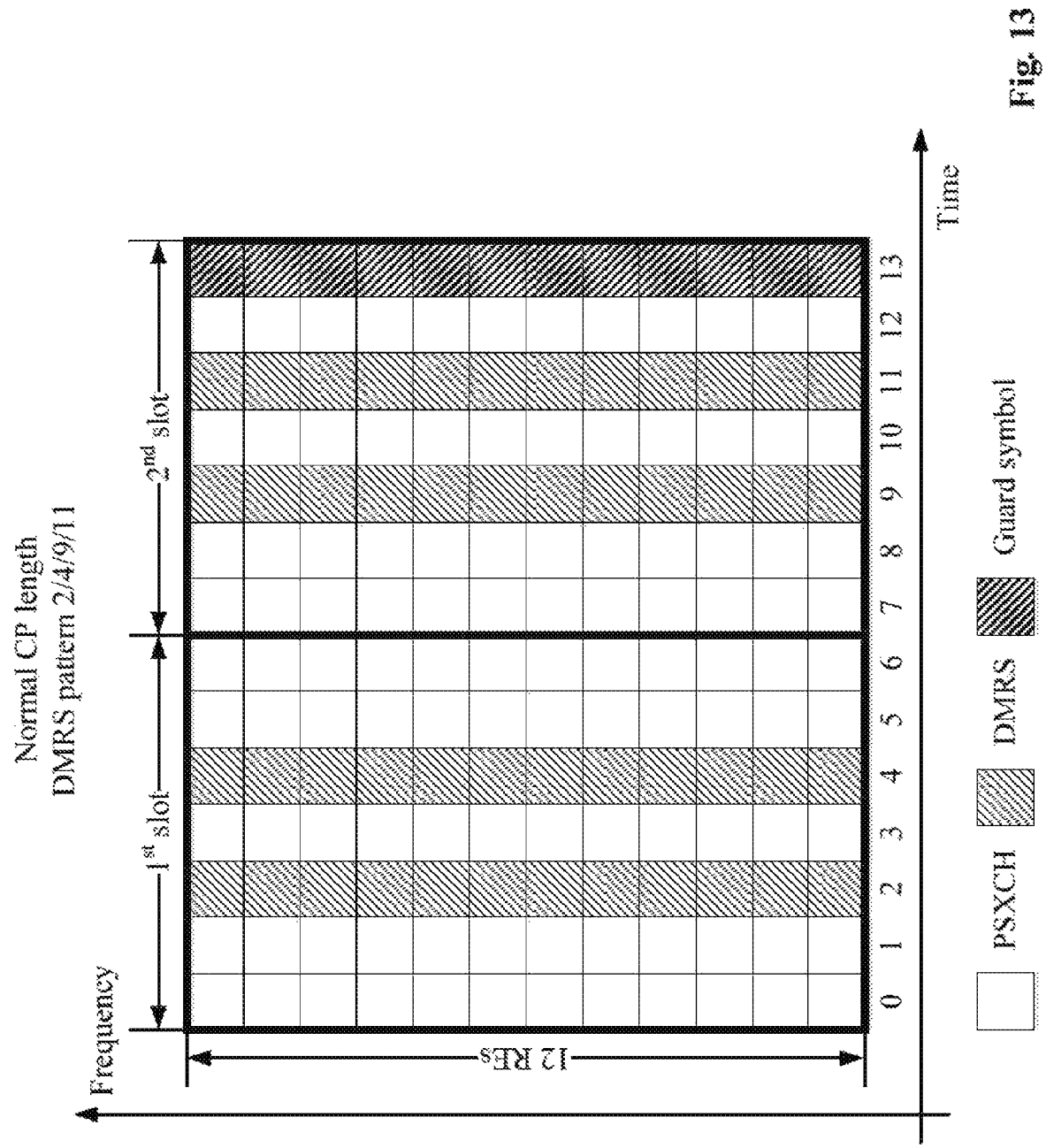
Figure 14:
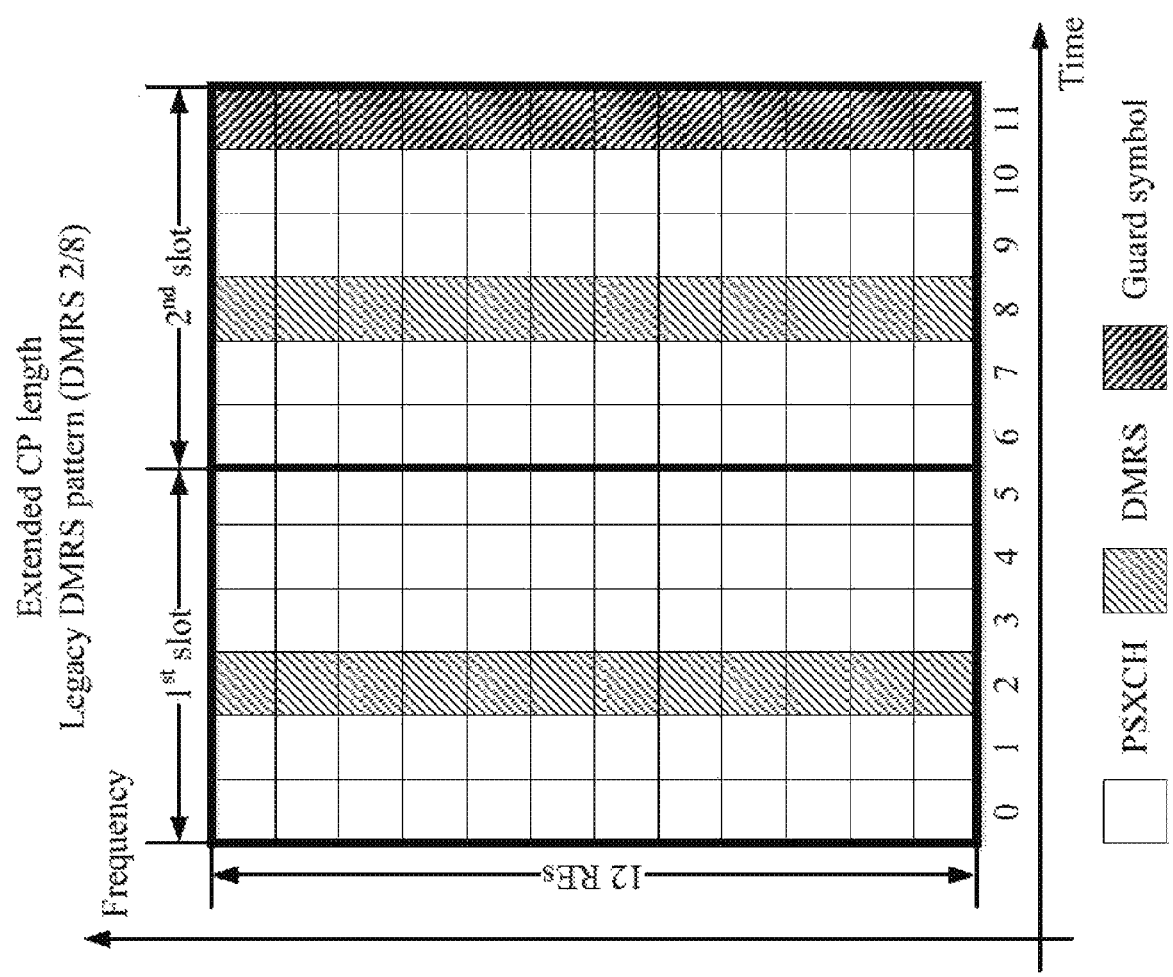
FIGS. 14-19 show an exemplarily structure of OFDM/SC-FDMA symbols with extended CP in a subframe for SL with different DMRS mapping patterns according to an exemplary implementation of the second aspect of this disclosure.
Figure 15:
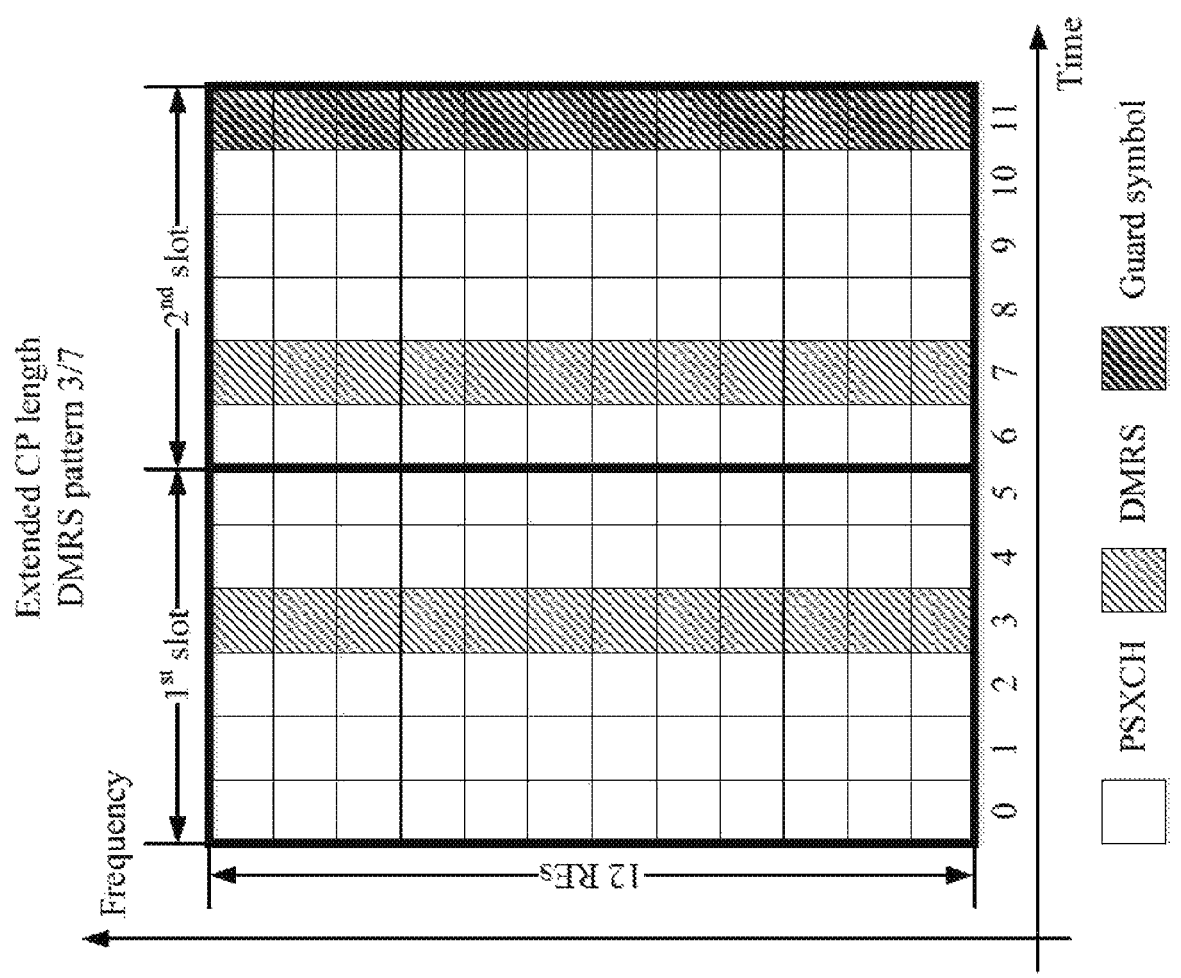
Figure 16:
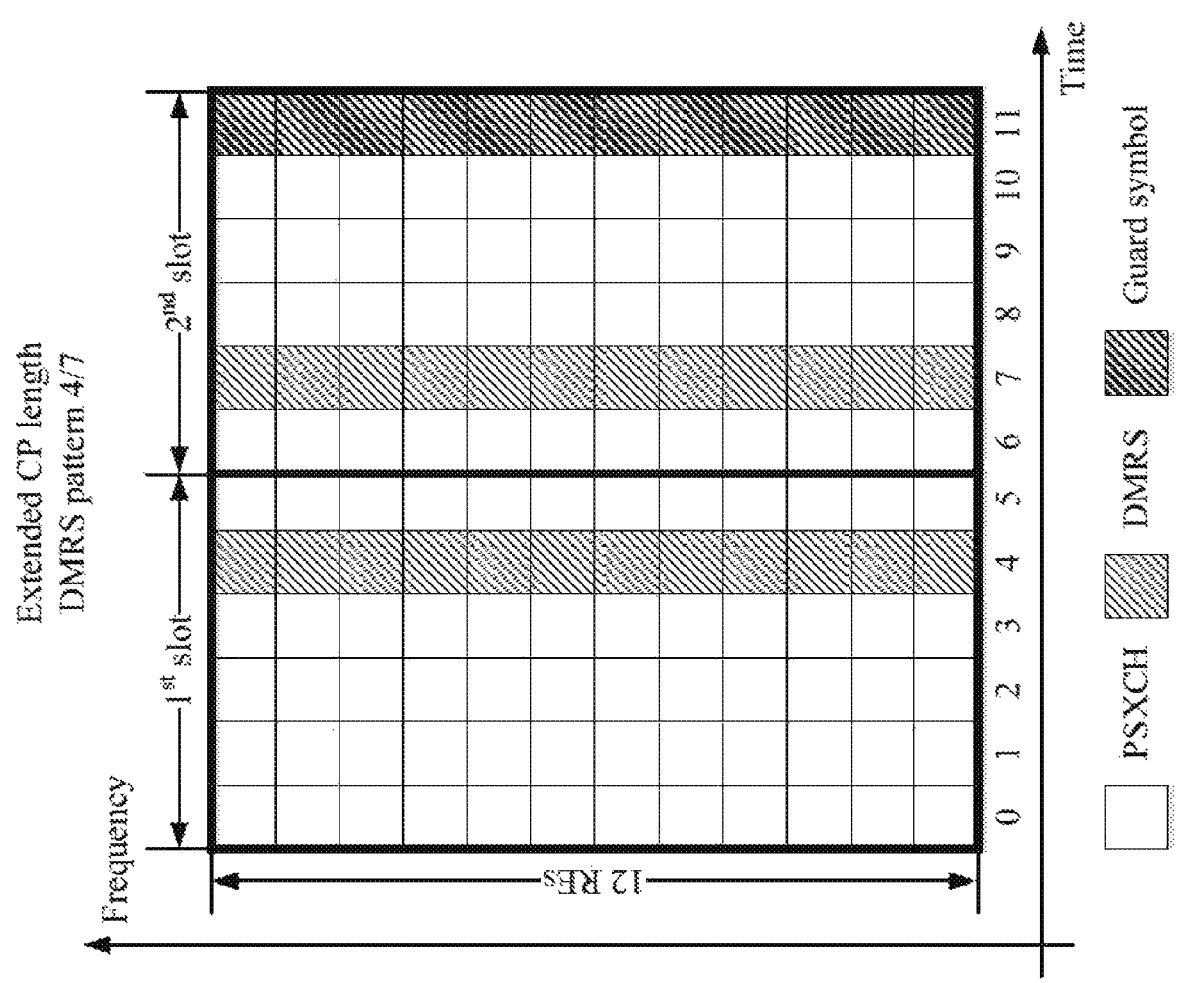
Figure 17:
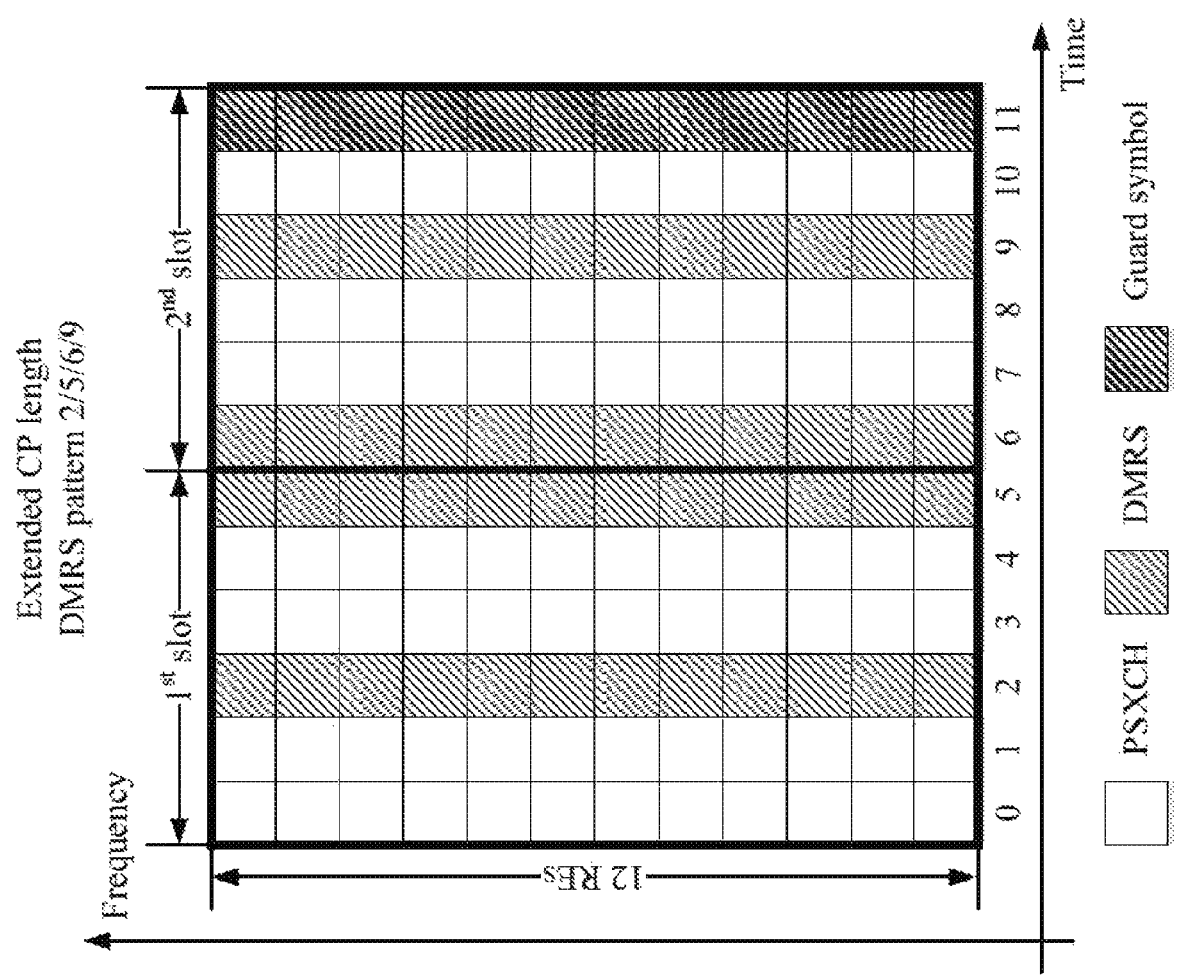
Figure 18:
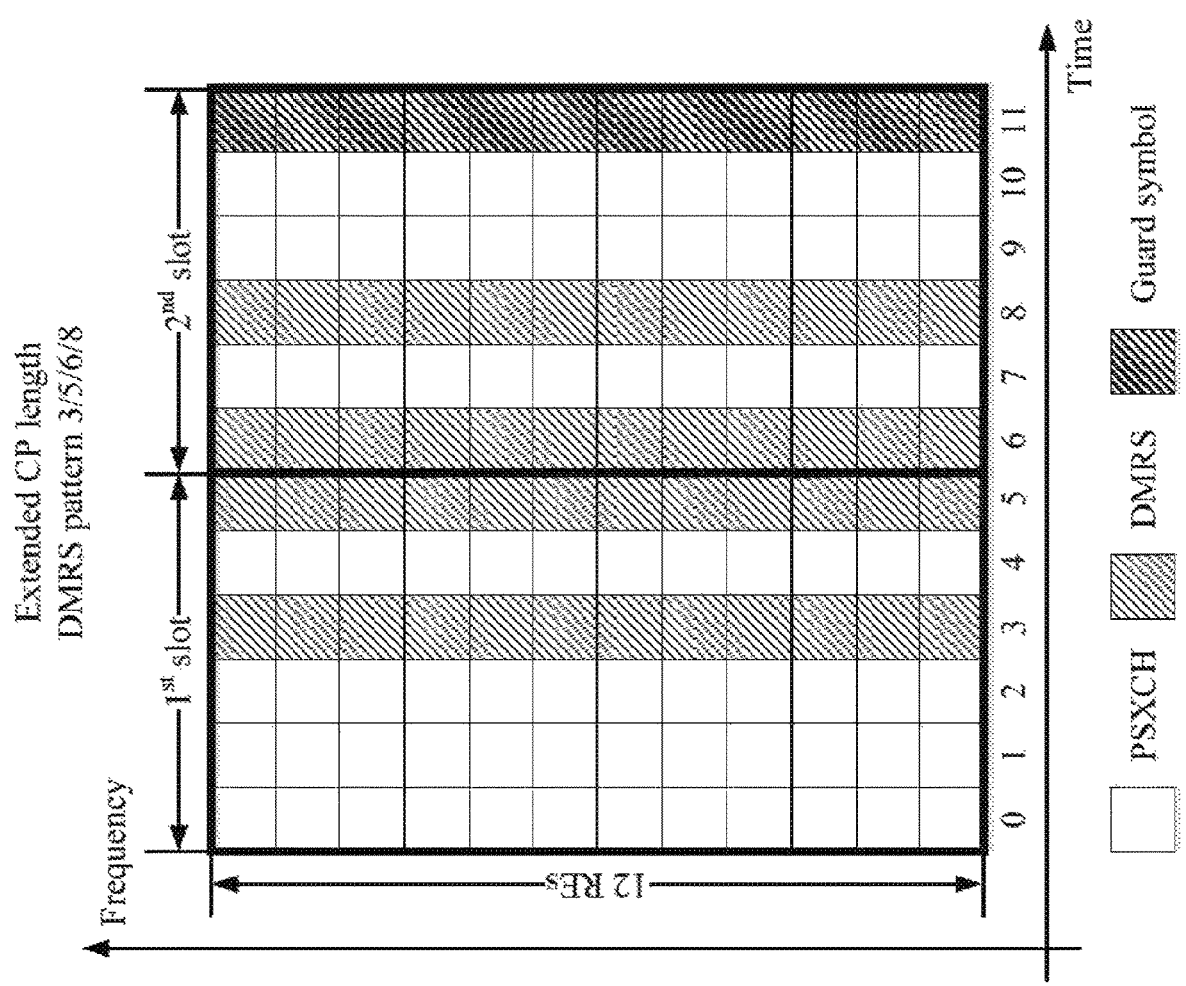
Figure 19:
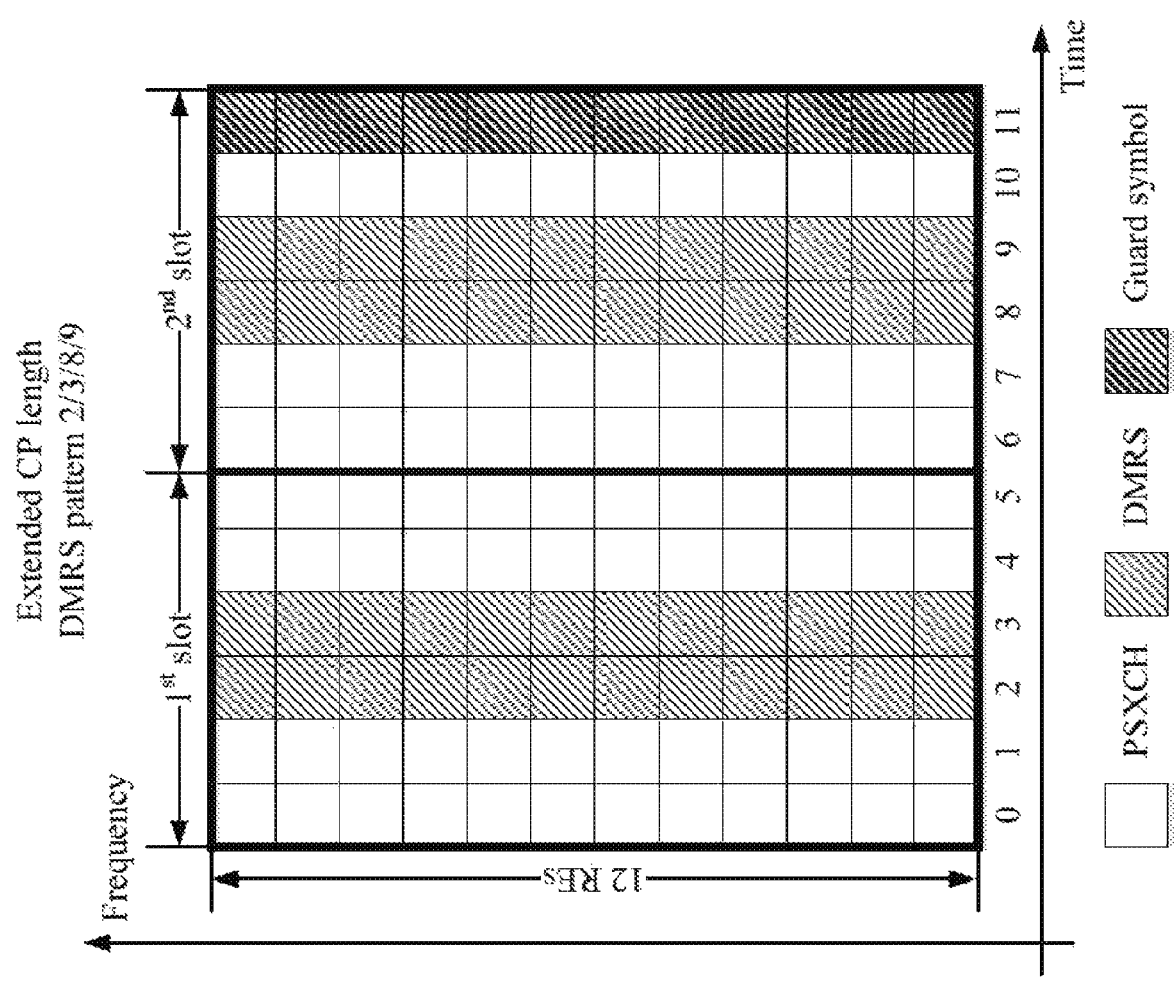

An exemplary implementation of the second aspect is discussed with respect to FIG. 2 and FIG. 6 in the following. FIG. 6 shows an exemplary (simplified) flow chart for mapping DMRS to a subframe and transmitting the subframe according to an example implementation of this disclosure. Note that the steps performed at 301-303 and 305 of FIG. 6 correspond to the steps described with respect to FIG. 3 above and are not essential for the implementation of the second aspect. Also a MIMO scheme may be used in the second aspect, similar to the explanations above in connection with FIG. 3. Further note that the use of a subframe according to the first aspect (e.g. FIG. 1) is possible in this example implementation, but is not mandatory. The implementation also refers to legacy LTE subframe structures.

Different from the implementation of FIG. 3, the mapping 601 of the FFT processed modulation symbols and the DMRS to the subframe by the subcarrier mapping unit 205 is modified such that multiple DMRS are mapped to at least two (e.g. two or four) of the OFDM/SC-FDMA symbols within the subframe. The subframe may have a predetermined number $N_{SC}^{BW}$ of subcarriers in the frequency domain, and a predetermined number $N_{symb}$ of OFDM/SC-FDMA symbols in the time domain. After applying 305 the IFFT, the time domain representation of the OFDM/SC-FDMA symbols of the subframe, including the DMRS, is transmitted 306 using a RF circuitry 204.

Optionally, the subframe is divided, in the time domain, into two slots. If there are two DMRS to be mapped to the subframe, each DMRS is mapped to another slot of the subframe. If there are four DMRS to be mapped to the subframe, two of the DMRS are mapped OFDM/SC-FDMA symbols in the first slot and the other two of the DMRS are mapped to OFDM/SC-FDMA symbols in the second slot of the subframe.

The slot structure is also exemplified in the subframe structure shown in FIG. 1, where the first half (i.e. 7) OFDM/SC-FDMA symbols can be considered to form a first slot of the subframe and the second half (i.e. 7) OFDM/SC-FDMA symbols can be considered to form a second slot of the subframe. The individual OFDM/SC-FDMA symbols of a subframe, as for example shown in FIG. 1, are considered be indexed with indices 0 to $N_{symb}-1$ in the time domain for easier reference of the OFDM/SC-FDMA symbols in the following disclosure.

The number of DMRS per subframe and/or the OFDM/SC-FDMA symbols to which the DMRS are to be mapped may be for example configured by the network (e.g. eNB) using RRC signaling using a corresponding RRC message.

In one exemplary implementation of the second aspect and assuming that the subframe has $N_{symb}=14$ OFDM/SC-FDMA symbols being indexed from 0 to 13, each OFDM/SC-FDMA symbol may have a normal cyclic prefix and the DMRS are transmitted by the UE in:
- the OFDM/SC-FDMA symbols having the indices 3 and 10, or
- the OFDM/SC-FDMA symbols having the indices 5 and 8, or
- the OFDM/SC-FDMA symbols having the indices 2, 6, 7 and 11, or
- the OFDM/SC-FDMA symbols having the indices 3, 6, 7 and 10, or
- the OFDM/SC-FDMA symbols having the indices 4, 6, 7 and 9, or
- the OFDM/SC-FDMA symbols having the indices 2, 3, 10 and 11, or
- the OFDM/SC-FDMA symbols having the indices 2, 4, 9, 11.

The above exemplary mapping of DMRS to the different OFDM/SC-FDMA symbols is also illustrated in FIGS. 7 to 12. FIGS. 7-13 show an exemplarily structure of a subframe for SL and the corresponding physical channels are referred to as "PSXCH" for simplicity (e.g. PSSCH, PSCCH, etc).

The DMRS 3/8 mapping has same overhead as legacy LTE DMRS (DMRS 3/10), however, the inter-DMRS distance is reduced which allows to increasing the robustness of channel estimation and CFO estimation to the high Doppler fading and frequency offsets.

In the DMRS 2/6/7/11 mapping, the DMRS 4/6/7/9 mapping and the DMRS 2/4/9/11 there are four DMRS symbols per subframe with uniform distribution. DMRSs on OFDM/SC-FDMA symbols 6 and 7 could be used to increase reliability of CFO estimation.

The DMRS 3/6/7/10 mapping can be advantageous because two of the four DMRS symbols have same position as legacy DMRS and thus potentially enable dynamic DMRS pattern selection mechanisms (e.g. use legacy pattern for some UEs and used enhanced DMRS pattern for other UEs).

In the DMRS 2/3/10/11 mapping there are again four DMRS symbols per subframe. Two DMRS symbols have same position as legacy DMRS. DMRSs on OFDM/SC-FDMA symbols 2 and 3 and DMRSs on OFDM/SC-FDMA symbols 10 and 11 could be used to increase reliability of CFO estimation.

In another exemplary implementation of the second aspect and assuming that the subframe has $N_{symb}=12$ OFDM/SC-FDMA symbols being indexed from 0 to 11, each OFDM/SC-FDMA symbol may have an extended cyclic prefix and the DMRS are transmitted by the UE in:
- the OFDM/SC-FDMA symbols having the indices 2 and 8 (DMRS 2/8), or
- the OFDM/SC-FDMA symbols having the indices 3 and 7 (DMRS 3/7), or
- the OFDM/SC-FDMA symbols having the indices 4 and 7 (DMRS 4/7), or
- the OFDM/SC-FDMA symbols having the indices 2, 5, 6 and 9 (DMRS 2/5/6/8), or
- the OFDM/SC-FDMA symbols having the indices 3, 5, 6 and 8 (DMRS 3/5/6/8), or
- the OFDM/SC-FDMA symbols having the indices 2, 3, 8 and 9 (DMRS 2/3/8/9).

The above exemplary mapping of DMRS to the different OFDM/SC-FDMA symbols is also illustrated in FIGS. 14-19. As in FIGS. 7-13, also FIGS. 14-19 show an exemplarily structure of a subframe for SL and the corresponding physical channels are referred to as "PSXCH" for simplicity.

The DMRS 3/7 mapping and the DMRS 4/7 mapping have the same overhead as legacy DMRS (DMRS 2/8) while the inter-DMRS distance is reduced. This can help to increase the robustness of the channel and CFO estimation against high Doppler fading.

The DMRS 2/5/6/9 mapping and the DMRS 3/5/6/8 each provide four DMRS symbols per subframe with uniform distribution. DMRSs mapped to OFDM/SC-FDMA symbols 5 and 6 could be used to increase reliability of CFO estimation.

The DMRS 2/3/8/9 mapping has the advantage that two DMRS have same position as in the legacy LTE subframes. DMRSs mapped to OFDM/SC-FDMA symbols 2 and 3 and DMRSs mapped to OFDM/SC-FDMA symbols 8 and 9 could be used to increase reliability of CFO estimation.

An extension of the second aspect discussed above relates to a new transmission scheme for the DMRS, where the DMRS is not occupying all REs of the respective OFDM/SC-FDMA symbol. In the extension of the second aspect, measures are taken such that the each DMRS of a subframe has a transmission pattern that occupies REs of a respective OFDM/SC-FDMA symbol carrying the DMRS of a predetermined periodic pattern (i.e. only a subset of the available REs of the respective OFDM/SC-FDMA symbol, e.g. every mth RE, where $m \in \{2, 3, 4, \ldots, 8\}$).

Two exemplary realizations for such sparse DMRS transmission are discussed herein below with respect to FIGS. 20 and 21, but the extension of the second aspect is not limited to these two realizations.

An exemplary first implementation of the extension of the second aspect is discussed with respect to FIG. 2 and FIG. 20 in the following. FIG. 20 shows an exemplary (simplified) flow chart for mapping DMRS to a subframe and transmitting the subframe according to the first of the two implementations for sparse DMRS transmission. Note that the steps performed at 301-303 and 305 in FIG. 20 correspond to the steps described with respect to FIG. 3 above and are not essential for the implementation of the extension of the second aspect. Also a MIMO scheme may be used in the second aspect, similar to the explanations above in connection with FIG. 3. Further note that the use of a subframe according to the first aspect (e.g. FIG. 1) is possible in this example implementation, but is not mandatory. The implementation also refers to legacy LTE subframe structures.

Figure 20:
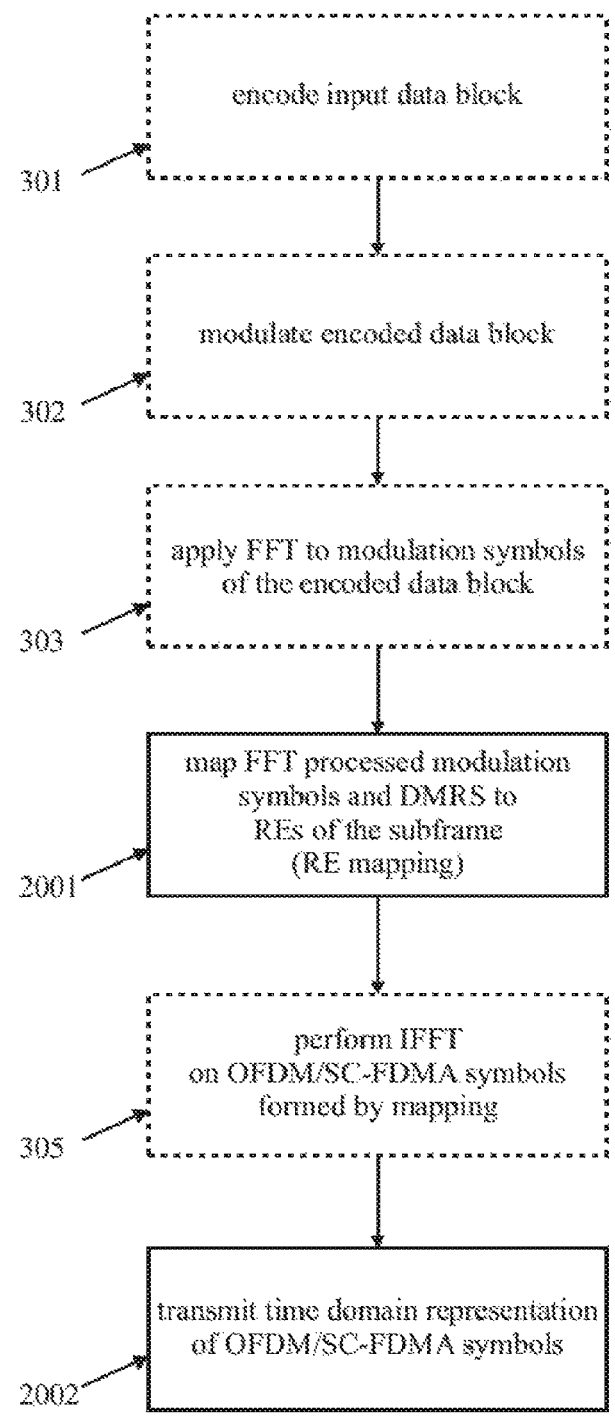
FIG. 20 shows another exemplary (simplified) flow chart for mapping DMRS to a subframe and transmitting the subframe according to another example implementation of the second aspect of this disclosure.

The implementation described with respect to FIG. 20 corresponds to the implementation of FIG. 6, except for the following differences. In the exemplary implementation, DMRS are designed for a non-frequency contiguous transmission pattern so that they do not occupy all REs in (a PRB pair of) the OFDM/SC-FDMA symbol. Instead, the REs carrying the DMRS symbols may have a periodic pattern (e.g. every mth RE in the PRB pair of a OFDM/SC-FDMA symbol carries a DMRS symbol). When mapping 2001 the DMRS to the respective REs (DMRS symbols) of the respective OFDM/SC-FDMA symbols in the subset according to a given DMRS pattern (e.g. as discussed above in connection with FIGS. 7 to 19), the subcarrier mapping unit 205 ensures that a respective DMRS symbol of a DMRS is mapped to only a subset of the REs within the respective OFDM/SC-FDMA symbol so that the DMRS symbols form a periodic pattern. In the transmission step 2002, the RF circuitry 207 uses non-zero power for the transmission of REs of the OFDM/SC-FDMA symbol to which a DMRS symbol has been mapped, and zero power is used for the transmission of REs of the OFDM/SC-FDMA symbol to which no DMRS symbol has been mapped.

Each OFDM/SC-FDMA symbol of the subframe may have $N_{SC}^{BW}$ REs mapped to the respective $N_{SC}^{BW}$ subcarriers of the subframe, and further the $N_{SC}^{BW}$ REs are assumed to be continuously indexed with index $i \in \{0, 1, \ldots, N_{SC}^{BW}-1\}$. According to this exemplary first implementation a periodic pattern can be for example obtained by mapping a respective one of DMRS to the REs having the indices $j(x)=k+m \cdot x$ for $x=[0, 1, \ldots, \lfloor N_{SC}^{BW}/m-1 \rfloor]$ where $m \in \{2, 3, 4, \ldots, 8\}$, and $k \in \{0, \ldots, m-1\}$.

The periodic pattern to be employed for the mapping 2001 may be for example configured by the network (e.g. eNB) using RRC signaling. For example, the RRC message for configuring the periodic pattern could indicated the parameters k and m mentioned above.

An exemplary second implementation of the extension of the second aspect is discussed with respect to FIG. 2 and FIG. 21 in the following. FIG. 21 shows an exemplary (simplified) flow chart for mapping DMRS to a subframe and transmitting the subframe according to the second of the two implementations for sparse DMRS transmission. Note that the steps performed at 301-303 and 305 in FIG. 20 correspond to the steps described with respect to FIG. 3 above and are not essential for the implementation of the extension of the second aspect. Also a MIMO scheme may be used in the second aspect, similar to the explanations above in connection with FIG. 3. Further note that the use of a subframe according to the first aspect (e.g. FIG. 1) is possible in this example implementation, but is not mandatory. The implementation also refers to legacy LTE subframe structures.

In a second implementation of the extended second aspect, each DMRS (still) has a frequency contiguous transmission pattern that occupies all REs of a respective OFDM/SC-FDMA symbol carrying the DMRS. However, prior to transmission, some of the REs are punctured so that only a subset of the REs within an OFDM/SC-FDMA symbol carries the DMRS. For example, the puncturing may be such that every $m^{th}$ RE of the OFDM/SC-FDMA symbol is punctured.

Figure 21:
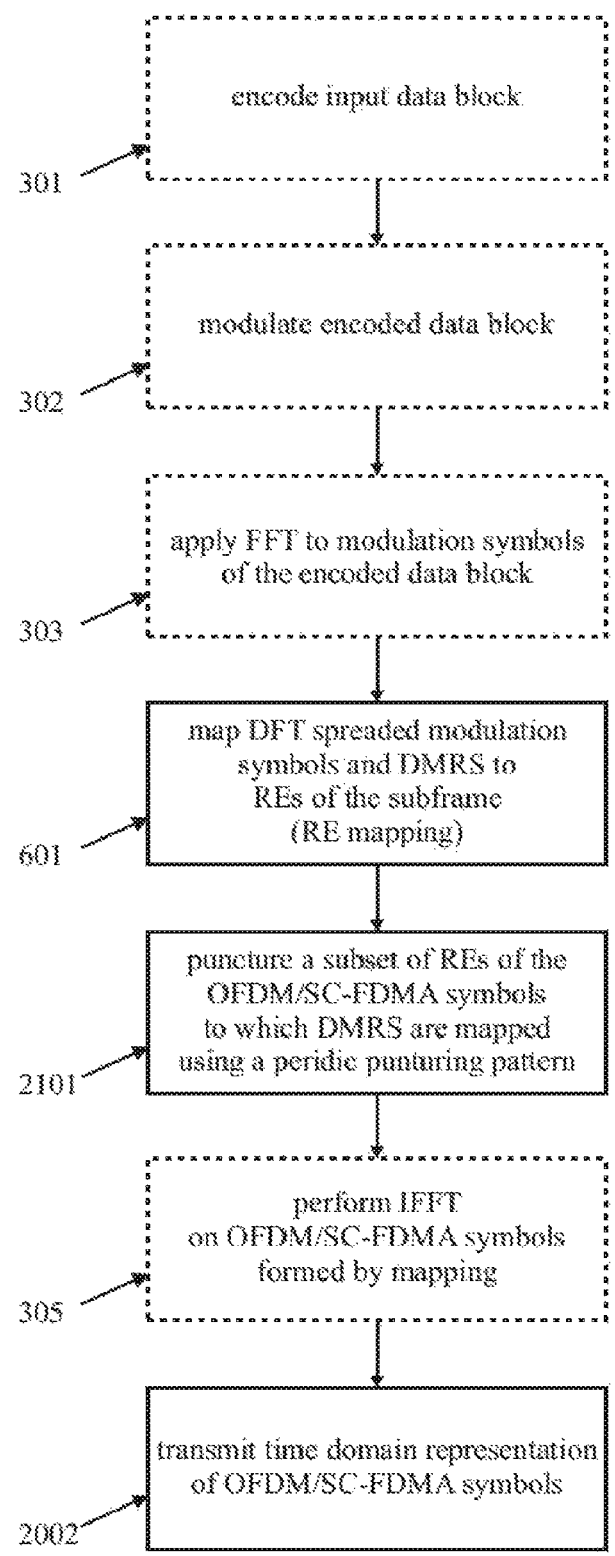
FIG. 21 shows another exemplary (simplified) flow chart for mapping DMRS to a subframe and transmitting the subframe according to an example implementation of the second aspect of this disclosure.

The implementation described with respect to FIG. 21 corresponds to the implementation of FIG. 6, except for the following differences. After mapping 601 the DMRS to (all) REs (DMRS symbols) of the respective OFDM/SC-FDMA symbols in the subset according to a given DMRS pattern (e.g. as discussed above in connection with FIGS. 7 to 19), the subframe structure is passed to a puncturing unit (not shown in FIG. 2). The puncturing unit punctures 2101 a subset of the REs of the OFDM/SC-FDMA symbols to which DMRS were mapped using a periodic puncturing pattern. The subframe with punctured DMRS in its OFDM/SC-FDMA symbols is then passed from the puncturing unit to the RF circuitry 207, which—similar to the implementation of FIG. 21—uses a non-zero power for transmitting 2002 non-punctured REs (DMRS symbols) of the OFDM/SC-FDMA symbol to which a DMRS has been mapped, and zero power or transmitting punctured REs of the OFDM/SC-FDMA symbol to which a DMRS has been mapped.

For example, a periodic pattern of punctured REs can be obtained by puncturing all REs of an OFDM/SC-FDMA symbol to which a DMRS has been mapped in case they have an index j other than $j(x)=k+m \cdot x$ for $x=[0, 1, \ldots, \lfloor N_{SC}^{BW}/m-1 \rfloor]$ where $m \in \{2, 3, 4, \ldots, 8\}$, and $k \in \{0, \ldots, m-1\}$.

The periodic puncturing pattern to be employed for the mapping 2001 may be for example configured by the network (e.g. eNB) using RRC signaling. For example, the RRC message for configuring the puncturing pattern could indicated the parameters k and m mentioned above.

Note that in accordance with the above extension of the second aspect described in connection with FIGS. 20 and 21, the subframe comprising the DMRS may still be subjected to a IFFT of size $N_{FFT}$ prior to transmission of the resulting time domain communication signal using the RF circuitry 207. Due to the periodic pattern within the REs of the OFDM/SC-FDMA symbols carrying DMRS and due to applying 305 the IFFT, the time domain communication signal includes m (two, . . . ) consecutive versions (subparts)—i.e. a repetition—of the respective IFFT-transformed DMRS in the time domain. This may be for example exploited on the receiver side to improve the estimation of the carrier frequency offset (CFO).

Figure 22:
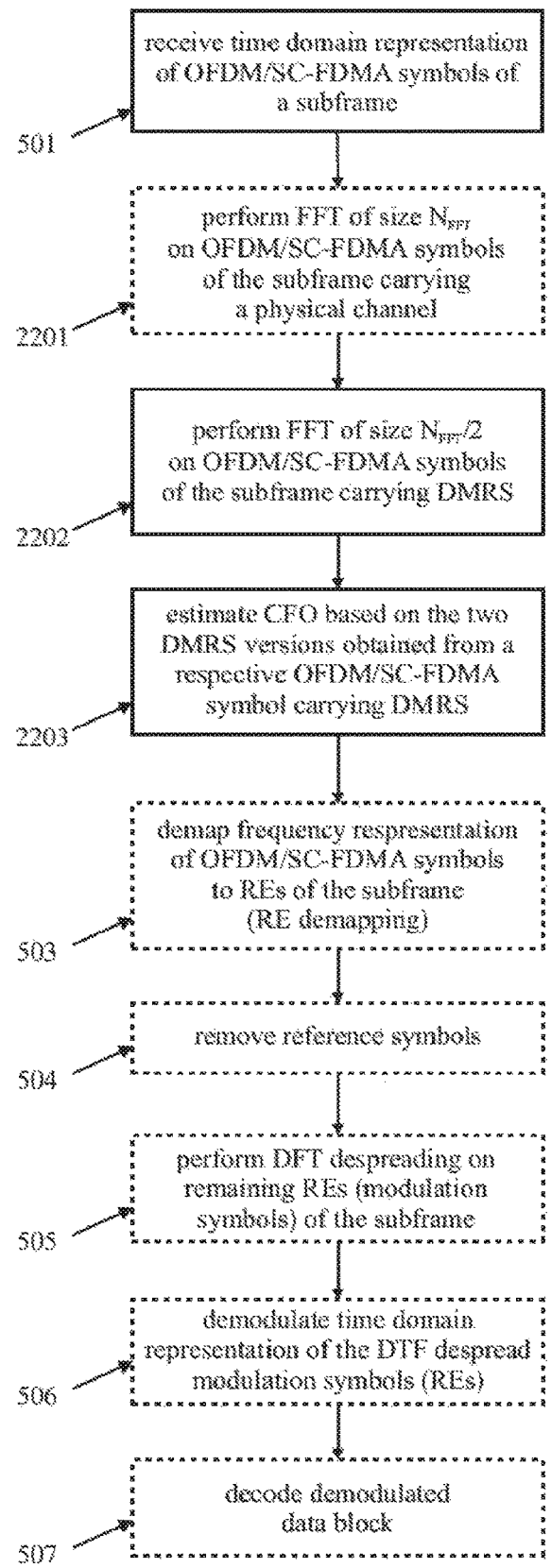
FIG. 22 shows an exemplary flow chart of receiving a communication signal at a communication device that has been transmitted in accordance with the explanations related to FIGS. 20 and 21 above and determining the CFO.
Figure 23:
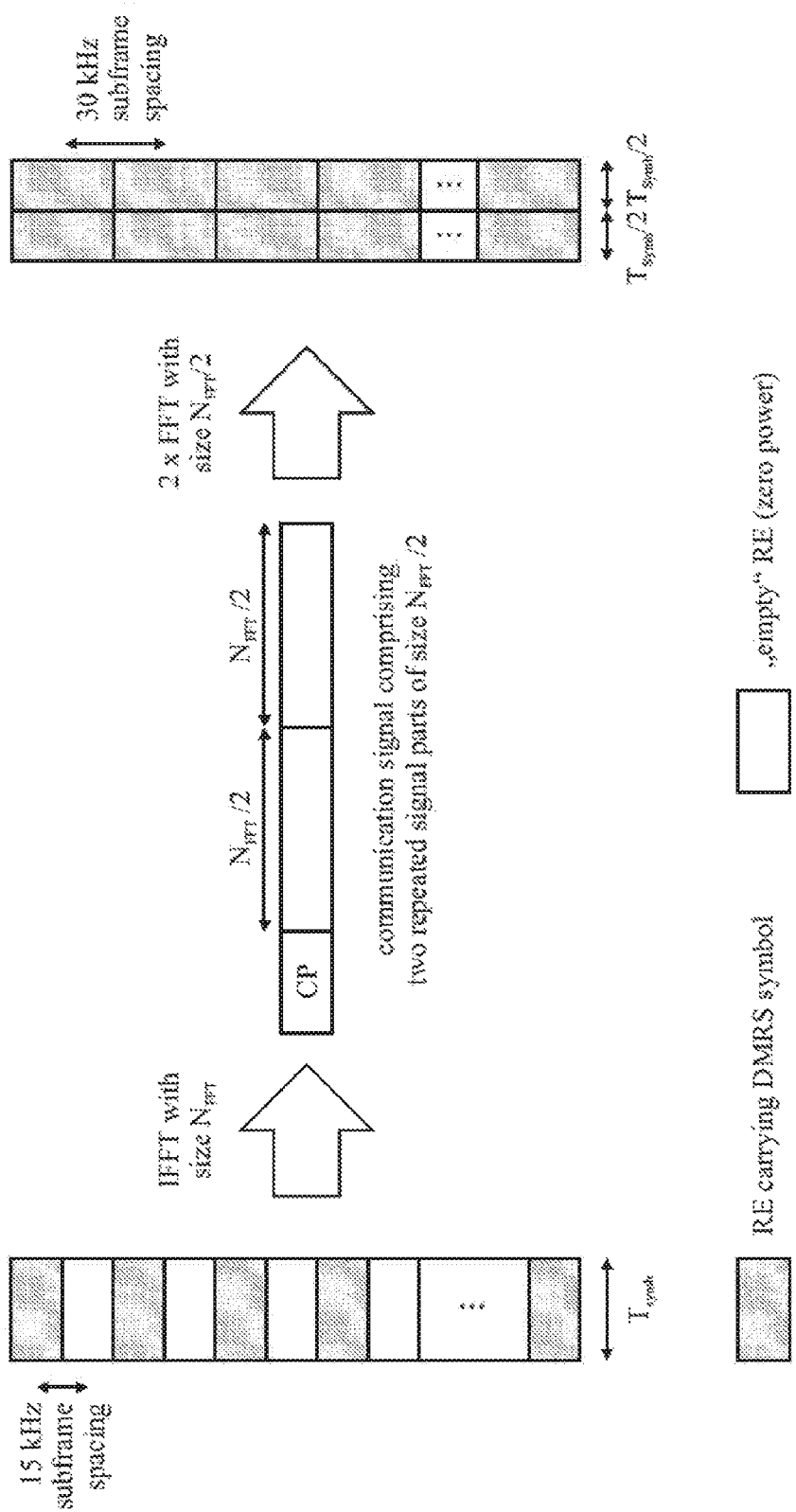
FIG. 23 exemplifies the effect of transmitting an OFDM/SC-FDMA symbol with DMRS symbols provided in a periodic pattern.

Another implementation in accordance with the extended second aspect of this disclosure relates to a communication device that receives, from a user equipment (UE), a communication signal within a subframe of a physical channel designated for V2X communication and will be described in connection with FIGS. 4, 22 and 23 in the following. FIG. 22 shows an exemplary flow chart of receiving a communication signal at a communication device that has been transmitted in accordance with the explanations related to FIGS. 20 and 21 above and determining the CFO. FIG. 23 exemplifies the effect of transmitting an OFDM/SC-FDMA symbol with DMRS symbols provided in a periodic pattern. Note that the steps performed at 503-507 of FIG. 22 correspond to the steps described with respect to FIG. 5 above and are not essential for the implementation of the second aspect. Also a MIMO scheme may be used in the second aspect, similar to the explanations above in connection with FIG. 5. Further note that the use of a subframe according to the first aspect (e.g. FIG. 1) is possible in this example implementation, but is not mandatory. The implementation also refers to legacy LTE subframe structures.

The communication node may use its RX circuitry 401 to receive 501a communication signal from the transmitter side, e.g. a UE, that has been transmitted in accordance with the explanations related to FIGS. 20 and 21 above. In the—for purpose of the implementation of the second aspect optional—step 2201 the FFT unit 402 of the communication device applies a FFT of size $N_{FFT}$ to those portions of the communication signal that correspond to OFDM/SC-FDMA symbols of the subframe that do not carry DMRS. Accordingly, the processing of these portions of the received communication signal is similar to the one described in connection with step 502 of FIG. 5.

As shown in FIG. 23, due the one or more DMRS mapped to the subframe have periodic pattern across the subcarriers of the frequency (a DMRS symbol is comprised in every $m^{th}$ RE (e.g. every 2nd RE as shown in FIG. 23) of the OFDM/SC-FDMA symbol to which the respective DMRS is mapped), the communication signal has m (e.g. two) identical signal components (subparts) corresponding in size to a FFT transform of size $N_{FFT}/m$. The FFT unit 402 of the communication device applies 2202 a FFT of size $N_{FFT\_RX}=N_{FFT}/m$ to the received communication signal corresponding to different DMRS, where $N_{FFT}$ is the size of IFFT used on the transmitter side to generate the communication signal. The parameter $m \in \{2, 3, 4, \ldots\}$.

The FFT of size $N_{FFT\_RX}$ is applied to respective ones of m consecutive subparts corresponding to one of the DMRS within the received communication signal in the time domain to derive m sets of the DMRS symbols corresponding to respective resource elements (REs) of the subframe in the frequency domain for each of the m consecutive subparts of one of the DMRS in the time domain. As shown on the right-hand side of FIG. 23, as a result of using FFT of size $N_{FFT\_RX}=N_{FFT}/m$ the number of "reconstructed" REs per OFDM/SC-FDMA symbol at the communication note is effectively reduced by the factor m. In other words, the subcarrier spacing on the receiver side is effectively increased by the factor m. Furthermore, the communication node may also comprise a CFO determination unit (not shown in FIG. 4) which is used to estimate 2203 the receive signal carrier frequency offset (CFO) based on the m sets of DMRS symbols obtained for a respective one DMRS.

For example, in one example, the CFO determination unit could estimate the receive signal CFO by determining the phase offset between the m consecutive subparts of the received communication signal and estimating the receive signal CFO based on the determined phase offset. For instance, to estimate the CFO, the UE may use the least squared channel estimates on the DMRS REs. The phase offset between different channel estimates corresponding to the given channel frequency position (RE) and different symbols can be estimated under assumption that the phase offset is caused by the CFO and in the absence of the respective offset the channel is stationary. The estimation can be done via multiplication of the channel estimate obtained on the first symbol by the conjugated channel estimate obtained on another symbol and calculation of the phase of the resulting product. In addition, averaging of the product estimates corresponding to different REs can be applied to improve the accuracy.

Note that the approach of mapping or puncturing REs periodically within OFDM/SC-FDMA symbols of a subframe may also be utilized on other OFDM/SC-FDMA symbols that do not carry DMRS, e.g. OFDM/SC-FDMA symbols carrying user data or control information. This will effectively lead to increased subcarrier spacing, similar to the changed numerology of the subframe structure discussed in connection with the first aspect herein above. The UE may allow for using a smaller IFFT size $N_{FFT}$ by the IFFT unit 206 in the transmission path (e.g. the FFT size may be reduced by a factor of 2, i.e. $N_{FFT}/2$) thereby shortening the OFDM/SC-FDMA symbol duration in the time domain by the same factor. Note that this may allow forming a same physical channel structure as shown in FIG. 1 by defining a new subcarrier mapping (mapping pattern) or puncturing pattern of the subframe structure prior to IFFT on the transmitter side.

Furthermore, it is to be noted that the extended second aspect discussed in connection with FIGS. 20 to 23 above may also be used with some legacy LTE DMRS scheme.

Furthermore, when the DMRS are occupy only a subset of REs in a respective OFDM/SC-FDMA symbol of the subframe in a periodic pattern, this may allow for configuring different UEs with different periodic and non-overlapping mapping or puncturing patterns, so that different UEs can send DMRS on the same OFDM/SC-FDMA symbols of a subframe at the same time, but on different REs. This may be beneficial in case of interference-limited environments where different UEs have different patterns, the channel estimation accuracy can be improved due to reduced amount of interference on the DMRS REs.

The use of a specific one of different candidate DMPRS symbol mapping/puncturing patterns may be for example fixed for all UEs or may be configurable by the radio access network (e.g. by the eNB). Furthermore, the configuration of the DMPRS symbol mapping/puncturing patterns may be made together with the configuration of a specific DMRS pattern (i.e. pattern indicating the number and position of DMRS in a subframe). The configuration of the DMPRS symbol mapping/puncturing pattern(s) and the DMRS pattern(s) to be used by the UEs may be for example configured via RRC signaling or within a System Information Block (SIB) broadcast by the eNB within its radio cell.

Assuming for example that the REs within a OFDM/SC-FDMA symbol to be carrying a DMRS symbol have the indices $j(x)=k+m\cdot x$ for $x=[0, 1, \ldots, \lfloor N_{SC}^{BW}/m-1 \rfloor]$ where $m \in \{2, 3, 4, \ldots, 8\}$, and $k \in \{0, \ldots, m-1\}$, the offset k and spacing m between adjacent REs carrying a DRMS symbol could be configured. Another possibility may be that there are different candidate pattern available and the network (e.g. the eNB) informs the respective UEs which candidate pattern to use for as a DMPRS symbol mapping/puncturing pattern.

Figure 24:
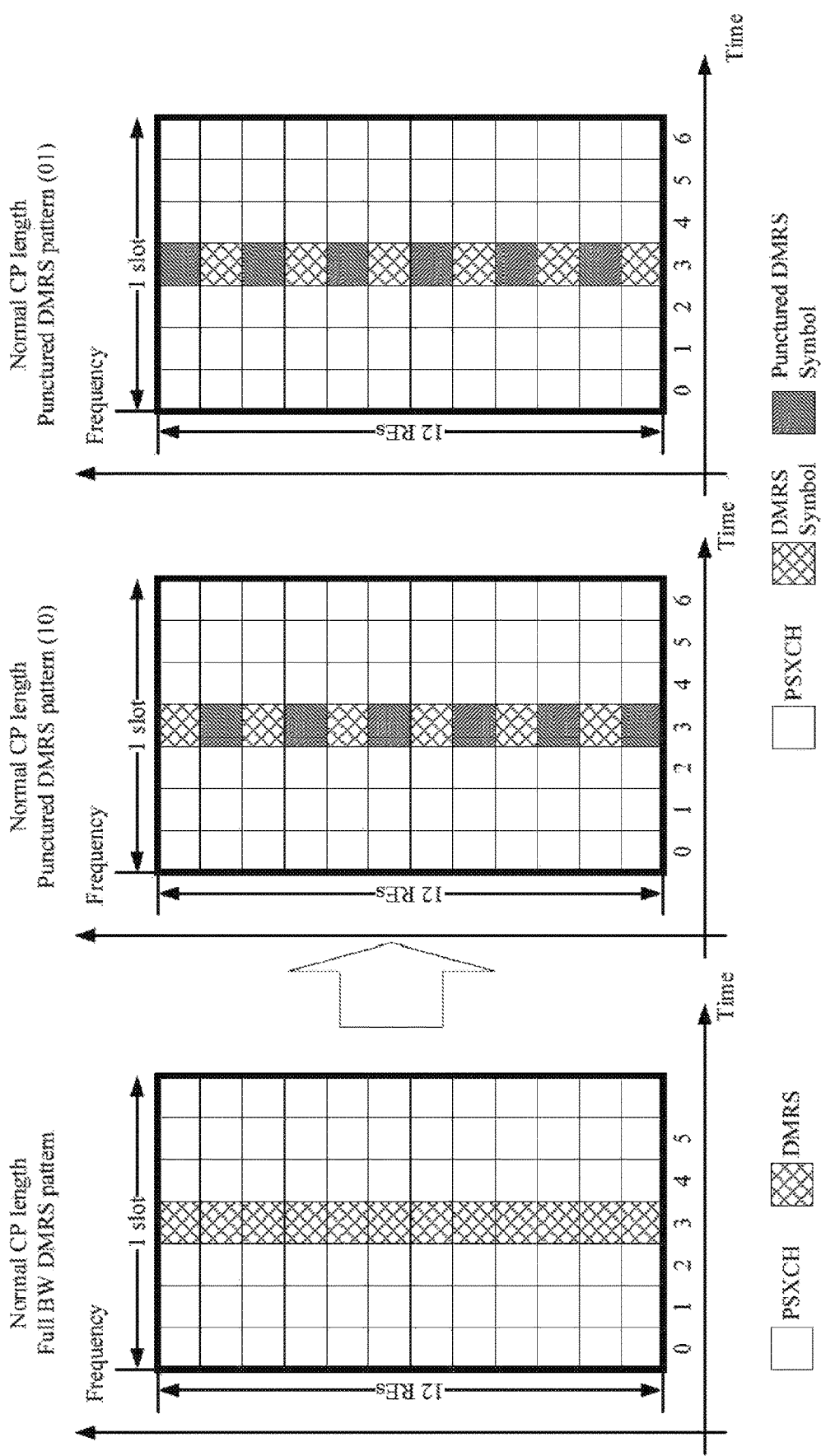
FIG. 24 shows the use of two exemplary puncturing patterns (1,0) and (0,1) for puncturing REs within a OFDM/SC-FDMA symbol carrying a DMRS.
Figure 26:
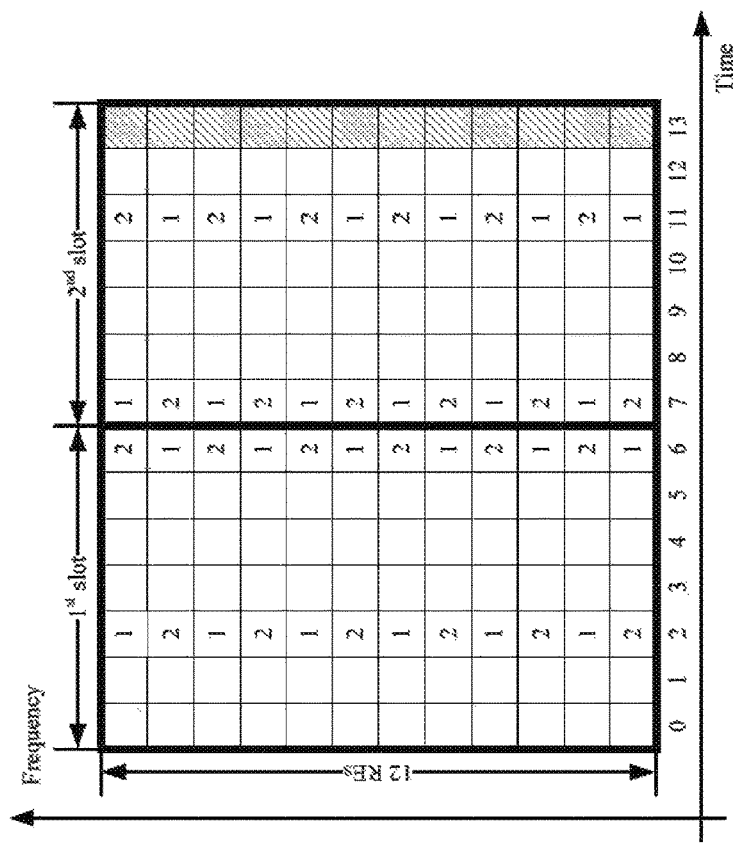
FIGS. 25 to 34 show different exemplary DMRS patterns within a subframe assuming a Normal CP of the symbols, each indicating two possible different DMRS mapping/puncturing patterns ("position 1" and "position 2" indicate different patterns) within a subframe for the different DMRS patterns.
Figure 25:
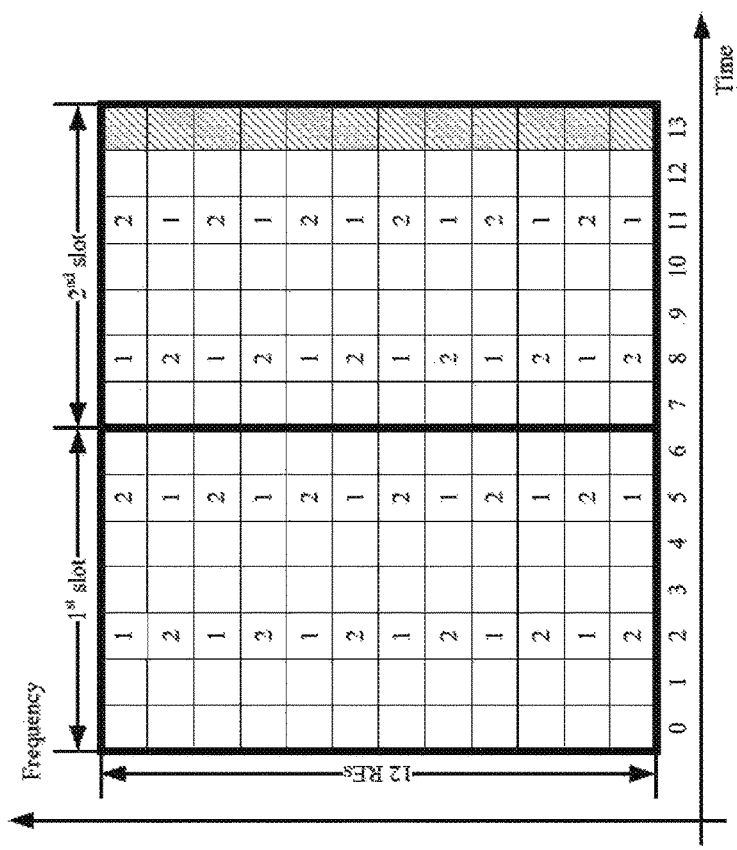
Figure 27:
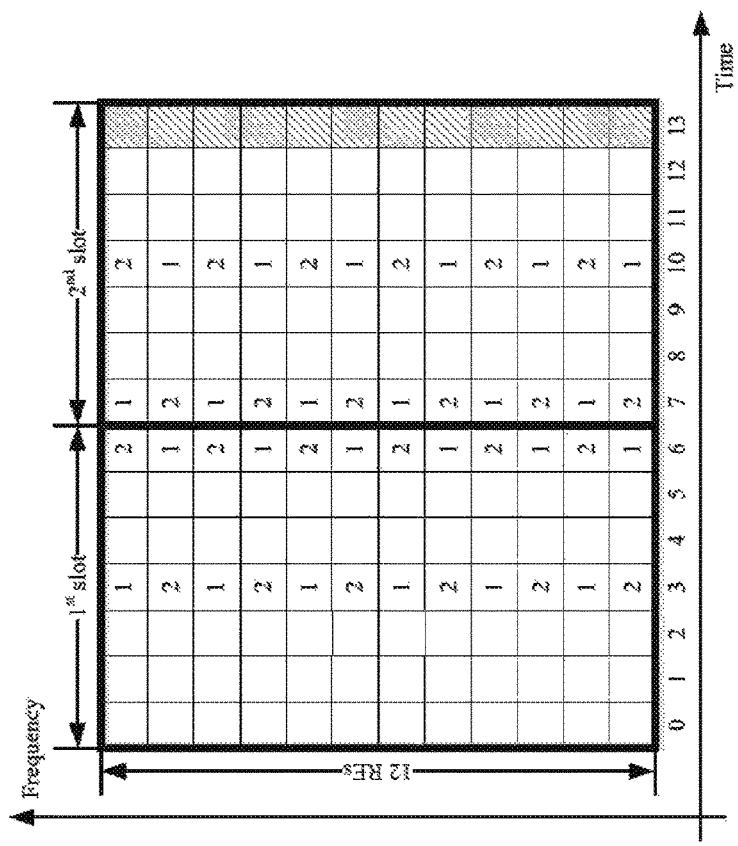
Figure 28:
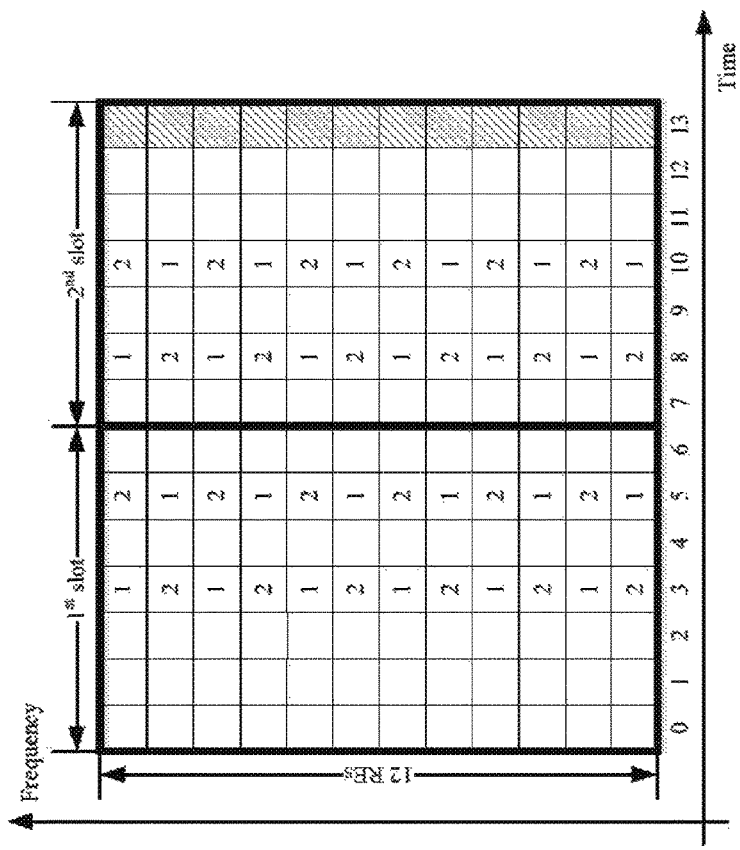
Figures 29, 30:
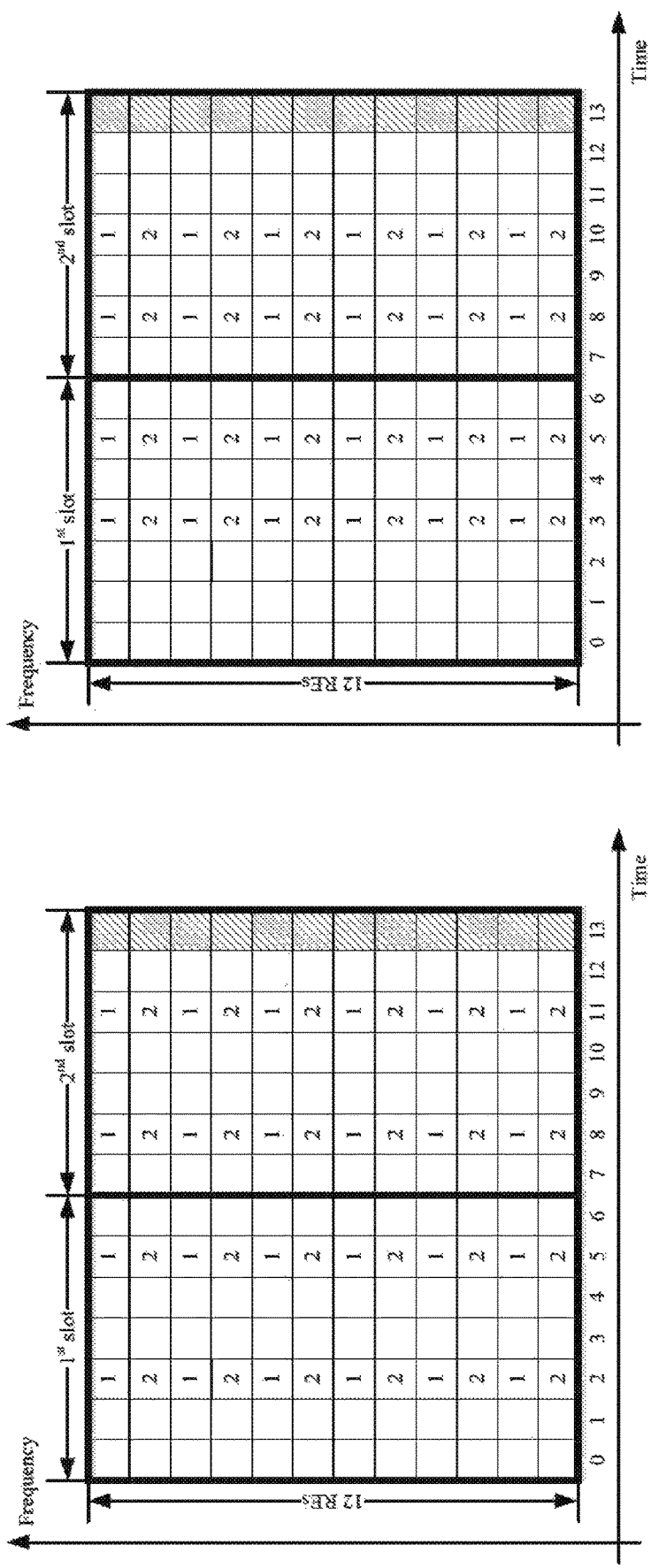
Figure 31:
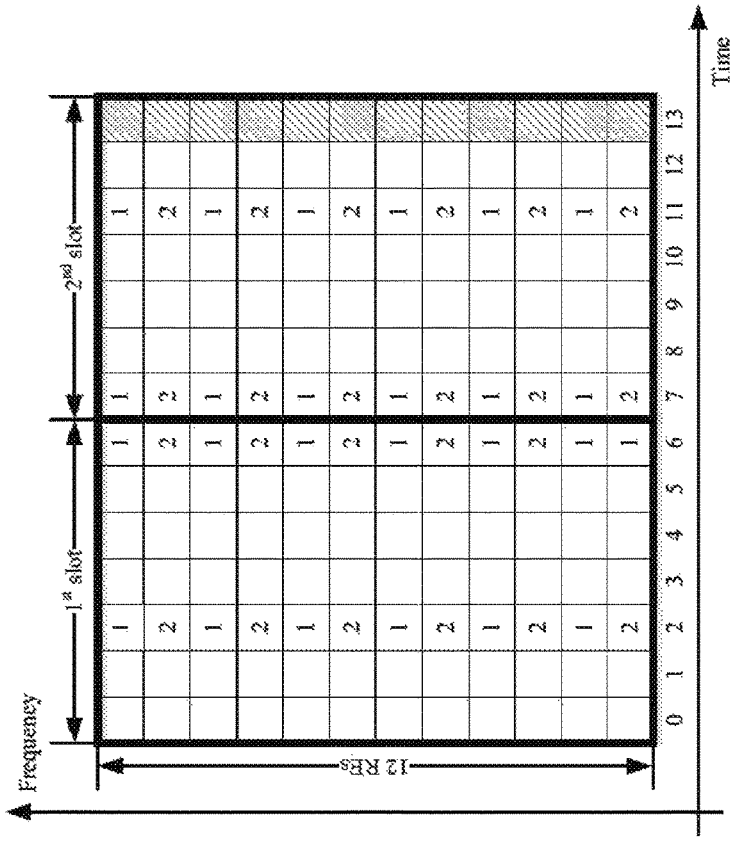
Figure 32:
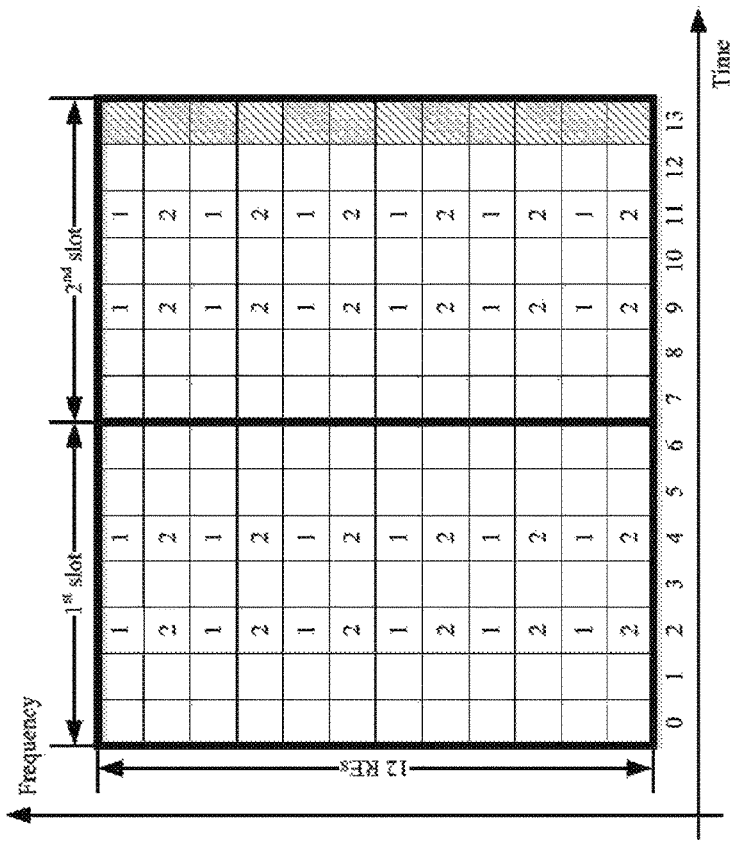
Figure 33:
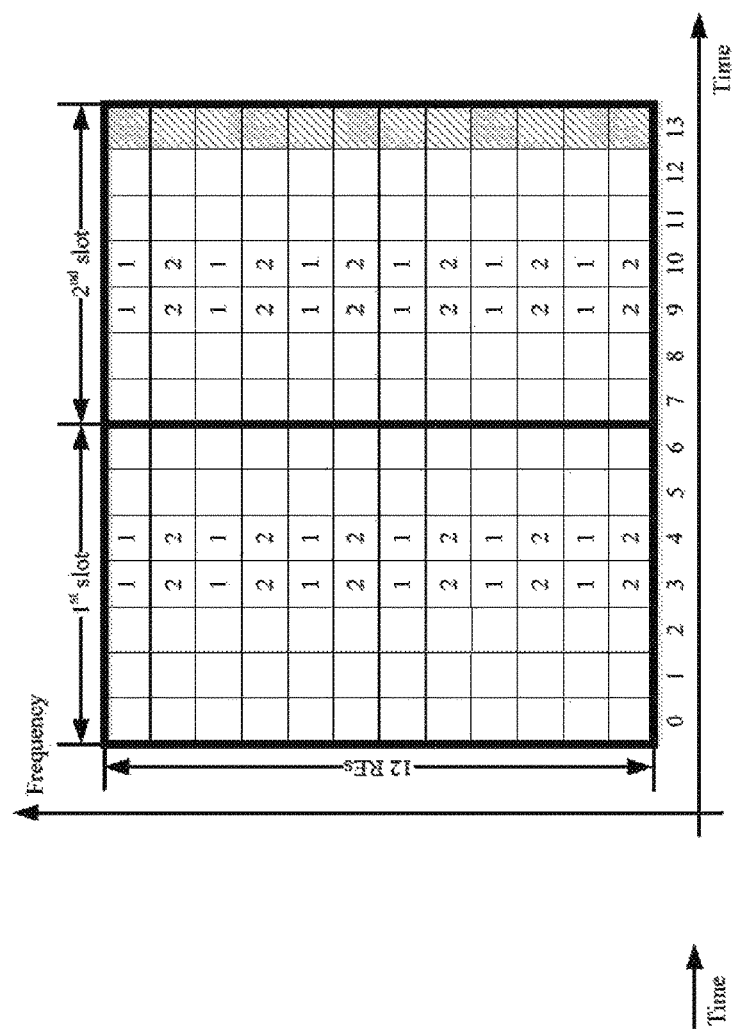
Figure 34:
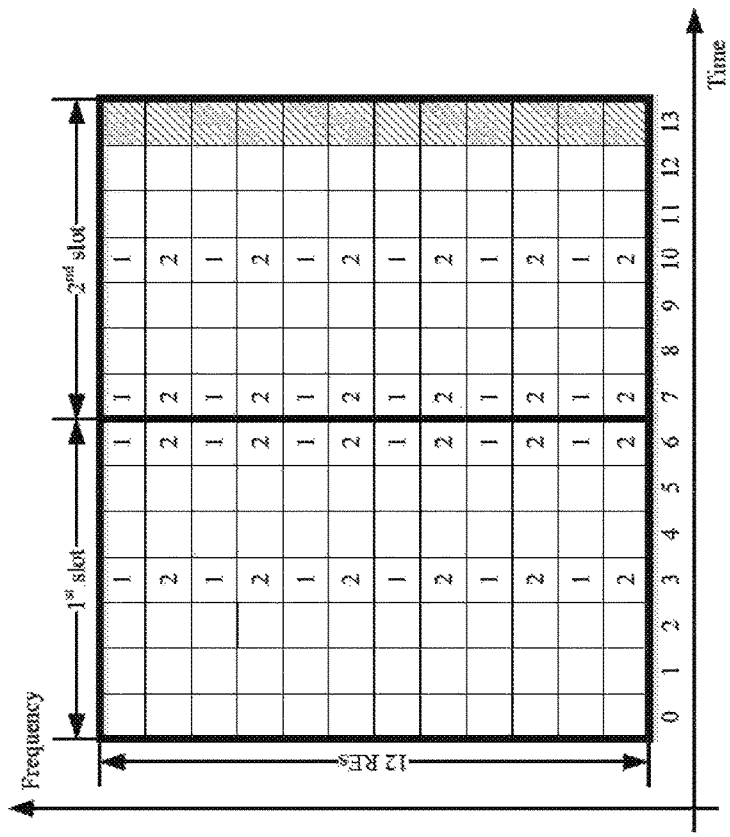
Figure 35:
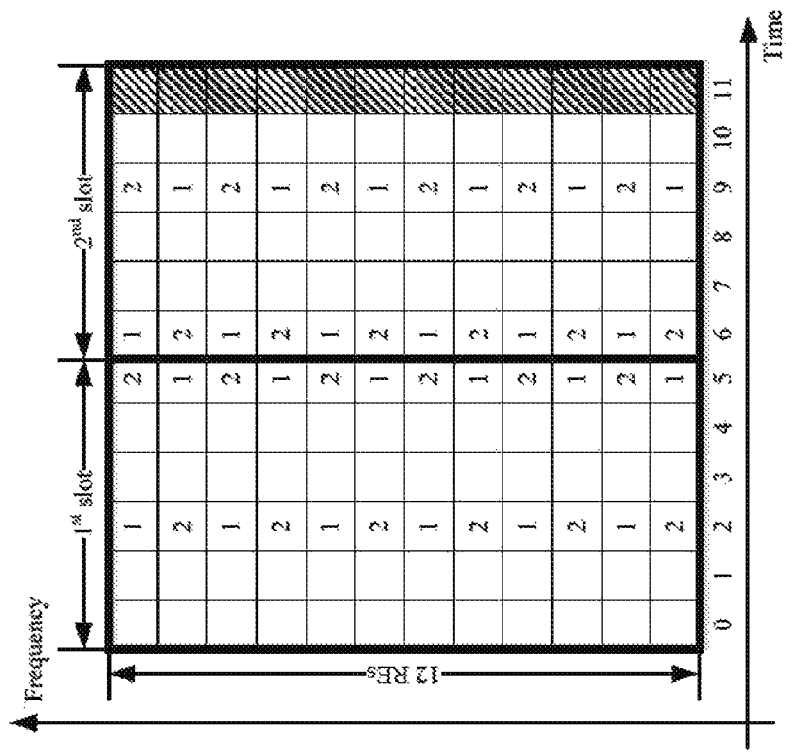
FIGS. 35 to 41 show different exemplary DMRS patterns within a subframe assuming an Extended CP of the symbols, each indicating two possible different DMRS mapping/puncturing patterns ("position 1" and "position 2" indicate different patterns) within a subframe for the different DMRS patterns.
Figure 36:
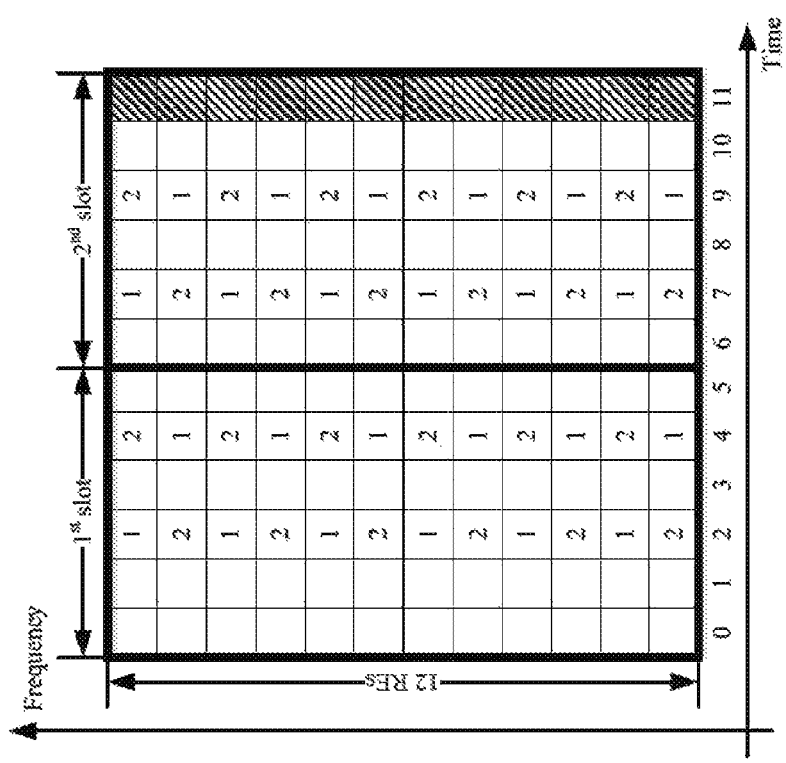
Figure 37:
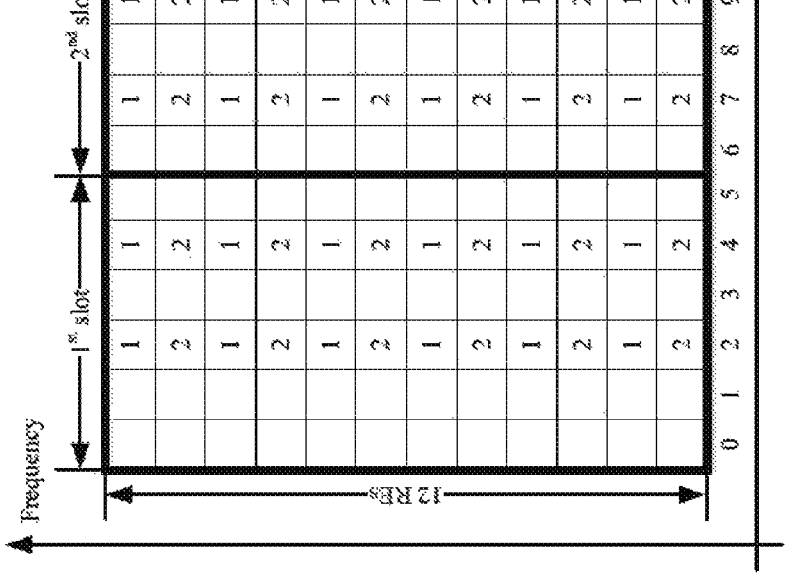
Figure 38:
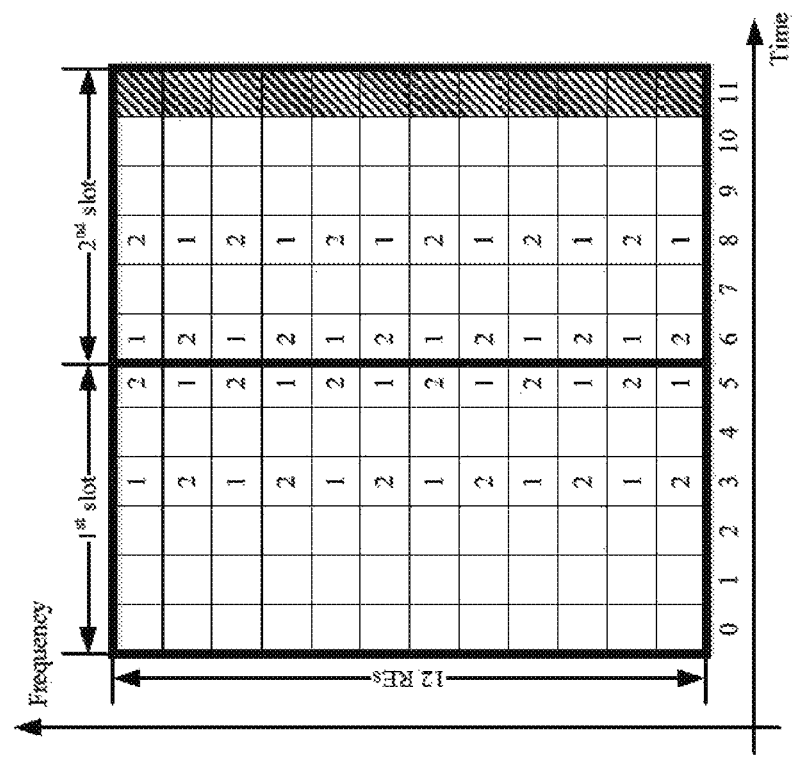
Figure 39:
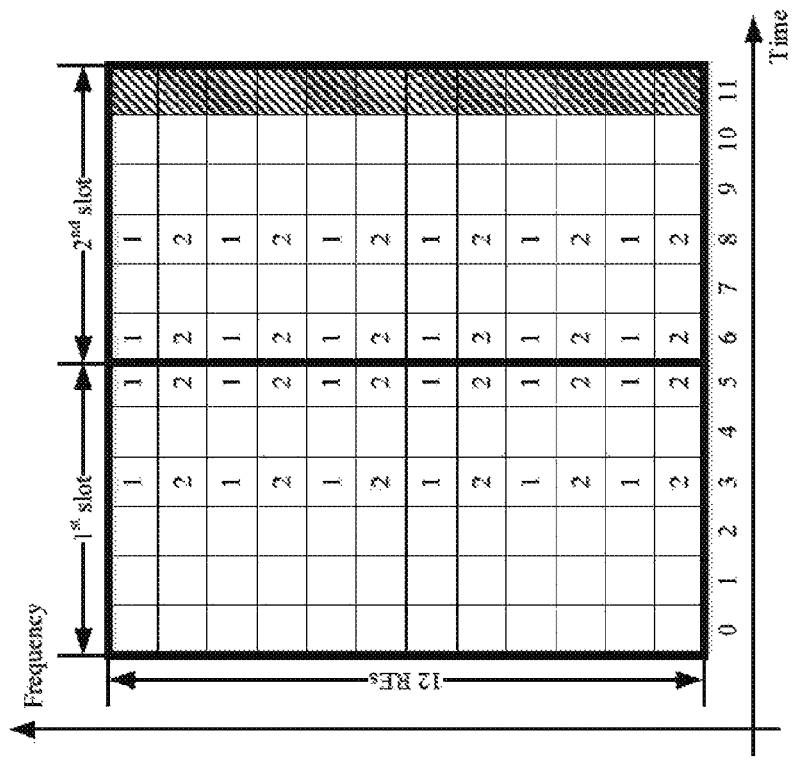
Figure 40:
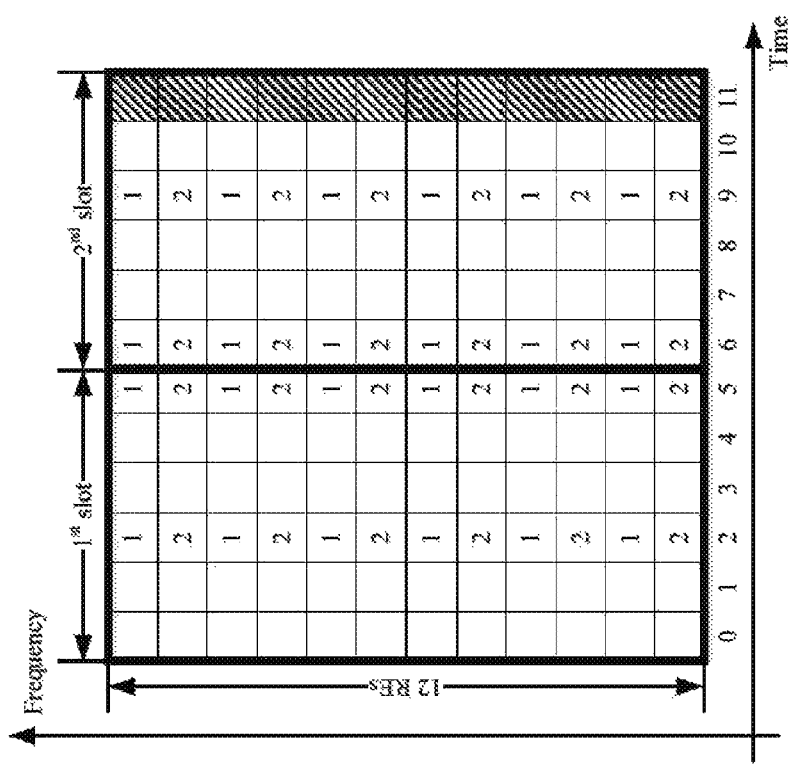
Figure 41:
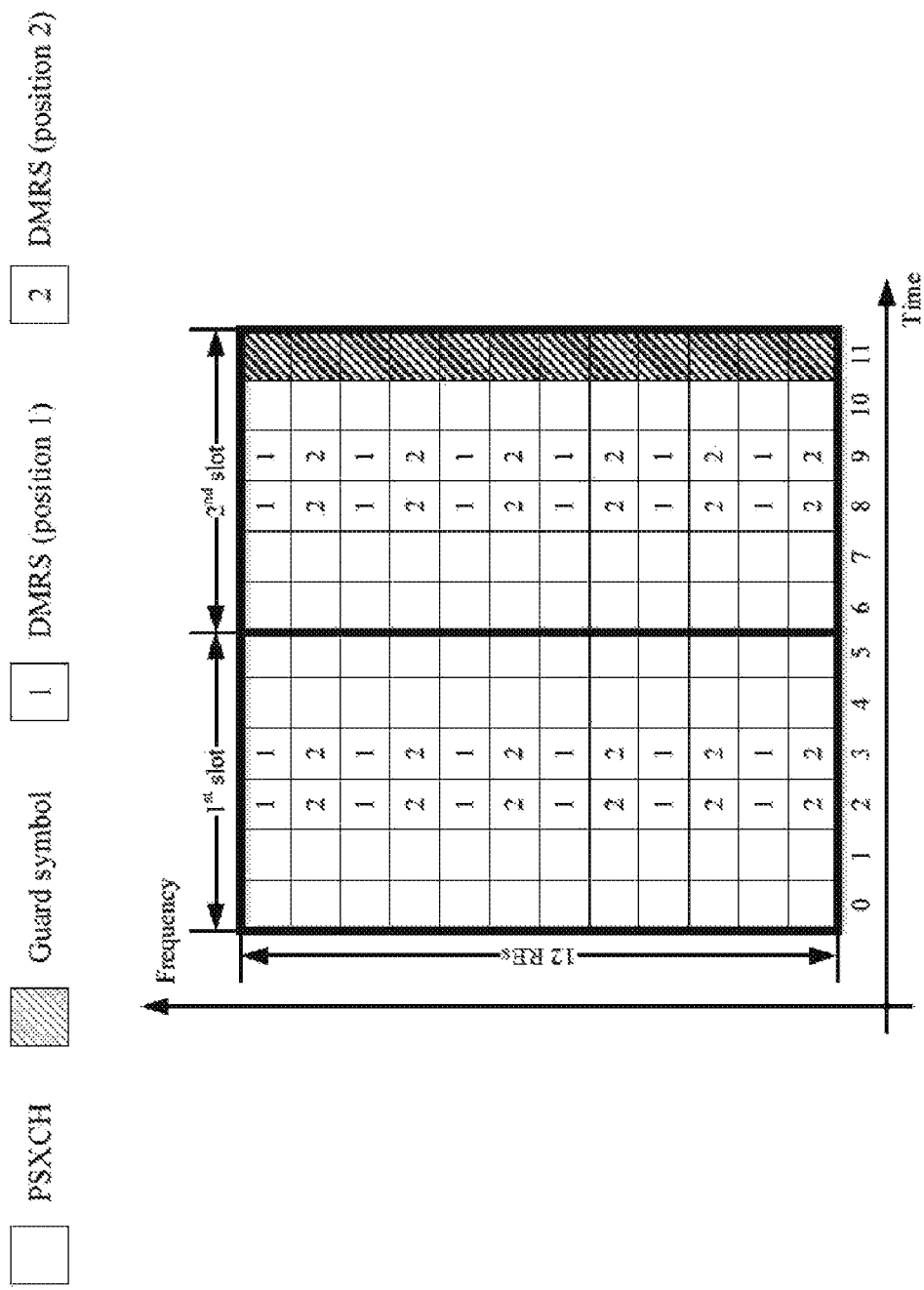

Another possibility is to define a candidate set of DMPRS symbol mapping/puncturing patterns. FIG. 24 shows the use of two exemplary puncturing patterns (1,0) and (0,1) for puncturing REs within a OFDM/SC-FDMA symbol carrying a DMRS. As shown therein, the example assumes that a DMRS covers all REs of the OFDM/SC-FDMA symbol when being mapped to the subcarriers of the subframe by subcarrier mapping unit 205 (see FIG. 2, and also step 601 of FIG. 6). In case of the puncturing pattern (1,0), those REs of a subcarrier having an odd index carry a DMRS symbol, while REs of a subcarrier having an even index carry a DMRS symbol are punctured (or vice versa). In case of the puncturing pattern (0,1), those REs of a subcarrier having an even index carry a DMRS symbol, while REs of a subcarrier having an odd index carry a DMRS symbol are punctured (or vice versa). One bit would be sufficient to select among the two puncturing patterns. Note that the same concept could be used for defining a mapping pattern.

Of course the number of DMPRS symbol mapping/puncturing patterns is not necessarily limited to two. For example, also a 4 bit sequence could be used to represent 4 different DMPRS symbol mapping/puncturing patterns with a spacing of 4 bits between adjacent DMRS symbols, i.e. (1,0,0,0), (0,1,0,0), (0,0,1,0) and (0,0,0,1). Optionally, such 4 bits could be also used to define DMPRS symbol mapping/puncturing patterns with a spacing of 2 or 4 bits between adjacent DMRS symbols, i.e. (1,0,0,0), (0,1,0,0), (0,0,1,0), (0,0,0,1), (1,0,1,0) and (0,1,0,1).

Another possibility may be that different UEs select a candidate DMRS symbol mapping/puncturing pattern based on some function of a UE identifier (e.g. IMSI, RNTI, etc.). Assuming for example that the REs within a OFDM/SC-FDMA symbol to be carrying a DMRS symbol have the indices $j(x)=k+m\cdot x$ for $x=[0, 1, \ldots, \lfloor N_{SC}^{BW}/m-1 \rfloor]$ where $m \in \{2, 3, 4, \ldots, 8\}$, and $k \in \{0, \ldots, m-1\}$, the offset k may be for example determined based on a UE identifier, while the spacing m between adjacent REs carrying a DRMS symbol could be fixed, configured by the network (e.g. by the eNB), or may also be derived base on a UE identifier.

Notably, different DMPRS symbol mapping/puncturing patterns and/or DMRS patterns by be configured by the network for SL (e.g. for V2V or V2P communication), and UL and/or DL (e.g. for V2I or V2N communications)

Furthermore, the principles may also be extended to the enhancements to the DMRS positions within a subframe as previously discussed herein. FIGS. 25 to 34 show different exemplary DMRS patterns within a subframe assuming a Normal CP of the symbols, each indicating two possible different DMRS mapping/puncturing patterns ("position 1" and "position 2" indicate different patterns) within a subframe for the different DMRS patterns. FIGS. 35 to 41 show different exemplary DMRS patterns within a subframe assuming an Extended CP of the symbols, each indicating two possible different DMRS mapping/puncturing patterns ("position 1" and "position 2" indicate different patterns) within a subframe for the different DMRS patterns.

As mentioned previously herein, the first and second aspect of this disclosure may be combined by using the subframe structure of the first aspect (e.g. as shown in FIG. 1) on the radio interface and employing a DMRS pattern in accordance with the second aspect in this subframe structure, as for example outlined in connection with FIGS. 7 to 19 or FIGS. 25 to 34. The following example configurations are considered advantageous (without limiting the feasibility of other combinations):

For cases, where the OFDM/SC-FDMA symbols have a Normal CP:
  30 kHz subcarrier spacing, 2 DMRS with reduced spacing (e.g. DMRS pattern 5/8)
  30 kHz subcarrier spacing, 4 DMRS (e.g. DMRS pattern 2/5/8/11)
  60 kHz subcarrier spacing, 2 DMRS with reduced spacing (e.g. DMRS pattern 4/9)
  60 kHz subcarrier spacing, 4 DMRS (e.g. DMRS pattern 2/5/8/11)

For cases, where the OFDM/SC-FDMA symbols have an Extended CP:
  30 kHz subcarrier spacing, 2 DMRS with reduced spacing (e.g. DMRS pattern 4/7)
  30 kHz subcarrier spacing, 4 DMRS (e.g. DMRS pattern 2/4/7/9)
  60 kHz subcarrier spacing, 2 DMRS with reduced spacing (e.g. DMRS pattern 3/7)
  60 kHz subcarrier spacing, 4 DMRS (e.g. DMRS pattern 2/4/7/9)

A further aspect of this disclosure related to a TDM-based resource allocation for V2X operation. For example, for V2X operation the scheduler of the eNB may allocate resources to the UEs for SL or UL transmission in a TDM fashion, e.g. by allocating for example all REs of one or more OFDM/SC-FDMA symbol within a subframe or one slot of a subframe to a UE.

In general, it is possible to estimate CFO using the CP-based approach before FFT transform at the receiver side by comparing the phase offset of the time domain received signal corresponding to a CP and the identical signal part at the end of a given OFDM/SC-FDMA symbol. One potential issue with such approach is that for the SL operation multiple signals could be multiplexed in the same time resources each with its own frequency offset. Hence, the CFO estimate may become less reliable and accurate.

One possible approach to resolve this problem is to use the TDM-based resource allocation for the V2X operation. For instance, the minimum resource allocation can be considered to be equal to the full system BW (e.g. 50 PRB pairs for the 10 MHz BW and 15 kHz subcarrier spacing).

In general, the approach can be applied system-wide and all UEs involved in the V2X operation should adhere the same principle of the full BW resource allocation. Alternatively, the approach can be applied on the individual links. In the latter case, UE can try to obtain the information on the resource allocation (e.g. via PSCCH decoding) and apply the CP-based CFO estimation/compensation in case it detects that full system BW (or wideband) resource allocation is used for the signal transmission.

One possible disadvantage of the solution may be reduced flexibility in the resource allocation by the scheduler. However, this issue might be addressed by a per-slot resource allocation granularity (i.e. the scheduling is done with per-slot granularity). For instance, the minimum resource allocation granularity can be set to 1 slot. In addition or optionally, the scheduling approach can be also used in combination with the subframe structure of the first aspect, e.g. as shown in FIG. 1. With the increase of the subcarrier spacing the number of available PRBs in frequency and the PRB duration in time are reduced. Hence, a full BW resource allocation can be a viable choice.

Next, a third aspect of this disclosure of the disclosure and different exemplary implementations thereof are described. The third aspect of this disclosure relates to solutions to compensate for CFO caused by the Doppler effect. Generally, CFO may occur when the local oscillator signal for down-conversion at the receiver side does not synchronize with the carrier signal contained in the receive signal of a transmission. CFO is inter alia influenced by the frequency mismatch in the transmitter and receiver oscillators, and the Doppler effect (specifically, when one of or both, transmitter and receiver are moving). The CFO may affect DL, UL and also SL transmissions by network element (i.e. UEs and eNBs).

CFO causes the received signal to be shifted in frequency. For an OFDM/SC-FDMA based communication systems this may be problematic, because orthogonally among subcarriers may be maintained only if the receiver uses a local oscillation signal that is synchronous with the carrier signal contained in the received signal. In real life, due to the non-perfect synchronization of frequencies, the mismatch in carrier frequency often results in inter-carrier interference (ICI).

Considering 3GPP LTE- and LTE-A-based systems, eNB-based synchronization at the UE has to ensure a ±0.1 ppm frequency error (transmit waveform quality) relative to the (so-called) "actual received frequency", and not relative to the "absolute frequency" of the eNB transmit signal. The "actual received frequency" may have an offset due to transmit signal frequency error at the eNB itself and the Doppler shift caused by vehicular movement (UE) relative to the eNB. Depending on whether the Doppler shift relative to eNB is compensated or not at the UE side, two different synchronization strategies can be considered in terms of the used UE transmit frequency for V2X transmissions and reception:

Synchronization to "actual received frequency": This strategy assumes that vehicle does not differentiate effects due to Doppler shift and oscillator and does not compensate Doppler shift, so that it transmit frequency has an offset relative to absolute frequency due to Doppler shift.

Synchronization to "absolute frequency": This strategy assumes that vehicle separately tracks offset due to Doppler shift and oscillator and performs pre-compensation of Doppler shift so that actual UE transmit frequency is close to the absolute frequency subject to synchronization errors.

The synchronization to relative/received frequency may result in a higher overall frequency offset upper bound for V2V communication, given that the effect of Doppler shift on eNB-UE link is a part of the vehicle (UE) transmit/receive frequency. The synchronization to the absolute frequency may result in a reduced overall frequency offset for V2V communication, given that the effect of Doppler shift on eNB-UE link is removed.

The following implementations exemplify procedure that may reduce or avoid impact from the Doppler shift (and CFO) on the synchronization and improve the synchronization accuracy versus the "absolute frequency". Note that the implementations of the third aspect of this disclosure may be practices in combination with the different implementations of the first aspect and/or second aspects discussed herein. For example, the physical channel numerology (subframe structure) may correspond to an implantation of the first aspect of this disclosure. In addition thereto or alternatively, the DMRS patterns suggested in connection with the second aspect may be used. Further optionally, the sparse DMRS schemes discussed with respect to the extended second aspect (periodic pattern of DMRS symbols not covering all REs of a respective OFDM/SC-FDMA symbol) may be used.

A first example implementation will be described in connection with FIG. 42. To reduce the CFO impacts on the V2X systems, UEs may rely on the "absolute" carrier frequency estimation, rather than estimation of the "actual received frequency". The UEs may attempt to estimate the absolute reference UL (SL) carrier frequency and make the transmissions/receptions based on this absolute frequency.

As mentioned above, one of the key factors which may affect the CF estimation accuracy based on DL or SL signal is the CFO bias versus the absolute frequency due to Doppler shift. For example, in case UE processes the DL reference signals (e.g. PSS/SSS/CRS) from one eNB and tries to adjust to the instantaneous conditions it may not differentiate whether the received signal includes any CFO versus the actual eNB transmit frequency. However, the UE may try to exploit time/spatial diversity to improve the estimates accuracy. In particular, the UE may perform averaging/filtering/combining of multiple CF estimates corresponding to one or multiple of the following: time instances, geographical positions, signals from different eNBs obtained in one or different time instances. The UE may apply averaging/filtering of multiple CF estimates obtained in different conditions to derive the actual absolute frequency. In the ideal case, UE should be able to perform perfect calibration of its own oscillator with respect to the absolute carrier frequency.

Figure 42:
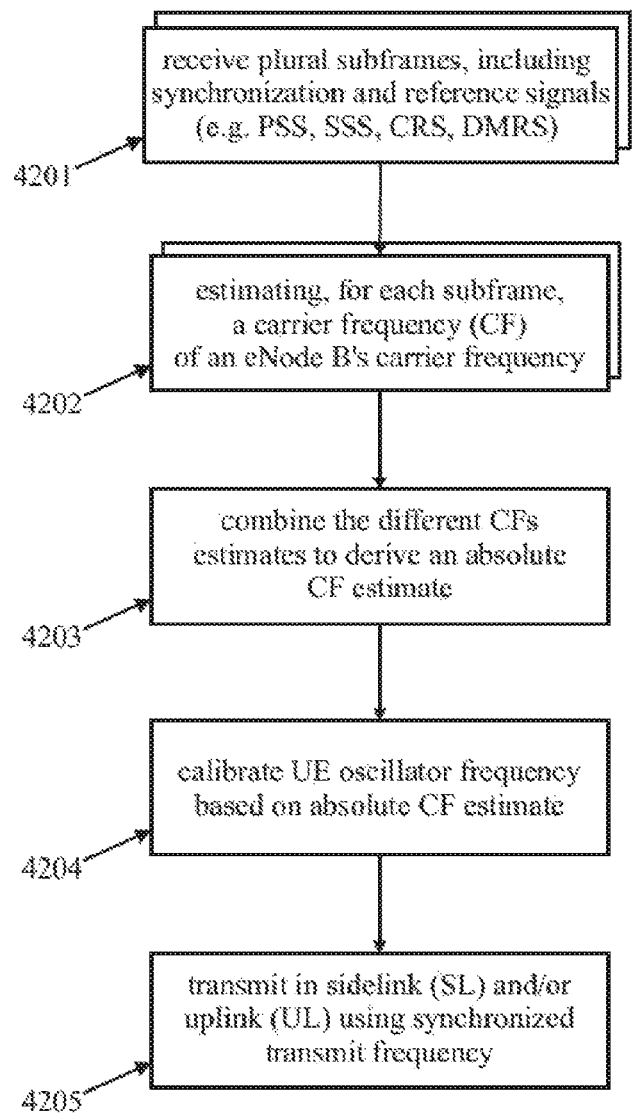
FIG. 42 shows a flow chart for an exemplary UE-based absolute carrier frequency estimation based on the above example implementation according to the third aspect of this disclosure.

FIG. 42 shows a flow chart for an exemplary UE-based absolute carrier frequency estimation based on the above example implementation. The UE may receive 4201 different subframes each comprising one or more reference symbols (e.g. PSS, SSS, CRS, or DMRS). The UE estimates 4202, for each received subframe, a respective CF of an eNB's carrier frequency used to transmit the respective subframe based on the respective one or more reference symbols comprised within the respective subframe. Furthermore, the UE combines 4203 the different CFs estimates to obtain an absolute carrier frequency estimate. Based on this absolute carrier frequency estimate the UE can further calibrate 4204 its oscillator frequency to synchronize the UE's transmit frequency with the derived absolute carrier frequency of the one or more eNBs. The UE may further transmit 4205 data on SL and/or UL using the synchronized transmit frequency.

As noted above, the different subframes may be received at the UE at different time instances, at different geographical positions, and/or from different eNBs or UEs. Further, combining the different CFs estimates may be realized by averaging the CFs estimates or filtering the CFs estimates.

Generally, it is noted that in case of TDD, the absolute carrier frequency estimation may be for example used to set the UE transmit frequency on UL or SL. For FDD, the absolute carrier frequency estimation on the DL (respectively the correction of the UE transmit frequency) may be scaled by the UE to set the UE transmit frequency on UL or SL.

Another exemplary implementation of the third aspect of this disclosure relates to an eNB-controlled adjustment of a UE's transmit frequency. The eNB may estimate the CFO relative to its own stable reference frequency observed on a link to the UE by processing the UL receive signal. The eNB may take control of the UE transmit (TX) frequency and command UE to adjust its transmit frequency accordingly. For this, either dynamic (e.g. DCI, UCI) or semi-static (e.g. RRC) signaling approaches can be adopted to correct UE transmit frequency. In case of dynamic commands, to reduce the overhead, the UE may be commanded to just increase/decrease the transmit frequency with certain fixed adjustment granularity. In this later case, the UE and eNB could implement a closed-loop control-like scheme where the eNB command a step-wise increase/decrease of the UE transmit frequency until the CFO determined by the eNB is minimized. Alternatively, the eNB could also signal the observed CFO and the UE may determine the appropriate adaption of its transmit frequency based thereon.

Figure 43:
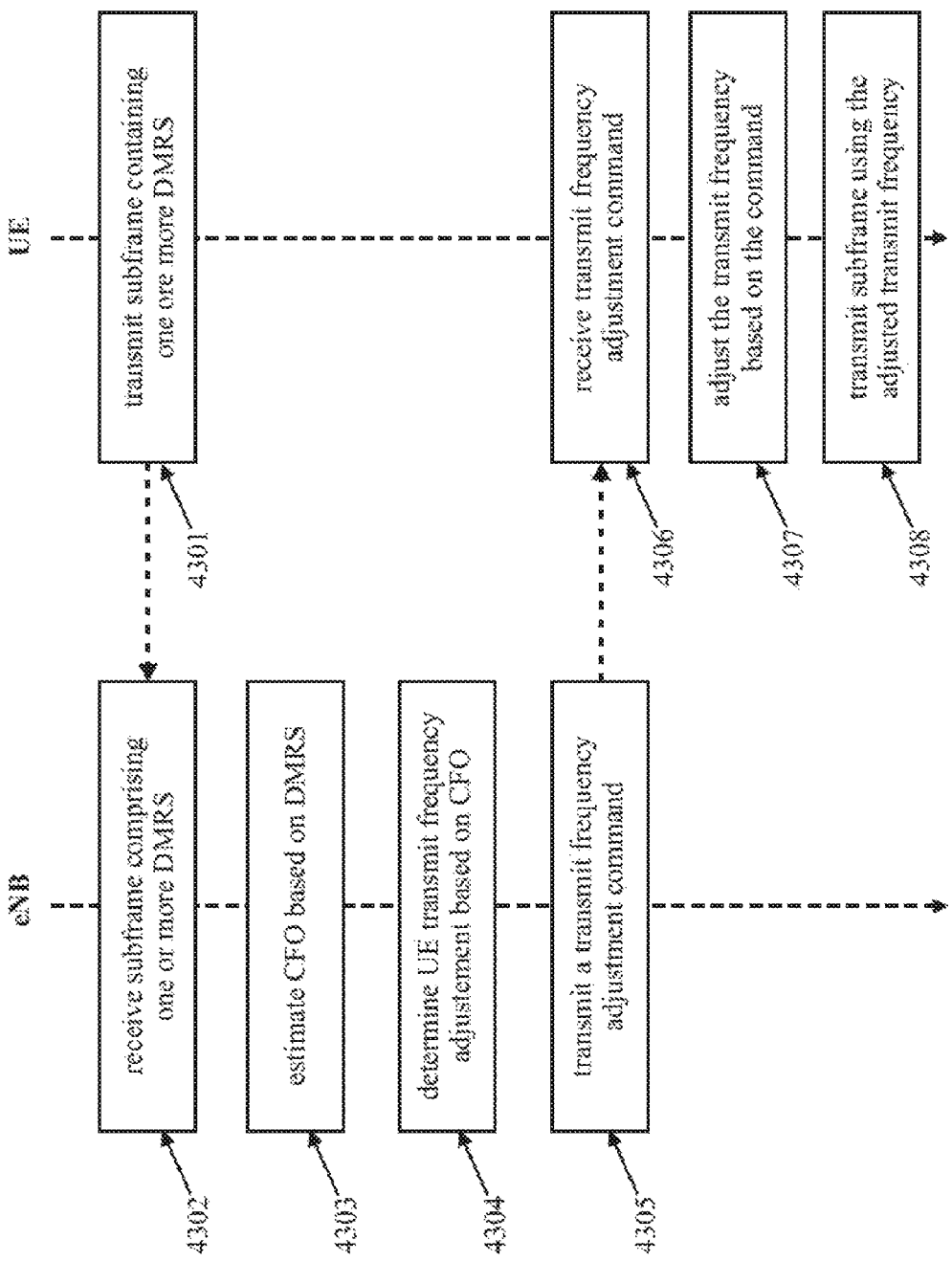
FIG. 43 shows a flow chart-like sequence of operations performed by a UE and an eNB to provide an example implementation an above eNB-controlled adjustment of a UE's transmit frequency according to the third aspect of this disclosure.

FIG. 43 shows a flow chart-like sequence of operations performed by a UE and a eNB to provide an example implementation of the above eNB-controlled adjustment of a UE's transmit frequency. An eNB receives 4302 an UL signal corresponding to a subframe including sounding reference symbols. The UL signal has been sent 4301 from a UE. The eNB further estimates 4303 the CFO based on the received UL signal and relative to a reference frequency, e.g. the eNBs local oscillator frequency for DL transmission (or a scaled version thereof in case of FDD). Based on the CFO estimated by the eNB, the eNB further determines 4304 UE transmit frequency adjustment command. The transmit frequency adjustment command is then transmitted 4305 to the UE and comprises an information on a requested adjustment of the transmit frequency of the UE for UL transmissions to compensate for the estimated UL CFO.

The UE transmit frequency adjustment may be simply indicated by sending the CFO estimate of the eNB to the UE. Alternatively, the eNB may determine 4304 the level of adjustment (increase or decrease) to the UE transmit frequency that the UE should apply and could signal the adjustment level and signal this information. Another possibility would be to simply signal commands that cause the UE to increase or decrease the transmit frequency in given step sizes. The transmit frequency adjustment command could be for example comprised within Downlink Control Information (DCI) or Radio Resource Control (RRC) message transmitted from the eNB in the downlink (DL). Furthermore, sounding reference symbols correspond to one or more Demodulation Reference Signals (DMRS).

Upon the UE receiving 4306 the transmit frequency adjustment command comprising an information on a requested adjustment of the transmit frequency of the UE for UL transmissions to compensate for the estimated UL CFO. The UE adjusts 4307 the transmit frequency according to the transmit frequency adjustment command, and may further transmit 4308 another UL signal or a Sidelink (SL) signal using the adjusted transmit frequency.

In order to adjust the UE transmit frequency, UE can modify it's transmit UL signal in a way to pre-compensate the Doppler shift/CFO which would be observed on the UL receive signal at the receiving eNB. In particular, UE can adjust the transmit frequency in a way to change the UL TX frequency $F_{UL}$ by shifting in accordance to the estimated Doppler shift $\Delta F_{CFO}$ for the intended receiving eNB: $F_{UL\_update} = F_{UL} - \Delta F_{CFO}$. The latter component $\Delta F_{CFO}$, can be directly signaled or indicated by means of the transmit frequency adjustment command. Alternatively, $\Delta_{CFO}$ may also be estimated using an estimate of the Doppler shift (CFO) on the cellular DL as described in connection with FIG. 42 above. In case the Doppler shift was measured on another frequency (e.g. DL for FDD), the $\Delta F_{CFO}$ can be scaled in accordance to the actual used DL/UL frequencies.

A further exemplary implementation of the third aspect of this disclosure relates to an improvement of the receiver processing of received signals. The general idea is to apply multiple useful signal decodings under assumption of different CFO hypothesis. This approach maybe applicable mainly in case a maximum CFO which the UE/eNB is expected to handle exceeds the maximum CFO which can be estimated (e.g. using post-FFT CFO estimation as described in several implementations herein). In the latter case the signal phase offset estimates between different SC-FDMA/OFDM symbols may have an ambiguity and correspond to different possible values of the CFO with a phase ambiguity being a multiple of $2\pi$ (i.e. $\pm i \cdot 2\pi$ where i is an integer number).

Figure 44:
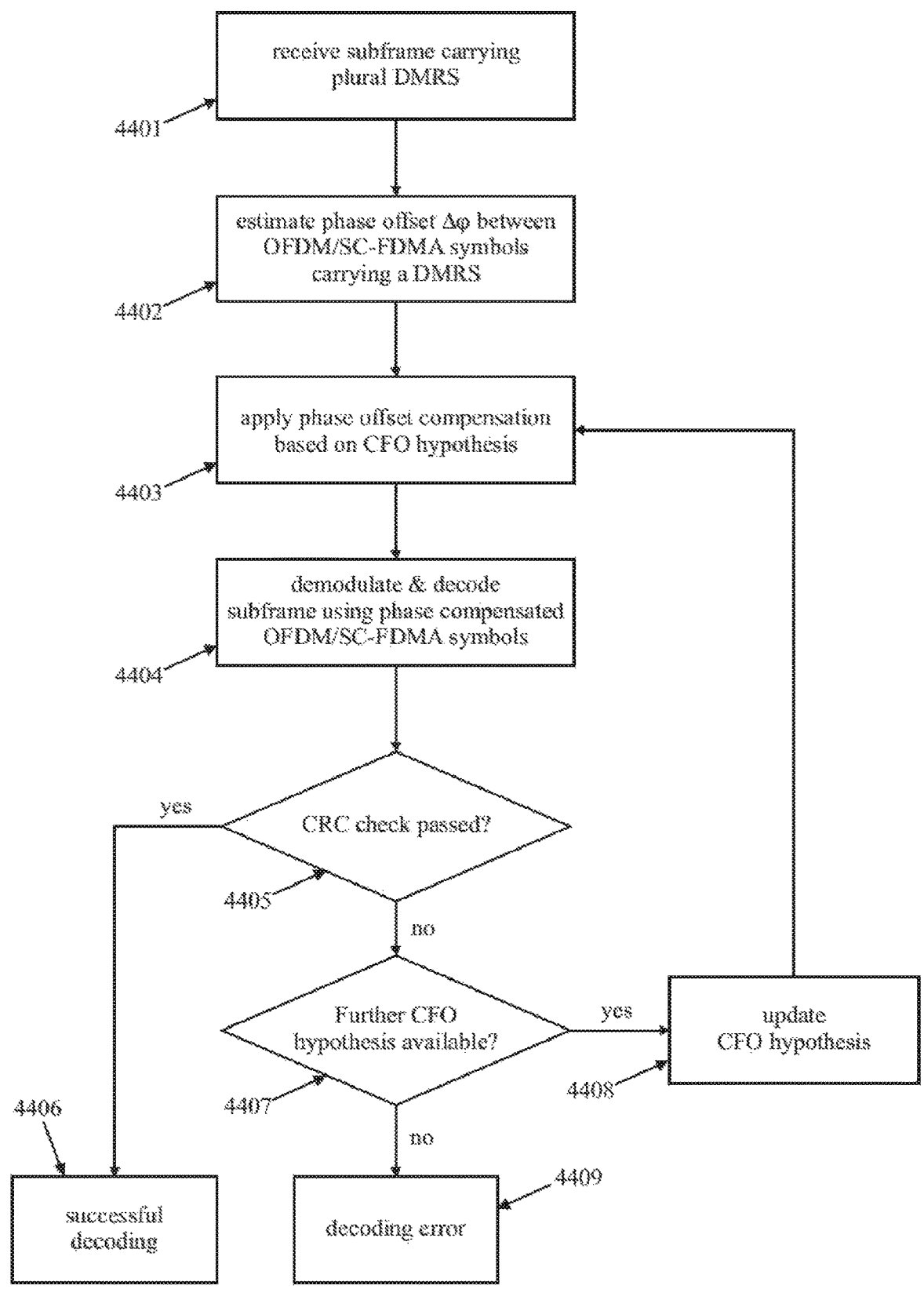
FIG. 44 shows a flow chart of an exemplary improved processing of communication signals in a communication device according to an implementation according to the third aspect of this disclosure.

FIG. 44 shows a flow chart of an exemplary improved processing of communication signals in a communication device according to an implementation in accordance with the third aspect of this disclosure. The communication device receives 4401 a subframe including a plurality of DMRS and estimates 4402 the phase offset $\Delta \varphi_{estimate}$ between a pair of OFDM/SC-FDMA symbols of said subframe each carrying a respective one of the DMRS.

Note that this step may optionally include estimating different phase offset values for different pairs of neighboring OFDM/SC-FDMA symbols of the subframe carrying respective ones of the DMRS, and combining the different estimated phase offset values to the phase offset $\Delta \varphi_{estimate}$. For example, in case the subframe has DMRS mapped to two symbols, two phase offsets $\Delta \varphi_{estimate\_1}$ and $\Delta \varphi_{estimate\_2}$ can be estimated for respective pairs of the DMRS. The pairs may be chosen such that the distance between OFDM/SC-FDMA symbols in the pairs is minimized. The two phase offsets $\Delta \varphi_{estimate\_1}$ and $\Delta \varphi_{estimate\_2}$ can then be combined into one value $\Delta \varphi_{estimate}$, e.g. by averaging or weighted averaging.

Next, the communication device performs 4403 a phase offset compensation to the OFDM/SC-FDMA symbols of the subframe based on a carrier frequency offset (CFO) hypothesis that is considering the estimated phase offset $\Delta \varphi_{estimate}$. The communication device may then try to demodulate and decode 4405 information comprised in the subframe using the phase offset-compensated OFDM/SC-FDMA symbols. The decoding may be performed in blocks and protected by a Cyclic Redundancy Check (CRC). The decoding may thus comprise checking 4405 the CRC of a block of decoded data and in case the CRC check is passed the information has been decoded successfully 4406.

In case the decoding is unsuccessful, the CFO hypothesis can be updated by the communication device and steps 4403 and 4404 (and 4405) are repeated based on the updated CFO hypothesis. In order to avoid a loop in case the information is non-decodable for another reason, the number of decoding retries may be limited, e.g. by defining a maximum number of iterations and stopping the decoding attempt when this maximum number of decoding attempts is reached. Alternatively,—as shown in FIG. 43—a predetermined number of different CFO hypothesis that is to be tested can be defined and decoding is stopped 4409 with a decoding error in case all CFO hypothesis have been tested. Accordingly, in case the CRC check failed at block 4405, the communication device may check whether there is another CFO hypothesis that is to be tested, and if yes, the CFO hypothesis is updated 4408 and steps 4403 and 4404 (and 4405) are repeated based on the updated CFO hypothesis.

As noted above, the CFO hypothesis except for one may define a predetermined additional phase offset being a multiple of $2\pi$ to be added or subtracted from the estimated phase offset $\Delta \varphi_{estimate}$. The phase offset compensation in step 4403 will is based on the estimated phase offset $\Delta \varphi_{estimate}$ and the respective additional phase offset $i \cdot 2\pi$ (where i is an integer number).

For example, considering the phase offset $\Delta \varphi_{comp\_i}$ is considered in a respective phase offset compensation step 4403, the phase offset $\Delta \varphi_{comp\_i}$ for a given CFO hypothesis i could be defined as: $\Delta \varphi_{comp\_i} = \Delta \varphi_{estimate} + i \cdot 2\pi$, where and i=[0, 1, 2, ..., N] or i=[0, ±1, ±2, ..., ±N/2]. Hence, in this example there would be N+1 CFO hypothesis that would be tested (4403, 4404) in the procedure shown in FIG. 44 before a decoding error is determined 4409.

In one exemplary implementation, the CFO hypothesis are tested with increasing additional phase offset ($i \cdot 2\pi$) starting from zero (i.e. i=0). Hence, for the case i=[0, ±1, ±2, ..., ±N/2], the CFO hypothesis would be for example tested in the order $\Delta \varphi_{comp\_0} = \Delta \varphi_{estimate}$; $\Delta \varphi_{comp\_1} = \Delta \varphi_{estimate} + 1 \cdot 2\pi$; $\Delta \varphi_{comp\_-1} = \Delta \varphi_{estimate} - 1 \cdot 2\pi$; $\Delta \varphi_{comp\_2} = \Delta \varphi_{estimate} + 2 \cdot 2\pi$; $\Delta \varphi_{comp\_-2} = \Delta \varphi_{estimate} - 2 \cdot 2\pi$; ... ; $\Delta \varphi_{comp\_N/2} = \Delta \varphi_{estimate} + N/2 \cdot 2\pi$; and $\Delta \varphi_{comp\_-N/2} = \Delta \varphi_{estimate} - N/2 \cdot 2\pi$.

Optionally, all or some of the CFO hypothesis may be tested in parallel instead using an iterative process. The improved processing of communication signals in a communication device described in connection with FIG. 44 above may be used within a UE or an eNB, for example, for reception of DL, UL or SL transmissions.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

Figure 45:
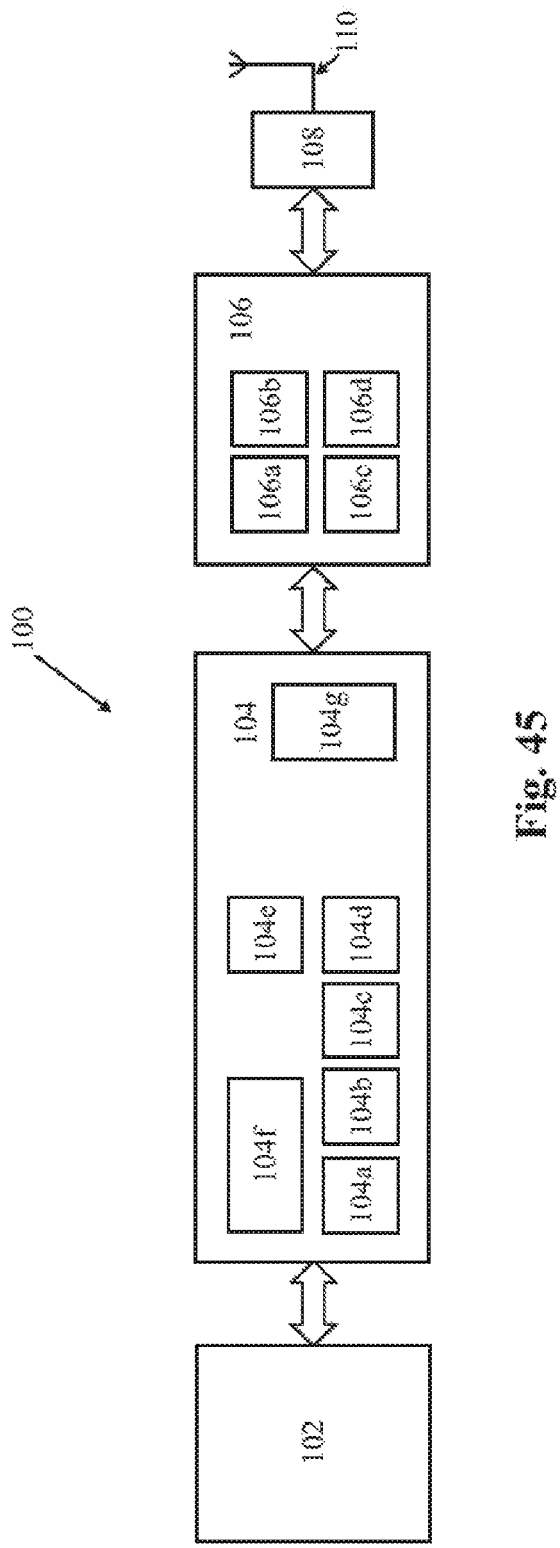
FIG. 45 illustrates example components of an electronic device in which the different aspects of this disclosure can be implemented.

Implementations described herein may be implemented into a system using any suitably configured hardware and/or software. FIG. 45 illustrates, for one implementation, example components of an electronic device 100. In implementations, the electronic device 100 may be, implement, be incorporated into, or otherwise be a part of a user equipment (UE), an evolved NodeB (eNB), a V2X device, or some other electronic communication device. In some implementations, the electronic device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some implementations, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some implementations, modulation/demodulation circuitry of the baseband circuitry 104 may include (Inverse) Fast-Fourier Transform ((I)FFT), precoding, and/or constellation mapping/demapping functionality. In some implementations, encoding/decoding circuitry of the baseband circuitry 104 may include convolution, tail-biting convolution, turbo, Viterbi, and/or Low Density Parity Check (LDPC) encoder/decoder functionality. Implementations of modulation/demodulation and encoder/decoder functionality are not limited to these examples and may include other suitable functionality in other implementations. Hence, baseband circuitry 104 may be used to implement the transmission path and reception path outlined in connection with the different implementations of aspects of this disclosure as partly exemplified in FIGS. 2 and 4.

In some implementations, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some implementations, the baseband circuitry may include one or more audio digital signal processor(s) (DSP) 104f. The audio DSP(s) 104f may be include elements for compression/decompression and echo cancellation and may include other suitable processing elements in other implementations.

The baseband circuitry 104 may further include memory/storage 104g. The memory/storage 104g may be used to load and store data and/or instructions for operations performed by the processors of the baseband circuitry 104. Memory/storage for one implementation may include any combination of suitable volatile memory and/or non-volatile memory. The memory/storage 104g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 104g may be shared among the various processors or dedicated to particular processors.

Components of the baseband circuitry may be suitably combined in a single chip, a single chipset, or disposed on a same circuit board in some implementations. In some implementations, some or all of the constituent components of the baseband circuitry 104 and the application circuitry 102 may be implemented together such as, for example, on a system on a chip (SOC).

In some implementations, the baseband circuitry 104 may provide for communication compatible with one or more radio technologies. For example, in some implementations, the baseband circuitry 104 may support communication with an evolved universal terrestrial radio access network (EU-TRAN) and/or other wireless metropolitan area networks (WMAN), a wireless local area network (WLAN), a wireless personal area network (WPAN). Implementations in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various implementations, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some implementations, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some implementations, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some implementations, the output baseband signals may be zero-frequency baseband signals, although this is not a requirement. In some implementations, mixer circuitry 106a of the receive signal path may comprise passive mixers, although the scope of the implementations is not limited in this respect.

In some implementations, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the implementations is not limited in this respect.

In some implementations, the mixer circuitry 106a of the receive signal path and the mixer circuitry 106a of the transmit signal path may include two or more mixers and may be arranged for quadrature downconversion and/or upconversion respectively. In some implementations, the mixer circuitry 106a of the receive signal path and the mixer circuitry 106a of the transmit signal path may include two or more mixers and may be arranged for image rejection (e.g., Hartley image rejection). In some implementations, the mixer circuitry 106a of the receive signal path and the mixer circuitry 106a may be arranged for direct downconversion and/or direct upconversion, respectively. In some implementations, the mixer circuitry 106a of the receive signal path and the mixer circuitry 106a of the transmit signal path may be configured for super-heterodyne operation.

In some implementations, the output baseband signals and the input baseband signals may be analog baseband signals, although the scope of the implementations is not limited in this respect. In some alternate implementations, the output baseband signals and the input baseband signals may be digital baseband signals. In these alternate implementations, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode implementations, a separate radio IC circuitry may be provided for processing signals for each spectrum, although the scope of the implementations is not limited in this respect.

In some implementations, the synthesizer circuitry 106d may be a fractional-N synthesizer or a fractional N/N+1 synthesizer, although the scope of the implementations is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some implementations, the synthesizer circuitry 106d may be a fractional N/N+1 synthesizer.

In some implementations, frequency input may be provided by a voltage controlled oscillator (VCO), although that is not a requirement. Divider control input may be provided by either the baseband circuitry 104 or the applications processor 102 depending on the desired output frequency. In some implementations, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some implementations, the divider may be a dual modulus divider (DMD) and the phase accumulator may be a digital phase accumulator (DPA). In some implementations, the DMD may be configured to divide the input signal by either N or N+1 (e.g., based on a carry out) to provide a fractional division ratio. In some example implementations, the DLL may include a set of cascaded, tunable, delay elements, a phase detector, a charge pump and a D-type flip-flop. In these implementations, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 106d may be configured to generate a carrier frequency as the output frequency, while in other implementations, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency may be a LO frequency (fLO). In some implementations, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some implementations, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some implementations, the electronic device 100 may include additional elements such as, for example, memory/storage, display, camera, sensor, and/or input/output (I/O) interface.

Various implementations may be configured to perform one or more methods, processes, and/or techniques as described herein.

EXAMPLES

Example 1 provides a method for execution by a user equipment (UE), comprising: forming a communication signal by applying an Inverse Fast Fourier Transform (IFFT) of size $N_{FFT}$ to OFDM or SC-FDMA symbols of a subframe carrying information of a physical channel designated for V2X communication; and transmitting the communication signal corresponding to the subframe, wherein the subframe has a predetermined number $N_{SC}^{BW}$ of subcarriers in the frequency domain, and a predetermined number $N_{symb}$ of OFDM or SC-FDMA symbols in the time domain; wherein the subcarrier spacing $\Delta f_{SC}$ between subcarriers is $\Delta f_{SC} = n \cdot \Delta f_{legacy}$, where $n \in \{2, 3, 4, 5, 6, 7, 8, \ldots\}$ and where $\Delta f_{legacy}$ is a subcarrier spacing of a subcarriers of a physical channel not designated for V2X communication; and wherein the size $N_{FFT}$ of the IFFT is $N_{FFT} = N_{FFT_{legacy}}/n$, where $N_{FFT_{legacy}}$ is the size of the IFFT used for transmitting subframes carrying information of said physical channel not designated for V2X communication.

Example 2 is an optional enhancement of Example 1, wherein the of OFDM or SC-FDMA symbol duration $T_{symb} = T_{symb_{legacy}}/n$, where $T_{symb_{legacy}}$ is the OFDM or SC- FDMA symbols duration used for transmitting subframes carrying information of said physical channel not designated for V2X communication.

Example 3 is an optional enhancement of Examples 1 or 2, wherein the sampling time $T_S=T_{S_{legacy}}$ and sampling rate $F_S=F_{S_{legacy}}$, where $T_{S_{legacy}}$ and $F_{S_{legacy}}$ are the sampling time and sampling rate used for transmitting subframes carrying information of said physical channel not designated for V2X communication.

Example 4 is an optional enhancement of one of Examples 1 to 3, wherein $\Delta f_{legacy}=15$ kHz.

Example 5 is an optional enhancement of one of Examples 1 to 4, wherein the number $N_{SC}^{BW}$ of subcarriers is a function of the system bandwidth.

Example 6 is an optional enhancement of Example 5, wherein the system bandwidth is one of 1.4 MHz, 3 MHz, 5 MHz, 10 MHz, 15 MHz, 20 MHz, 40 MHz, 60 MHz, 80 MHz, 100 MHz.

Example 7 is an optional enhancement of one of Examples 1 to 6, wherein the physical channel not designated for V2X communication is a physical uplink, downlink or sidelink channel of a 3GPP LTE- or 3GPP LTE-A-based mobile communication system.

Example 8 is an optional enhancement of one of Examples 1 to 7, wherein the physical channel designated for V2X communication is a sidelink (SL) physical channel of a 3GPP LTE- or 3GPP LTE-A-based mobile communication system.

Example 9 is an optional enhancement of one of Examples 1 to 8, wherein the V2X communication is a communication from the UE within a vehicle to either one of another UE within another vehicle (V2V), a network element, e.g. eNB, in the radio access network infrastructure (V2I, V2N), or another UE carried by a person (V2P), or vice versa.

Example 10 is an optional enhancement of one of Examples 1 to 9, wherein the carrier frequency of the frequency band of the physical channel designated for V2X communication is equal or higher than 2 GHz, preferably higher than 3 GHz.

Example 11 is an optional enhancement of one of Examples 1 to 10, wherein the parameter n is a function of carrier frequency value.

Example 12 relates to a user equipment (UE) comprising: a baseband circuitry to form a communication signal by applying to an Inverse Fast Fourier Transform (IFFT) of size $N_{IFFT}$ to OFDM or SC-FDMA symbols of a subframe carrying information of a physical channel designated for V2X communication; a RF circuitry to transmit the communication signal corresponding to the subframe, wherein the subframe has a predetermined number $N_{SC}^{BW}$ of subcarriers in the frequency domain, and a predetermined number $N_{symb}$ of OFDM or SC-FDMA symbols in the time domain; wherein the subcarrier spacing $\Delta f_{SC}$ between subcarriers is $\Delta f_{SC}=n\cdot f_{legacy}$, where $n\in\{2, 3, 4, 5, 6, 7, 8, \ldots\}$ and where $\Delta f_{legacy}$ is a subcarrier spacing of a subcarriers of a physical channel not designated for V2X communication; and wherein the size $N_{FFT}$ of the IFFT is $N_{FFT}=N_{FFT_{legacy}}/n$, where $N_{FFT_{legacy}}$ is the size of the IFFT used for transmitting subframes carrying information of said physical channel not designated for V2X communication.

Example 13 relates to a user equipment (UE) adapted to perform the method of one of Examples 1 to 11.

Example 14 relates to a one or more non-transitory computer readable media storing instructions that, when executed by processing circuitry of a user equipment (UE), cause the UE to: form a communication signal by applying an Inverse Fast Fourier Transform (IFFT) of size $N_{FFT}$ to OFDM or SC-FDMA symbols of a subframe carrying information of a physical channel designated for V2X communication; and transmit the communication signal corresponding to the subframe, wherein the subframe has a predetermined number $N_{SC}^{BW}$ of subcarriers in the frequency domain, and a predetermined number $N_{symb}$ of OFDM or SC-FDMA symbols in the time domain; wherein the subcarrier spacing $\Delta f_{SC}$ between subcarriers is $\Delta f_{SC}=n\cdot\Delta f_{legacy}$, where $n\in\{2, 3, 4, 5, 6, 7, 8, \ldots\}$ and where $\Delta f_{legacy}$ is a subcarrier spacing of a subcarriers of a physical channel not designated for V2X communication; and wherein the size $N_{FFT}$ of the IFFT is $N_{FFT}=N_{FFT_{legacy}}/n$, where $N_{FFT_{legacy}}$ is the size of the IFFT used for transmitting subframes carrying information of said physical channel not designated for V2X communication.

Example 15 relates to a one or more non-transitory computer readable media storing instructions that, when executed by processing circuitry of a user equipment (UE), cause the UE to perform the method of one of Examples 1 to 11.

Example 16 relates to a method for execution by a communication device, comprising: receiving a communication signal corresponding to a subframe carrying information of a physical channel designated for V2X communication, applying a Fast Fourier Transform (IFFT) of size $N_{FFT}$ on the received communication signal to obtain OFDM or SC-FDMA symbols of the subframe; and wherein the subframe has a predetermined number $N_{SC}^{BW}$ of subcarriers in the frequency domain, and a predetermined number $N_{symb}$ of OFDM or SC-FDMA symbols in the time domain; wherein the subcarrier spacing $\Delta f_{SC}$ between subcarriers is $\Delta f_{SC}=n\cdot\Delta_{legacy}$, where $n\in\{2, 3, 4, 5, 6, 7, 8, \ldots\}$ and where $\Delta f_{legacy}$ is a subcarrier spacing of a subcarriers of a physical channel not designated for V2X communication; and wherein the size $N_{FFT}$ of the FFT is $N_{FFT}=N_{FFT_{legacy}}/n$, where $N_{FFT_{legacy}}$ is the size of the FFT used for receiving communications signals of said radio channel not designated for V2X communication.

Example 17 is an optional enhancement of Example 13, wherein $\Delta f_{legacy}=15$ kHz.

Example 18 is an optional enhancement of Example 14 or 15, wherein the number $N_{SC}^{BW}$ of subcarriers is a function of the system bandwidth.

Example 19 is an optional enhancement of Example 16, wherein the system bandwidth is one of 1.4 MHz, 3 MHz, 5 MHz, 10 MHz, 15 MHz, 20 MHz, 40 MHz, 60 MHz, 80 MHz, 100 MHz.

Example 20 is an optional enhancement of one of Examples 16 to 19, wherein the physical channel not designated for V2X communication is a physical uplink, downlink or sidelink channel of a 3GPP LTE- or 3GPP LTE-A-based mobile communication system.

Example 21 is an optional enhancement of one of Examples 16 to 20, wherein the physical channel designated for V2X communication is a sidelink physical channel of a 3GPP LTE- or 3GPP LTE-A-based mobile communication system.

Example 22 is an optional enhancement of one of Examples 16 to 21, wherein the V2X communication is a communication between a UE within a vehicle and either one of another UE within another vehicle (V2V), a network element, e.g. eNobe B, in the radio access network infrastructure (V2I), or another UE carried by a person (V2P).

Example 23 is an optional enhancement of one of Examples 16 to 22, wherein the carrier frequency of the frequency band of the physical channel designated for V2X communication is higher than 2 GHz, preferably higher than 3 GHz.

Example 24 is an optional enhancement of one of Examples 16 to 23, wherein the parameter n is a function of carrier frequency value.

Example 25 relates to a communication device comprising: a RF circuitry to receive a communication signal corresponding to a subframe carrying information of a physical channel designated for V2X communication, a baseband circuitry to perform an Inverse Fast Fourier Transform (IIFFT) of size $N_{FFT}$ on the received communication signal to obtain OFDM or SC-FDMA symbols of the subframe; and wherein the subframe has a predetermined number $N_{SC}^{BW}$ of subcarriers in the frequency domain, and a predetermined number $N_{symb}$ of OFDM or SC-FDMA symbols in the time domain; wherein the subcarrier spacing $\Delta f_{SC}$ between subcarriers is $\Delta f_{SC} = n \cdot \Delta f_{legacy}$, where $n \in \{2, 3, 4, 5, 6, 7, 8, \ldots\}$ and where $\Delta f_{legacy}$ is a subcarrier spacing of a subcarriers of a physical channel not designated for V2X communication; and wherein the size $N_{FFT}$ of the FFT is $N_{FFT} = N_{FFT_{legacy}}/n$, where $N_{FFT_{legacy}}$ is the size of the FFT used for receiving subframes carrying information of said physical channel not designated for V2X communication.

Example 26 relates to a communication device adapted to perform the method of one of Examples 16 to 24.

Example 27 is an optional enhancement of Example 25 or 26, wherein the communication device is user equipment (UE) or an eNB.

Example 28 relates to one or more non-transitory computer readable media storing instructions that, when executed by processing circuitry of a communication device, cause the communication device to: receive a communication signal corresponding to a subframe carrying information of a physical channel designated for V2X communication, perform a Fast Fourier Transform (FFT) of size $N_{FFT}$ on the received communication signal to obtain OFDM or SC-FDMA symbols of the subframe; and wherein the subframe has a predetermined number $N_{SC}^{BW}$ of subcarriers in the frequency domain, and a predetermined number $N_{symb}$ of OFDM or SC-FDMA symbols in the time domain; wherein the subcarrier spacing $\Delta f_{SC}$ between subcarriers is $\Delta f_{SC} = n \cdot \Delta f_{legacy}$, where $n \in \{2, 3, 4, 5, 6, 7, 8, \ldots\}$ and where $\Delta f_{legacy}$ is a subcarrier spacing of a subcarriers of a physical channel not designated for V2X communication; and wherein the size $N_{FFT}$ of the FFT is $N_{FFT} = N_{FFT_{legacy}}/n$, where $N_{FFT_{legacy}}$ is the size of the FFT used for receiving communications signals of said physical channel not designated for V2X communication.

Example 29 relates to one or more non-transitory computer readable media storing instructions that, when executed by processing circuitry of a user equipment (UE), cause the UE to perform the method of one of Examples 16 to 24.

Example 30 relates to a subframe of a physical channel designated for V2X communication, wherein subframe has a predetermined number $N_{SC}^{BW}$ of subcarriers in the frequency domain, and a predetermined number $N_{symb}$ of OFDM or SC-FDMA symbols in the time domain; wherein the subcarrier spacing $\Delta f_{SC}$ between subcarriers is $\Delta f_{SC} = n \cdot \Delta f_{legacy}$, where $n \in \{2, 3, 4, 5, 6, 7, 8, \ldots\}$ and where $\Delta f_{legacy}$ is a subcarrier spacing of a subcarriers of a physical channel not designated for V2X communication; and wherein the symbol duration $T_{symb}$ of the OFDM or SC-FDMA symbols having the indices is $T_{symb} = T_{symb_{legacy}}/n$, where $T_{symb_{legacy}}$ is the symbol duration of OFDM or SC-FDMA symbols having the indices used for transmitting subframes carrying information of said physical channel not designated for V2X communication.

Example 31 is an optional enhancement of Example 30, wherein $\Delta f_{legacy} = 15$ kHz.

Example 32 is an optional enhancement of Example 30 or 31, wherein the number $N_{SC}^{BW}$ of subcarriers is a function of the system bandwidth.

Example 33 is an optional enhancement of Example 32, wherein the system bandwidth is one of 1.4 MHz, 3 MHz, 5 MHz, 10 MHz, 15 MHz, 20 MHz, 40 MHz, 60 MHz, 80 MHz, 100 MHz.

Example 34 is an optional enhancement of one of Examples 30 to 33, wherein the subframe has $N_{symb}=14$ or $N_{symb}=12$ symbols.

Example 35 is an optional enhancement of one of Examples 30 to 34, wherein the subframe spans less than 1 ms in the time domain.

Example 36 is an optional enhancement of one of Examples 30 to 34, wherein the subframe spans 0.5 ms or 0.25 ms in the time domain.

Example 37 is an optional enhancement of one of Example 30 to 36, wherein the sampling time $T_S = T_{S_{legacy}}$ and sampling rate $F_S = F_{S_{legacy}}$, where $T_{S_{legacy}}$ and $F_{S_{legacy}}$ are the sampling time and sampling rate used for transmitting subframes carrying information of said physical channel not designated for V2X communication Example 38 is an optional enhancement of one of Examples 30 to 37, wherein each symbol has a cyclic prefix.

Example 39 is an optional enhancement of one of Examples 30 to 37, wherein each symbol has either a first cyclic prefix or a-second cyclic prefix, where the second cyclic prefix is longer than the first cyclic prefix.

Example 40 relates to a method for execution by a user equipment (UE), comprising: mapping Demodulation Reference Signals (DMRS) to a subframe carrying information of a physical channel designated for V2X communication, wherein the subframe has a predetermined number $N_{SC}^{BW}$ of subcarriers in the frequency domain, and a predetermined number $N_{symb}$ of OFDM or SC-FDMA symbols in the time domain; and transmitting a communication signal corresponding to the subframe; wherein the DMRS are mapped to four of the said OFDM or SC-FDMA symbols.

Example 41 is an optional enhancement of Example 40, wherein the DMRS are mapped to four of the said OFDM or SC-FDMA symbols, and the subframe is divided, in the time domain, into two slots, wherein two of the DMRS are mapped to the first slot of said OFDM or SC-FDMA symbols and wherein two of the DMRS are mapped to the second slot of said OFDM or SC-FDMA symbols.

Example 42 is an optional enhancement of Example 41, wherein the first slot comprises the first half of the OFDM or SC-FDMA symbols and the second slot comprises the second half of the OFDM or SC-FDMA symbols.

Example 43 is an optional enhancement of Example 40 to 42, wherein subframe is a subframe of one of Examples 30 to 39.

Example 44 is an optional enhancement of one of Examples 40 to 43, further comprising: applying an Inverse Fast Fourier Transform (IFFT) of size $N_{FFT}$ to the OFDM or SC-FDMA symbols of the subframe to form the communication signal; and wherein the size $N_{FFT}$ of the IFFT is $N_{FFT} = N_{FFT_{legacy}}/n$, where $n \in \{1, 2, 3, 4, \ldots\}$, where $N_{FFT_{legacy}}$ is the size of the IFFT used for transmitting subframes carrying information of said physical channel not designated for V2X communication; and wherein the subcarrier spacing $\Delta f_{SC}$ between subcarriers is $\Delta f_{SC} = n \cdot \Delta f_{legacy}$, where $n \in \{1, 2,$ 3, 4, . . . } and where $\Delta f_{legacy}$ is a subcarrier spacing of a subcarriers of a physical channel not designated for V2X communication.

Example 45 is an optional enhancement of Example 40 to 44, wherein each OFDM or SC-FDMA symbol of the subframe has $N_{SC}^{BW}$ resource elements (REs) mapped to the respective $N_{SC}^{BW}$ subcarriers of the subframe, and the each DMRS has a frequency contiguous transmission pattern that occupies all REs of a respective OFDM or SC-FDMA symbol carrying the DMRS.

Example 46 is an optional enhancement of Example 45, wherein each OFDM or SC-FDMA symbol of the subframe has $N_{SC}^{BW}$ resource elements (REs) mapped to the respective $N_{SC}^{BW}$ subcarriers of the subframe, and wherein the $N_{SC}^{BW}$ REs are continuously indexed with index $i \in \{0, 1, \ldots, N_{SC}^{BW}-1\}$, and the method further comprises: puncturing all REs of an OFDM or SC-FDMA symbol to which a DMRS has been mapped having an index j other than $j(x)=k+m\cdot x$ for $x=[0, 1, \ldots, \lfloor N_{SC}^{BW}/m-1 \rfloor]$ where $m \in \{2, 3, 4, \ldots, 8\}$, and $k \in \{0, \ldots, m-1\}$, wherein said transmission of the communication signal corresponding to the subframe comprises transmitting with non-zero power on non-punctured REs of the OFDM or SC-FDMA symbol to which the DMRS has been mapped, and transmitting with zero power on punctured REs of the OFDM or SC-FDMA symbol to which the DMRS has been mapped.

Example 47 is an optional enhancement of Example 46, further comprising: receiving a RRC message comprising information on the puncturing pattern to be applied by the UE.

Example 47 is an optional enhancement of Example 40 to 44, wherein each OFDM or SC-FDMA symbol of the subframe has $N_{SC}^{BW}$ resource elements (REs) mapped to the respective $N_{SC}^{BW}$ subcarriers of the subframe, and the each DMRS has a transmission pattern that occupies REs of a respective OFDM or SC-FDMA symbol carrying the DMRS of a predetermined periodic pattern.

Example 49 is an optional enhancement of Example 40 to 45, wherein each OFDM or SC-FDMA symbol of the subframe has $N_{SC}^{BW}$ resource elements (REs) mapped to the respective $N_{SC}^{BW}$ subcarriers of the subframe, and wherein the $N_{SC}^{BW}$ REs are continuously indexed with index $i \in \{0, 1, \ldots, N_{SC}^{BW}-1\}$, and the method further comprises: mapping a respective one of DMRS to the REs having the indices $j(x)=k+m\cdot x$ for $x=[0, 1, \ldots, \lfloor N_{SC}^{BW}/m-1 \rfloor]$ where $m \in \{2, 3, 4, \ldots, 8\}$, and $k \in \{0, \ldots, m-1\}$; and wherein said transmission of the communication signal corresponding to the subframe comprises transmitting with non-zero power on REs of the OFDM or SC-FDMA symbol to which the DMRS has been mapped, and transmitting with zero power on REs of the OFDM or SC-FDMA symbol to which the DMRS has not been mapped.

Example 50 is an optional enhancement of one of Examples 46, 48 or 49, further comprising: applying an Inverse Fast Fourier Transform (IFFT) of size $N_{FFT}$ to the OFDM or SC-FDMA symbols of the subframe to obtain the communication signal, thereby causing said transmission of the communication signal to include m consecutive versions of the IFFT-transformed DRMS symbols within the subframe.

Example 51 is an optional enhancement of Example 40 to 50, wherein in case the subframe has $N_{symb}=14$ OFDM or SC-FDMA symbols being indexed from 0 to 13, each OFDM or SC-FDMA symbol has a normal cyclic prefix and the DMRS are transmitted by the UE in: the OFDM or SC-FDMA symbols having the indices 2, 6, 7 and 11, or the OFDM or SC-FDMA symbols having the indices 3, 6, 7 and 10, or the OFDM or SC-FDMA symbols having the indices 4, 6, 7 and 9, or the OFDM or SC-FDMA symbols having the indices 2, 3, 10 and 11, or the OFDM or SC-FDMA symbols having the indices 2, 4, 9, 11.

Example 52 is an optional enhancement of Example 40 to 51, wherein in case the subframe has $N_{symb}=12$ OFDM or SC-FDMA symbols being indexed from 0 to 11, each OFDM or SC-FDMA symbol has an extended cyclic prefix and the DMRS are transmitted by the UE in: the OFDM or SC-FDMA symbols having the indices 4 and 7, or the OFDM or SC-FDMA symbols having the indices 2, 5, 6 and 9, or the OFDM or SC-FDMA symbols having the indices 3, 5, 6 and 8, or the OFDM or SC-FDMA symbols having the indices 2, 3, 8 and 9.

Example 53 is an optional enhancement of one of Examples 40 to 52, wherein the physical channel designated for V2X communication is a sidelink physical channel of a 3GPP LTE- or 3GPP LTE-A-based mobile communication system.

Example 54 is an optional enhancement of one of Examples 40 to 53, wherein the V2X communication is a communication from the UE within a vehicle to either one of another UE within another vehicle (V2V), a network element, e.g. eNobe B, in the radio access network infrastructure (V2I), or another UE carried by a person (V2P), or vice versa.

Example 55 is an optional enhancement of one of Examples 40 to 54, wherein the carrier frequency of the frequency band of the physical channel designated for V2X communication is higher than 2 GHz, preferably higher than 3 GHz.

Example 56 relates to a user equipment (UE), comprising: a baseband circuitry to map Demodulation Reference Signals (DMRS) to a subframe carrying information of a physical channel designated for V2X communication, wherein the subframe has a predetermined number $N_{SC}^{BW}$ of subcarriers in the frequency domain, and a predetermined number $N_{symb}$ of OFDM or SC-FDMA symbols in the time domain; and a RF circuitry to transmit a communication signal corresponding to the subframe; wherein the baseband circuitry maps the DMRS to four of the said OFDM or SC-FDMA symbols.

Example 56 is an optional enhancement of Example 56, wherein the baseband circuitry further applies an Inverse Fast Fourier Transform (IFFT) of size $N_{FFT}$ the OFDM or SC-FDMA symbols of the subframe to obtain the communication signal; wherein the size $N_{FFT}$ of the IFFT is $N_{FFT}=N_{FFT_{legacy}}/n$, where $N_{FFT_{legacy}}$ is the size of the IFFT used for transmitting subframes carrying information of said physical channel not designated for V2X communication.

Example 58 is an optional enhancement of Example 56 or 57, wherein subframe is a subframe of one of Examples 30 to 39.

Example 59 relates to a user equipment (UE) adapted to perform the method of one of Examples 40 to 55.

Example 60 relates to one or more non-transitory computer readable media storing instructions that, when executed by processing circuitry of a communication device, cause the communication device to: add Demodulation Reference Signals (DMRS) to a communication signal; and to transmit the communication signal within a subframe of a physical channel designated for V2X communication, wherein the subframe has a predetermined number $N_{SC}^{BW}$ of subcarriers in the frequency domain, and a predetermined number $N_{symb}$ of OFDM or SC-FDMA symbols in the time domain; wherein the baseband circuitry maps the DMRS to or four of the said OFDM or SC-FDMA symbols.

Example 61 is an optional enhancement of Example 60, wherein the one or more non-transitory computer readable media further store instructions that, when executed by the processing circuitry of the communication device, cause the communication device to apply an Inverse Fast Fourier Transform (IFFT) of size $N_{FFT}$ the communication signal; wherein the size $N_{FFT}$ of the IFFT is $N_{FFT}=N_{FFT_{legacy}}/n$, where $N_{FFT_{legacy}}$ is the size of the IFFT used for transmitting subframes carrying information of said physical channel not designated for V2X communication.

Example 62 relates to one or more non-transitory computer readable media storing instructions that, when executed by processing circuitry of a communication device, cause the communication device to perform the method of one of Examples 40 to 55.

Example 63 relates to a method for execution by a communication device, comprising: receiving, from a user equipment (UE), a communication signal within a subframe of a physical channel designated for V2X communication, applying a Fast Fourier Transform (FFT) of size $N_{FFT\_RX}=N_{FFT}/m$ to the received communication signal corresponding to different Demodulation Reference Signals (DMRS), where $N_{FFT}$ is the size of IFFT used by the UE to generate the received communication signal, and where $m \in \{2, 3, 4, \ldots\}$; and where FFT of size $N_{FFT\_RX}$ is applied to respective ones of m consecutive subparts of one of the DMRS within the received communication signal in the time domain to derive m sets of the DMRS symbols corresponding to respective resource elements (REs) of the subframe in the frequency domain for each of the m consecutive subparts of one of the DMRS in the time domain; and the method further comprises estimating the receive signal carrier frequency offset (CFO) using the m sets of DMRS symbols obtained for a respective one DMRS.

Example 64 is an optional enhancement of Example 63, wherein estimating the receive signal CFO comprises determining the phase offset between the m consecutive subparts of the received communication signal and estimating the receive signal CFO based on the determined phase offset.

Example 65 is an optional enhancement of Example 63 or 64, wherein the communication signal received by the communication device is generated by the UE according to the method of Example 46, 48 or 49.

Example 66 relates to a communication device comprising: RF circuitry to receive, from a user equipment (UE), a communication signal within a subframe of a physical channel designated for V2X communication, baseband circuitry to apply a Fast Fourier Transform (FFT) of size $N_{FFT\_RX}=N_{FFT}/m$ to the received communication signal corresponding to the DMRS symbols, where $N_{FFT}$ is the site of IFFT used by the UE to generate the received communication signal, and where $m \in \{2, 3, 4, \ldots\}$; and wherein the baseband circuitry applies the FFT of size $N_{FFT\_RX}$ to respective ones of m consecutive subparts of one of the DMRS within the received communication signal in the time domain to derive m sets of the DMRS symbols corresponding to respective resource elements (REs) of the subframe in the frequency domain for each of the m consecutive subparts of one of the DMRS in the time domain, and estimates the receive signal carrier frequency offset (CFO) using the m sets of DMRS symbols obtained for a respective one DMRS.

Example 67 relates to one or more non-transitory computer readable media storing instructions that, when executed by a processing circuitry of a communication device, cause the communication device to: receive, from a user equipment (UE), a communication signal within a subframe of a physical channel designated for V2X communication, apply a Fast Fourier Transform (FFT) of size $N_{FFT\_RX}=N_{FFT}/m$ to the received communication signal corresponding to the DMRS symbols, where $N_{FFT}$ is the site of IFFT used by the UE to generate the received communication signal, and where $m \in \{2, 3, 4, \ldots\}$; and where FFT is of size $N_{FFT\_RX}$ to respective ones of m consecutive subparts of one of the DMRS within the received communication signal in the time domain to derive m sets of the DMRS symbols corresponding to respective resource elements (REs) of the subframe in the frequency domain for each of the m consecutive subparts of one of the DMRS in the time domain; and wherein the instructions further cause the communication device to estimate the receive signal carrier frequency offset (CFO) using the m sets of DMRS symbols obtained for a respective one DMRS Example 68 relates to a method for execution by a user equipment (UE), comprising: adding Demodulation Reference Signals (DMRS) to a communication signal; and transmitting the communication signal within a subframe carrying information of a physical channel designated for V2X communication, wherein the subframe has a predetermined number $N_{SC}^{BW}$ of subcarriers in the frequency domain, and a predetermined number $N_{symb}$ of OFDM or SC-FDMA symbols in the time domain; wherein the DMRS are mapped to two or four of the said OFDM or SC-FDMA symbols, and wherein each OFDM or SC-FDMA symbol of the subframe has $N_{SC}^{NW}$ resource elements (REs) mapped to the respective $N_{SC}^{BW}$ subcarriers of the subframe, and the each DMRS has a transmission pattern that occupies REs of a respective OFDM or SC-FDMA symbol carrying the DMRS of a predetermined periodic pattern.

Example 69 is an optional enhancement of Example 68, wherein each OFDM or SC-FDMA symbol of the subframe has $N_{SC}^{BW}$ resource elements (REs) mapped to the respective $N_{SC}^{BW}$ subcarriers of the subframe, and the each DMRS has a frequency contiguous transmission pattern that occupies all REs of a respective OFDM or SC-FDMA symbol carrying the DMRS; wherein each OFDM or SC-FDMA symbol of the subframe has $N_{SC}^{BW}$ resource elements (REs) mapped to the respective $N_{SC}^{BW}$ subcarriers of the subframe, and wherein the $N_{SC}^{BW}$ REs are continuously indexed with index $i \in \{0, 1, \ldots, N_{SC}^{BW}-1\}$, and wherein the method further comprises puncturing all REs of an OFDM or SC-FDMA symbol to which a DMRS has been mapped having an index j other than $j(x)=k+m \cdot x$ for $x=[0, 1, \ldots, \lfloor N_{SC}^{BW}/m-1 \rfloor]$ where $m \in \{2, 3, 4, \ldots, 8\}$, and $k \in \{0, \ldots, m-1\}$, wherein said transmission of the communication signal within a subframe comprises transmitting with non-zero power on non-punctured REs of the OFDM or SC-FDMA symbol to which the DMRS has been mapped, and transmitting with zero power on punctured REs of the OFDM or SC-FDMA symbol to which the DMRS has been mapped.

Example 70 is an optional enhancement of Example 68, wherein each OFDM or SC-FDMA symbol of the subframe has $N_{SC}^{BW}$ resource elements (REs) mapped to the respective $N_{SC}^{BW}$ subcarriers of the subframe, and wherein the $N_{SC}^{BW}$ REs are continuously indexed with index $i \in \{0, 1, \ldots, N_{SC}^{BW}-1\}$, and the method further comprises: mapping a respective one of DMRS to the REs having the indices $j(x)=k+m \cdot x$ for $x=[0, 1, \ldots, \lfloor N_{SC}^{BW}/m-1 \rfloor]$ where $m \in \{2, 3, 4, \ldots, 8\}$, and $k \in \{0, \ldots, m-1\}$; and wherein said transmission of the communication signal within a subframe comprises transmitting with non-zero power on REs of the OFDM or SC-FDMA symbol to which the DMRS has been mapped, and transmitting with zero power on REs of the OFDM or SC-FDMA symbol to which the DMRS has not been mapped.

Example 71 is an optional enhancement of one of Examples 68 to 70, further comprising: applying an Inverse Fast Fourier Transform (IFFT) of size $N_{FFT}$ to the OFDM or SC-FDMA symbols of the subframe, thereby causing said transmission of the communication signal to include a transmission of two consecutive versions of the IFFT-transformed communication signal in the time domain.

Example 72 is an optional enhancement of Example 68 to 71, wherein in case the subframe has $N_{symb}=14$ OFDM or SC-FDMA symbols being indexed from 0 to 13, each OFDM or SC-FDMA symbol has a normal cyclic prefix and the DMRS are transmitted by the UE in: the OFDM or SC-FDMA symbols having the indices 3 and 10, or the OFDM or SC-FDMA symbols having the indices 5 and 8, or the OFDM or SC-FDMA symbols having the indices 2, 6, 7 and 11, or the OFDM or SC-FDMA symbols having the indices 3, 6, 7 and 10, or the OFDM or SC-FDMA symbols having the indices 4, 6, 7 and 9, or the OFDM or SC-FDMA symbols having the indices 2, 3, 10 and 11, or the OFDM or SC-FDMA symbols having the indices 2, 4, 9, 11.

Example 73 is an optional enhancement of Example 68 to 72, wherein in case the subframe has $N_{symb}=12$ OFDM or SC-FDMA symbols being indexed from 0 to 11, each OFDM or SC-FDMA symbol has an extended cyclic prefix and the DMRS are transmitted by the UE in: the OFDM or SC-FDMA symbols having the indices 2 and 8, or the OFDM or SC-FDMA symbols having the indices 3 and 7, or the OFDM or SC-FDMA symbols having the indices 4 and 7, or the OFDM or SC-FDMA symbols having the indices 2, 5, 6 and 9, or the OFDM or SC-FDMA symbols having the indices 3, 5, 6 and 8, or the OFDM or SC-FDMA symbols having the indices 2, 3, 8 and 9.

Example 74 is an optional enhancement of one of Examples 68 to 73, wherein the DMRS are mapped to four of the said OFDM or SC-FDMA symbols, and the subframe is divided, in the time domain, into two slots, wherein two of the DMRS are mapped to the first slot of said OFDM or SC-FDMA symbols and wherein two of the DMRS are mapped to the second slot of said OFDM or SC-FDMA symbols.

Example 75 is an optional enhancement of one of Examples 68 to 73, wherein the DMRS are mapped to two of the said OFDM or SC-FDMA symbols, and the subframe is divided, in the time domain, into two slots, wherein one of the DMRS is mapped to the first slot of said OFDM or SC-FDMA symbols and wherein the other one of the DMRS is mapped to the second slot of said OFDM or SC-FDMA symbols.

Example 76 relates to a user equipment (UE), comprising: baseband circuitry to add Demodulation Reference Signals (DMRS) to a communication signal; and RF circuitry to transmit the communication signal within a subframe carrying information of a physical channel designated for V2X communication, wherein the subframe has a predetermined number $N_{SC}^{BW}$ of subcarriers in the frequency domain, and a predetermined number $N_{symb}$ of OFDM or SC-FDMA symbols in the time domain; wherein the baseband circuitry maps DMRS to two or four of the said OFDM or SC-FDMA symbols, and wherein each OFDM or SC-FDMA symbol of the subframe has $N_{SC}^{BW}$ resource elements (REs) mapped to the respective $N_{SC}^{BW}$ subcarriers of the subframe, and the each DMRS has a transmission pattern that occupies REs of a respective OFDM or SC-FDMA symbol carrying the DMRS of a predetermined periodic pattern.

Example 77 relates to a user equipment (UE) adapted to perform the method of one of Examples 68 to 76.

Example 78 relates to one or more non-transitory computer readable media storing instructions that, when executed by a processing circuitry of a user equipment (UE), cause the UE to: add Demodulation Reference Signals (DMRS) to a communication signal; and transmit the communication signal within a subframe carrying information of a physical channel designated for V2X communication, wherein the subframe has a predetermined number $N_{SC}^{BW}$ of subcarriers in the frequency domain, and a predetermined number $N_{symb}$ of OFDM or SC-FDMA symbols in the time domain; wherein the instructions cause the UE to map the DMRS to two or four of the said OFDM or SC-FDMA symbols, and wherein each OFDM or SC-FDMA symbol of the subframe has $N_{SC}^{BW}$ resource elements (REs) mapped to the respective $N_{SC}^{BW}$ subcarriers of the subframe, and the each DMRS has a transmission pattern that occupies REs of a respective OFDM or SC-FDMA symbol carrying the DMRS of a predetermined periodic pattern.

Example 79 relates to a method for execution by a user equipment (UE), comprising: receiving a plurality of subframes, wherein each of the subframe comprises one or more reference symbols; estimating, for each received subframe, a respective carrier frequency (CF) of an eNB's carrier frequency used to transmit the respective subframe based on the respective one or more reference symbols comprised within the respective subframe; combining the different CFs estimates to derive an absolute carrier frequency estimate; calibrating the UE's oscillator frequency based on the derived absolute carrier frequency estimate to synchronize the UE's transmit frequency with the derived absolute carrier frequency of the one or more eNBs; and transmitting in the sidelink (SL) and/or uplink (UL) using the synchronized transmit frequency.

Example 80 is an optional enhancement of Example 79, wherein the different subframes are received at different time instances.

Example 81 is an optional enhancement of Example 79 or 80, wherein the different subframes are received at different geographical positions.

Example 82 is an optional enhancement of one of Examples 79 to 81, wherein the different subframes are received from different eNBs or UEs.

Example 83 is an optional enhancement of one of Examples 79 to 82, wherein combining the different CFs estimates includes averaging the CFs estimates.

Example 84 is an optional enhancement of one of Examples 79 to 82, wherein combining the different CFs estimates includes filtering the CFs estimates.

Example 85 relates to a user equipment (UE), comprising: an oscillator; RF circuitry to receive a plurality of subframes, wherein each of the subframe comprises one or more reference symbols; baseband circuitry to estimate, for each received subframe, a respective carrier frequency (CF) of an eNB's carrier frequency used to transmit the respective subframe based on the respective one or more reference symbols comprised within the respective subframe; wherein the baseband circuitry combines the different CFs estimates to derive an absolute carrier frequency estimate; and wherein the baseband causes a calibration of the oscillator frequency of the oscillator based on the derived absolute carrier frequency estimate to synchronize the UE's transmit frequency with the derived absolute carrier frequency of the one or more eNBs; and wherein the RF circuitry transmits in the sidelink (SL) and/or uplink (UL) using the synchronized transmit frequency.

Example 86 relates to a user equipment (UE) adapted to perform the method of one of Examples 79 to 84.

Example 87 relates to one or more non-transitory computer readable media storing instructions that, when executed by a processing circuitry of a user equipment (UE), cause the UE to: receive a plurality of subframes, wherein each of the subframe comprises one or more reference symbols; estimate, for each received subframe, a respective carrier frequency (CF) of an eNB's carrier frequency used to transmit the respective subframe based on the respective one or more reference symbols comprised within the respective subframe; combine the different CFs estimates to derive an absolute carrier frequency estimate; calibrate the UE's oscillator frequency based on the derived absolute carrier frequency estimate to synchronize the UE's transmit frequency with the derived absolute carrier frequency of the one or more eNBs; and transmit in the sidelink (SL) and/or uplink (UL) using the synchronized transmit frequency.

Example 88 relates to one or more non-transitory computer readable media storing instructions that, when executed by a processing circuitry of a user equipment (UE), cause the UE to perform the method of one of Examples 79 to 84.

Example 89 relates to a method for execution by an eNB, comprising: receiving an uplink (UL) signal corresponding to a subframe including sounding reference symbols from a user equipment (UE); estimating the carrier frequency offset (CFO) based on the received signal and relative to a reference frequency; and transmitting a transmit frequency adjustment command to the UE comprising an information on a requested adjustment of the transmit frequency of the UE for UL transmissions to compensate for the estimated UL CFO.

Example 90 is an optional enhancement of Example 89, wherein the transmit frequency adjustment command is comprised within Downlink Control Information (DCI) or Uplink Control Information (UCI) transmitted from the eNB in the downlink (DL).

Example 91 is an optional enhancement of Example 89, wherein the transmit frequency adjustment command is comprised within a Radio Resource Control (RRC) message transmitted from the eNB in the downlink (DL).

Example 92 is an optional enhancement of one of Examples 89 to 91, wherein the sounding reference symbols correspond to one or more Demodulation Reference Signals (DMRS).

Example 93 is an optional enhancement of Example 92, wherein the subframe is a subframe as defined in one of Examples 30 to 39.

Example 94 is an optional enhancement of Example 92 or 93, wherein the subframe comprises plural DMRS mapped to respective OFDM/SC-FDMA symbols as defined in Example 72 or 73.

Example 95 is an optional enhancement of one of Examples 92 to 94, wherein the subframe comprises plural DMRS mapped to respective OFDM/SC-FDMA symbols so that a respective DMRS occupies to a subset of the REs of a respective OFDM/SC-FDMA symbol according to a periodic pattern.

Example 96 relates to an eNB, comprising: RF circuitry to receive an uplink (UL) signal corresponding to a subframe including sounding reference symbols from a user equipment (UE); and baseband circuitry to estimate the carrier frequency offset (CFO) based on the received signal and relative to a reference frequency; wherein the RF circuitry transmits an transmit frequency adjustment command to the UE comprising an information on a requested adjustment of the transmit frequency of the UE for UL transmissions to compensate for the estimated UL CFO.

Example 97 relates to an eNB, adapted to perform the method of one of Examples 89 to 95.

Example 98 relates to one or more non-transitory computer readable media storing instructions that, when executed by a processing circuitry of an eNB, cause the eNB to: receive an uplink (UL) signal corresponding to a subframe including sounding reference symbols from a user equipment (UE); and estimate the carrier frequency offset (CFO) based on the received signal and relative to a reference frequency; transmit a transmit frequency adjustment command to the UE comprising an information on a requested adjustment of the transmit frequency of the UE for UL transmissions to compensate for the estimated UL CFO.

Example 99 relates to one or more non-transitory computer readable media storing instructions that, when executed by a processing circuitry of an eNB, cause the eNB to perform the method of one of Examples 89 to 95.

Example 100 relates to a method for execution by a user equipment (UE), comprising: transmitting an uplink (UL) signal corresponding to a subframe including sounding reference symbols from a user equipment (UE); receiving a transmit frequency adjustment command comprising an information on a requested adjustment of the transmit frequency of the UE for UL transmissions to compensate for the estimated UL CFO; and adjusting the transmit frequency of the UE according to the transmit frequency adjustment command.

Example 101 is an optional enhancement of Example 100, further comprising transmitting another UL signal or a Sidelink (SL) signal using the adjusted transmit frequency.

Example 102 is an optional enhancement of Example 100 or 101, wherein the sounding reference symbols correspond to one or more Demodulation Reference Signals (DMRS).

Example 103 is an optional enhancement of Example 102, wherein the subframe is a subframe as defined in one of Examples 30 to 39.

Example 104 is an optional enhancement of Example 102 or 103, wherein the subframe comprises plural DMRS mapped to respective OFDM/SC-FDMA symbols as defined in Example 72 or 73.

Example 105 is an optional enhancement of one of Examples 102 to 104, wherein the method further comprises the steps of the method of one of Examples 40 to 54 or Examples 68 to 75.

Example 106 relates to a user equipment (UE) comprising: RF circuitry to transmit an uplink (UL) signal corresponding to a subframe including sounding reference symbols from a user equipment (UE), and to receive a transmit frequency adjustment command comprising an information on a requested adjustment of the transmit frequency of the UE for UL transmissions to compensate for the estimated UL CFO; and wherein the RF circuitry adjusts the transmit frequency of the UE according to the transmit frequency adjustment command.

Example 107 relates to a user equipment (UE) adapted to perform the method of one of Examples 100 to 105.

Example 108 relates to one or more non-transitory computer readable media storing instructions that, when executed by a processing circuitry of a user equipment (UE), cause the UE to: transmit an uplink (UL) signal corresponding to a subframe including sounding reference symbols from a user equipment (UE); receive a transmit frequency adjustment command comprising an information on a requested adjustment of the transmit frequency of the UE for UL transmissions to compensate for the estimated UL CFO;

and adjust the transmit frequency of the UE according to the transmit frequency adjustment command.

Example 109 relates to one or more non-transitory computer readable media storing instructions that, when executed by a processing circuitry of a user equipment (UE), cause the UE to perform the method of one of Examples 100 to 105.

Example 110 relates to a method for execution by a communication device, comprising: a) receiving a subframe including a plurality of DMRS; b) estimating the phase offset $\Delta\varphi_{estimate}$ between a pair of OFDM/SC-FDMA symbols of said subframe each carrying a respective one of the DMRS; c) applying a phase offset compensation to the OFDM/SC-FDMA symbols of the subframe based on a carrier frequency offset (CFO) hypothesis that is considering the estimated phase offset $\Delta\varphi_{estimate}$; d) demodulating and decoding the information comprised in the subframe using the phase offset-compensated OFDM/SC-FDMA symbols; e) in case the decoding is unsuccessful, updating the CFO hypothesis and performing steps c) and d) based on the updated CFO hypothesis.

Example 111 is an optional enhancement of Example 110, wherein steps c), d) and e) are repeated using different CFO hypothesis until the information is decoded successfully or until a predetermined number of iterations is reached.

Example 112 is an optional enhancement of Example 111, wherein the predetermined number of iterations correspond to the number of available CFO hypothesis.

Example 113 is an optional enhancement of Example 111 or 112, wherein the CFO hypothesis except for one define a predetermined additional phase offset being a multiple of $2\pi$ to be added or subtracted from the estimated phase offset, wherein the phase offset compensation take is based on the estimated phase offset and the respective additional phase offset, where applicable.

Example 114 is an optional enhancement of Example 113, wherein the phase offset $\Delta\varphi_{comp\_i}$ is considered in the phase offset compensation, and wherein for a CFO hypothesis i the phase offset $\Delta\varphi_{comp\_i}$ is defined as: $\Delta\varphi_{comp\_i}=\Delta\varphi_{estimate}+i\cdot 2\pi$, where and $i=[0, 1, 2, \ldots, N]$ or $i=[0, \pm 1, \pm 2, \ldots, \pm N/2]$.

Example 115 is an optional enhancement of one of Examples 110 to 114, wherein step b) comprises estimating a respective the phase offset values for at least two pairs of neighboring OFDM/SC-FDMA symbols of said subframe carrying respective ones of the DMRS, and combining the different estimated phase offset values to said phase offset based on which the phase offset compensation of step c) is performed.

Example 116 is an optional enhancement of Example 115, wherein the combination of the different estimated phase offset values to said phase offset is formed by averaging the different estimated phase offset values.

Example 117 is an optional enhancement of Example 115, wherein the combination of the different estimated phase offset values to said phase offset is obtained by forming a weighted average of the different estimated phase offset values.

Example 118 relates to a communication device, comprising: RF circuitry to receive a subframe including a plurality of DMRS; baseband circuitry to estimate the phase offset $\Delta\varphi_{estimate}$ between a pair of OFDM/SC-FDMA symbols of said subframe each carrying a respective one of the DMRS; wherein the baseband circuitry is adapted to perform the following operations: a) applying a phase offset compensation to the OFDM/SC-FDMA symbols of the subframe based on a carrier frequency offset (CFO) hypothesis that is considering the estimated phase offset $\Delta\varphi_{estimate}$; b) demodulating and decoding the information comprised in the subframe using the phase offset-compensated OFDM/SC-FDMA symbols; c) in case the decoding is unsuccessful, updating the CFO hypothesis and performing steps a) and b) based on the updated CFO hypothesis.

Example 119 is an optional enhancement of Example 118, wherein the baseband circuitry is adapted to perform the operations c), d) and e) repeatedly using different CFO hypothesis until the information is decoded successfully or until a predetermined number of CFO hypothesis has been tested.

Example 120 relates to communication device adapted to perform the method of one of Examples 110 to 117.

Example 121 relates to one or more non-transitory computer readable media storing instructions that, when executed by a processing circuitry of a communication device, cause the communication device to: a) receive a subframe including a plurality of DMRS; b) estimate the phase offset between a pair of OFDM/SC-FDMA symbols of said subframe each carrying a respective one of the DMRS; c) apply a phase offset compensation to the OFDM/SC-FDMA symbols of the subframe based on a carrier frequency offset (CFO) hypothesis; d) demodulate and decoding the information comprised in the subframe using the phase offset-compensated OFDM/SC-FDMA symbols; e) in case the decoding is unsuccessful, update the CFO hypothesis and perform steps c) and d) based on the updated CFO hypothesis.

Example 122 relates to one or more non-transitory computer readable media storing instructions that, when executed by a processing circuitry of a communication device, cause the communication device to perform the method of one of Examples 110 to 117.

Example 123 may include a method of the LTE signal transmission using new physical layer numerology comprising: using the increased subcarrier spacing $\Delta f_{NEW}=n*\Delta f_{LTE}$ where $\Delta f_{LTE}=15$ kHz is the LTE subcarrier spacing, n=2, 3, 4, . . . ); using FFT size $N_{FFT\_NEW}=N_{FFT\_LTE}/n$ for different bandwidths, where $N_{FFT\_LTE}$ is the legacy LTE FFT size for the given BW; and using OFDM/SC-FDMA symbols duration reduced by the factor of n vs legacy LTE systems.

Example 124 may include a method of the LTE Sidelink DMRS transmission based on the dense placement of DMRS signals when DMRS transmissions take place in multiple symbols in each time slot.

Example 125 may include a method of example 124 or some other example herein, wherein the DMRS has frequency contiguous transmission pattern and occupies all REs in a PRB pair in the allocated symbol comprising the DMRS transmission in Symbols 5, 8 in the subframe for the Normal CP, or Symbols 2, 6, 7, 11 in the subframe for the Normal CP, or Symbols 3, 6, 7, 10 in the subframe for the Normal CP, or Symbols 4, 6, 7, 9 in the subframe for the Normal CP, or Symbols 2, 3, 10, 11 in the subframe for the Normal CP, or Symbols 2, 4, 9, 11 in the subframe for the Normal CP, or Symbols 3, 7 in the subframe for the Extended CP, or Symbols 4, 7 in the subframe for the Extended CP, or Symbols 2, 5, 6, 9 in the subframe for the Extended CP, or Symbols 3, 5, 6, 8 in the subframe for the Extended CP, or Symbols 2, 3, 8, 9 in the subframe for the Extended CP.

Example 126 may include a method of LTE signal transmission comprising the method of Example 123 and Example 124.

Example 127 may include a method of LTE sidelink and uplink DMRS and data signal transmissions comprising mapping signal transmissions on a subset of the available REs in frequency domain.

Example 128 may include a method of example 127 or some other example herein, wherein the DMRS and or data signal transmission is done on even or odd indexes of the available REs (every second RE) the DMRS and or data signal transmission is done on one out of 4 of the available REs (every 4th RE).

Example 129 may include a method of UE synchronization and transmission comprising: estimation of the receive DL signal carrier frequency using DL PSS/SSS/CRS signal processing; estimation of the UE oscillator CFO vs the absolute signal carrier frequency and estimation of the absolute signal carrier frequency using combining of multiple DL carrier frequency estimates corresponding to different time instances and measurements of signals from different cells; and use of the absolute UL signal carrier frequency estimate for the SL and or UL transmissions.

Example 130 may include a method of eNB controlled UE transmit frequency adjustment comprising: eNB estimation the CFO on the UL and or SL using DMRS or sounding signals from the UE; eNB estimation the required TX frequency adjustment to compensate the receive signal CFO; and eNB sending command to the UE to adjust the TX frequency accordingly.

Example 131 may include a method of example 130 or some other example herein wherein the UE receives the command from the eNB and adjust its TX frequency in SL and/or UL accordingly.

Example 132 may include a method of UE UL transmission comprising: estimation of the DL signal CFO due to Doppler shift; and adjustment of the UE UL TX frequency to pre-compensate the Doppler shift of the receive signal at the eNB side.

Example 133 may include a method of UE SL and UL signals reception comprising: make phase offset estimation tween the signals in different SC-FDMA/OFDM symbols (e.g. between DMRS symbols); applying the phase offset compensation due to CFO under assumption that real phase offset is equal to $\Delta\varphi+(N\times 2\pi)$ (e.g. N=0, ±1, ±2, ... ); making useful signal channel estimation, demodulation and decoding; and processing the receive signal under a different CFO hypothesis in case when payload.

Example 134 may include an apparatus comprising means to perform one or more elements of a method described in or related to any of examples 123-133, or any other method or process described herein.

Example 135 may include one or more non-transitory computer-readable media comprising instructions to cause an electronic device, upon execution of the instructions by one or more processors of the electronic device, to perform one or more elements of a method described in or related to any of examples 123-133, or any other method or process described herein.

Example 136 may include an apparatus comprising logic, modules, and/or circuitry to perform one or more elements of a method described in or related to any of examples 123-133, or any other method or process described herein.

Example 137 may include a method, technique, or process as described in or related to any of examples 123-133, or portions or parts thereof.

Example 138 may include a method of communicating in a wireless network as shown and described herein.

Example 139 may include a system for providing wireless communication as shown and described herein.

Example 140 may include a device for providing wireless communication as shown and described herein.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

The invention claimed is:

1. A user equipment (UE), comprising:
baseband circuitry to map Demodulation Reference Signals (DMRS) to a subframe carrying information of a physical channel designated for vehicle-to-X (V2X) communication, wherein the subframe has a predetermined number of subcarriers in a frequency domain, and a predetermined number of Orthogonal Frequency Division Multiplex (OFDM) or Single Carrier-Frequency Division Multiple Access (SC-FDMA) symbols in a time domain; and
radio-frequency (RF) circuitry to transmit a communication signal corresponding to the subframe;
wherein the baseband circuitry is to:
map the DMRS to four of the said OFDM or SC-FDMA symbols, and each DMRS has a frequency contiguous transmission pattern that occupies all resource elements (REs) of a respective OFDM or SC-FDMA symbol carrying the DMRS, and
apply an Inverse Fast Fourier Transform (IFFT) of size $N_{FFT}$ to the OFDM or SC-FDMA symbols of the subframe to form the communication signal,
wherein the size $N_{FFT}$ of the IFFT is $N_{FFT}=N_{FFT_{legacy}}/n$, where $n \in \{1, 2, 3, 4, \ldots\}$,
where $N_{FFT_{legacy}}$ is the size of the IFFT used for transmitting subframes carrying information of said physical channel not designated for V2X communication; and
wherein a subcarrier spacing $\Delta f_{SC}$ between subcarriers is $\Delta f_{SC} = n \cdot \Delta f_{legacy}$,
where $n \in \{1, 2, 3, 4, \ldots\}$ and where $\Delta f_{legacy}$ is subcarrier spacing of a subcarriers of a physical channel not designated for V2X communication.

2. The UE of claim 1, wherein the subframe is divided, in the time domain, into two slots, wherein two of the DMRS are mapped to the first slot of said OFDM or SC-FDMA symbols and wherein two of the DMRS are mapped to the second slot of said OFDM or SC-FDMA symbols.

3. The UE of claim 2, wherein the first slot comprises the first half of the OFDM or SC-FDMA symbols and the second slot comprises the second half of the OFDM or SC-FDMA symbols.

4. The UE of claim 1, wherein the subframe spans 0.5 ms or 0.25 ms in the time domain.

5. The UE of claim 1, wherein in case the subframe has $N_{symb}=14$ OFDM or SC-FDMA symbols being indexed from 0 to 13, each OFDM or SC-FDMA symbol has a normal cyclic prefix and the DMRS are transmitted by the UE in:
the OFDM or SC-FDMA symbols having the indices 2, 6, 7 and 11, or
the OFDM or SC-FDMA symbols having the indices 3, 6, 7 and 10, or
the OFDM or SC-FDMA symbols having the indices 4, 6, 7 and 9, or
the OFDM or SC-FDMA symbols having the indices 2, 3, 10 and 11, or the OFDM or SC-FDMA symbols having the indices 2, 4, 9, 11.

6. The UE of claim 1, wherein in case the subframe has $N_{symb}=12$ OFDM or SC-FDMA symbols being indexed from 0 to 11, each OFDM or SC-FDMA symbol has an extended cyclic prefix and the DMRS are transmitted by the UE in:
the OFDM or SC-FDMA symbols having the indices 2, 5, 6 and 9, or
the OFDM or SC-FDMA symbols having the indices 3, 5, 6 and 8, or
the OFDM or SC-FDMA symbols having the indices 2, 3, 8 and 9.

7. The UE of claim 1, wherein the physical channel designated for V2X communication is a sidelink physical channel of a 3GPP LTE- or 3GPP LTE-A-based mobile communication system.

8. A user equipment (UE), comprising:
baseband circuitry to map Demodulation Reference Signals (DMRS) to a subframe carrying information of a physical channel designated for vehicle-to-X (V2X) communication, wherein the subframe has a predetermined number of subcarriers in a frequency domain, and a predetermined number of Orthogonal Frequency Division Multiplex (OFDM) or Single Carrier-Frequency Division Multiple Access (SC-FDMA) symbols in a time domain; and
radio-frequency (RF) circuitry to transmit a communication signal corresponding to the subframe;
wherein the baseband circuitry is to map the DMRS to four of the said OFDM or SC-FDMA symbols, wherein the subframe has a predetermined number $N_{SC}^{BW}$ of subcarriers in the frequency domain, and a predetermined number $N_{symb}$ of OFDM or SC-FDMA symbols in the time domain;
wherein a subcarrier spacing $\Delta f_{SC}$ between subcarriers is $\Delta f_{SC}=n \cdot \Delta f_{legacy}$, where $n \in \{2, 3, 4, 5, 6, 7, 8, \ldots\}$ and where $\Delta f_{legacy}$ is subcarrier spacing of subcarriers of a physical channel not designated for V2X communication; and
wherein a symbol duration $T_{symb}$ of the OFDM or SC-FDMA symbols having indices is $T_{symb}=T_{symb_{legacy}}/n$, where $T_{symb_{legacy}}$ is the symbol duration of OFDM or SC-FDMA symbols having the indices used for transmitting subframes carrying information of said physical channel not designated for V2X communication.

9. An apparatus comprising:
baseband circuitry to map Demodulation Reference Signals (DMRS) to a subframe carrying information of a physical channel designated for vehicle-to-X (V2X) communication, wherein the subframe has a predetermined number of subcarriers in a frequency domain, and a predetermined number of Orthogonal Frequency Division Multiplex (OFDM) or Single Carrier-Frequency Division Multiple Access (SC-FDMA) symbols in a time domain; and
radio-frequency (RF) circuitry to transmit a communication signal corresponding to the subframe,
wherein:
the baseband circuitry is to map the DMRS to four of the said OFDM or SC-FDMA symbols, and each DMRS has a frequency contiguous transmission pattern that occupies all resource elements (REs) of a respective OFDM or SC-FDMA symbol carrying the DMRS;
each OFDM or SC-FDMA symbol of the subframe has $N_{SC}^{BW}$ REs mapped by the baseband circuitry to the respective $N_{SC}^{BW}$ subcarriers of the subframe;
each OFDM or SC-FDMA symbol of the subframe has $N_{SC}^{BW}$ resource elements (REs) mapped by the baseband circuitry to the respective $N_{SC}^{BW}$ subcarriers of the subframe, and wherein the $N_{SC}^{BW}$ REs are continuously indexed with index $i \in \{0, 1, \ldots, N_{SC}^{BW}-1\}$;
the baseband circuitry is to puncture all REs of an OFDM or SC-FDMA symbol to which a DMRS has been mapped having an index j other than $j(x)=k+m \cdot x$ for $x=[0, 1, \ldots, \lfloor N_{SC}^{BW}/m-1 \rfloor]$ where $m \in \{2, 3, 4, \ldots, 8\}$, and $k \in \{0, \ldots, m-1\}$; and
the RF circuitry is to transmit with non-zero power on non-punctured REs of the OFDM or SC-FDMA symbol to which the DMRS has been mapped, and transmits with zero power on punctured REs of the OFDM or SC-FDMA symbol to which the DMRS has been mapped.

10. A user equipment (UE), comprising:
baseband circuitry to map Demodulation Reference Signals (DMRS) to a subframe carrying information of a physical channel designated for vehicle-to-X (V2X) communication, wherein the subframe has a predetermined number of subcarriers in a frequency domain, and a predetermined number of Orthogonal Frequency Division Multiplex (OFDM) or Single Carrier-Frequency Division Multiple Access (SC-FDMA) symbols in a time domain; and
radio-frequency (RF) circuitry to transmit a communication signal corresponding to the subframe;
wherein the baseband circuitry is to map the DMRS to four of the said OFDM or SC-FDMA symbols, wherein each OFDM or SC-FDMA symbol of the subframe has $N_{SC}^{BW}$ resource elements (REs) mapped by the baseband circuitry to the respective $N_{SC}^{BW}$ subcarriers of the subframe, and the each DMRS has a transmission pattern that occupies REs of a respective OFDM or SC-FDMA symbol carrying the DMRS of a predetermined periodic pattern;
wherein each OFDM or SC-FDMA symbol of the subframe has $N_{SC}^{BW}$ resource elements (REs) mapped by the baseband circuitry to the respective $N_{SC}^{BW}$ subcarriers of the subframe, and wherein the $N_{SC}^{BW}$ REs are continuously indexed with index $i \in \{0, 1, \ldots, N_{SC}^{BW}-1\}$;
wherein the baseband circuitry maps a respective one of DMRS to the REs having the indices $j(x)=k+m \cdot x$ for $x=[0, 1, \ldots, \lfloor N_{SC}^{BW}/m-1 \rfloor]$ where $m \in \{2, 3, 4, \ldots, 8\}$, and $k \in \{0, \ldots, m-1\}$; and
wherein the RF circuitry is to transmit with non-zero power on REs of the OFDM or SC-FDMA symbol to which the DMRS has been mapped, and transmit with zero power on REs of the OFDM or SC-FDMA symbol to which the DMRS has not been mapped.

11. The UE of claim 10, wherein the baseband circuitry is to apply an Inverse Fast Fourier Transform (IFFT) of size $N_{FFT}$ to the OFDM or SC-FDMA symbols of the subframe to obtain the communication signal, thereby causing said transmission of the communication signal to include m consecutive versions of the IFFT-transformed DMRS symbols within the subframe.

12. A user equipment (UE), comprising:
baseband circuitry to add Demodulation Reference Signals (DMRS) to a communication signal; and radio-frequency (RF) circuitry to transmit the communication signal within a subframe carrying information of a physical channel designated for vehicle-to-X (V2X) communication, wherein the subframe has a predetermined number $N_{SC}^{BW}$ of subcarriers in a frequency domain, and a predetermined number of Orthogonal Frequency Division Multiplex (OFDM) or Single Carrier-Frequency Division Multiple Access (SC-FDMA) symbols in a time domain;

wherein:
the baseband circuitry is to map the DMRS to four of the said OFDM or SC-FDMA symbols;
each OFDM or SC-FDMA symbol of the subframe has $N_{SC}^{BW}$ resource elements (REs) mapped by the baseband circuitry to the respective $N_{SC}^{BW}$ subcarriers of the subframe, and the each DMRS has a transmission pattern that occupies REs of a respective OFDM or SC-FDMA symbol carrying the DMRS of a predetermined periodic pattern;
in case the subframe has $N_{symb}$=14 OFDM or SC-FDMA symbols being indexed from 0 to 13, each OFDM or SC-FDMA symbol has a normal cyclic prefix and the DMRS are transmitted by the UE in: the OFDM or SC-FDMA symbols having the indices 2, 6, 7 and 11; the OFDM or SC-FDMA symbols having the indices 3, 6, 7 and 10; the OFDM or SC-FDMA symbols having the indices 4, 6, 7 and 9; the OFDM or SC-FDMA symbols having the indices 2, 3, 10 and 11; or the OFDM or SC-FDMA symbols having the indices 2, 4, 9, 11;
in case the subframe has $N_{symb}$=12 OFDM or SC-FDMA symbols being indexed from 0 to 11, each OFDM or SC-FDMA symbol has an extended cyclic prefix and the DMRS are transmitted by the UE in: the OFDM or SC-FDMA symbols having the indices 2, 5, 6 and 9; the OFDM or SC-FDMA symbols having the indices 3, 5, 6 and 8; or the OFDM or SC-FDMA symbols having the indices 2, 3, 8 and 9;
each OFDM or SC-FDMA symbol of the subframe has $N_{SC}^{BW}$ resource elements (REs) mapped by the baseband circuitry to the respective $N_{SC}^{BW}$ subcarriers of the subframe, and the each DMRS has a frequency contiguous transmission pattern that is to occupy all REs of a respective OFDM or SC-FDMA symbol carrying the DMRS;
each OFDM or SC-FDMA symbol of the subframe has $N_{SC}^{BW}$ resource elements (REs) mapped by the baseband circuitry to the respective $N_{SC}^{BW}$ subcarriers of the subframe, and wherein the $N_{SC}^{BW}$ REs are continuously indexed with index $i \in \{0, 1, \ldots, N_{SC}^{BW}-1\}$;
the baseband circuitry is to puncture all REs of an OFDM or SC-FDMA symbol to which a DMRS has been mapped having an index j other than $j(x)=k+m \cdot x$ for $x=[0, 1, \ldots, \lfloor N_{SC}^{BW}/m-1 \rfloor]$ where $m \in \{2, 3, 4, \ldots, 8\}$ and $k \in \{0, \ldots, m-1\}$; and
the RF circuitry is to transmit with non-zero power on non-punctured REs of the OFDM or SC-FDMA symbol to which the DMRS has been mapped, and transmit with zero power on punctured REs of the OFDM or SC-FDMA symbol to which the DMRS has been mapped.

13. The UE of claim 12, wherein each OFDM or SC-FDMA symbol of the subframe has $N_{SC}^{BW}$ resource elements (REs) mapped by the baseband circuitry to the respective $N_{SC}^{BW}$ subcarriers of the subframe, and wherein the $N_{SC}^{BW}$ REs are continuously indexed with index $i \in \{0, 1, \ldots, N_{SC}^{BW}-1\}$;
wherein the baseband circuitry is to map a respective one of DMRS to the REs having the indices $j(x)=k+m \cdot x$ for $x=[0, 1, \ldots, \lfloor N_{SC}^{BW}/m-1 \rfloor]$ where $m \in \{2, 3, 4, \ldots, 8\}$, and $k \in \{0, \ldots, m-1\}$; and
wherein the RF circuitry is to transmit with non-zero power on REs of the OFDM or SC-FDMA symbol to which the DMRS has been mapped, and transmit with zero power on REs of the OFDM or SC-FDMA symbol to which the DMRS has not been mapped.

14. The UE of one of claim 12, wherein the baseband circuitry is to apply an Inverse Fast Fourier Transform (IFFT) of size $N_{FFT}$ to the OFDM or SC-FDMA symbols of the subframe, thereby causing said transmission of the communication signal to include a transmission of two consecutive versions of the IFFT-transformed communication signal in the time domain.

\* \* \* \* \*